United States Patent
Kons et al.

(10) Patent No.: US 12,132,597 B2
(45) Date of Patent: Oct. 29, 2024

(54) PULSE SHAPING IN DELAY-DOPPLER DOMAIN

(71) Applicant: Cohere Technologies, Inc., San Jose, CA (US)

(72) Inventors: Shachar Kons, San Jose, CA (US); Shlomo Selim Rakib, San Jose, CA (US); Ronny Hadani, San Jose, CA (US)

(73) Assignee: Cohere Technologies, Inc., San Jose, CA (US)

( * ) Notice: Subject to any disclaimer, the term of this patent is extended or adjusted under 35 U.S.C. 154(b) by 0 days.

(21) Appl. No.: 18/686,659

(22) PCT Filed: Aug. 26, 2022

(86) PCT No.: PCT/US2022/075539
§ 371 (c)(1),
(2) Date: Feb. 26, 2024

(87) PCT Pub. No.: WO2023/028601
PCT Pub. Date: Mar. 2, 2023

(65) Prior Publication Data
US 2024/0267276 A1 Aug. 8, 2024

Related U.S. Application Data

(60) Provisional application No. 63/237,403, filed on Aug. 26, 2021.

(51) Int. Cl.
*H04L 27/26* (2006.01)
(52) U.S. Cl.
CPC ........ *H04L 27/2639* (2013.01); *H04L 27/261* (2013.01)

(58) Field of Classification Search
CPC . H04L 27/26; H04L 27/2601; H04L 27/2602; H04L 27/261; H04L 27/2613;
(Continued)

(56) References Cited

U.S. PATENT DOCUMENTS

| 2017/0012810 A1* | 1/2017 | Rakib | H04L 27/2697 |
| 2017/0078054 A1* | 3/2017 | Hadani | H04L 5/0023 |

(Continued)

FOREIGN PATENT DOCUMENTS

| WO | WO-2017049303 A1 * | 3/2017 | ............. H04L 27/01 |
| WO | WO-2018191309 A1 * | 10/2018 | ............ H04L 25/022 |

OTHER PUBLICATIONS

International Search Report and Written Opinion for PCT/US2022/075539, filed Aug. 26, 2022; report dated Dec. 2, 2022, 13 pages.

*Primary Examiner* — Siu M Lee
(74) *Attorney, Agent, or Firm* — Perkins Coie LLP

(57) ABSTRACT

Methods, systems and devices for wireless communication are described. One example method includes performing a first mapping in which information bits are mapped to transmission resources in a first portion of a two-dimensional delay-Doppler grid. Herein, the two-dimensional delay-Doppler grid comprises N Doppler elements and M delay elements, where N and M are positive integers. The method further includes performing a second mapping in which a reference signal is mapped to transmission resources in a second portion of the two-dimensional delay-Doppler grid, and generating a transmission waveform from a signal combination of an output of the first mapping and an output of the second mapping. The transmission waveform corresponds to an output of an orthogonal time frequency space (OTFS) waveform of the signal combination, and at least the output of the second mapping undergoes a time domain spreading.

20 Claims, 59 Drawing Sheets

(58) Field of Classification Search
CPC ......... H04L 27/23164; H04L 27/23136; H04L 27/2627; H04L 27/2639
See application file for complete search history.

(56) References Cited

U.S. PATENT DOCUMENTS

| | | |
|---|---|---|
| 2017/0288710 A1 | 10/2017 | Delfeld et al. |
| 2019/0268113 A1 | 8/2019 | Lee et al. |
| 2020/0374814 A1 | 11/2020 | Gong et al. |

* cited by examiner

3650

3652 — Receiving a transmission waveform that comprises multiple frames, wherein each frame corresponds to a signal combination of an output of a first mapping and an output of a second mapping, wherein the transmission waveform corresponds to an output of an orthogonal time frequency space (OTFS) waveform of a signal combination that is generated using a two-dimensional delay-Doppler pulse, wherein the spacing between two consecutive frames is equal or larger than $1/\Delta$;

3654 — Processing the transmission waveform to recover the information bits and/or the reference signal.

FIG. 36F

PULSE SHAPING IN DELAY-DOPPLER DOMAIN

CROSS-REFERENCE TO RELATED APPLICATION

The application is a 371 National Phase Application of PCT Application No. PCT/PCT/US2022/075539 entitled "PULSE SHAPING IN DELAY-DOPPLER DOMAIN" filed on Aug. 26, 2022, which claims priority to U.S. Provisional Patent Application No. 63/237,403, filed on Aug. 26, 2021, the disclosure of which is hereby incorporated by reference herein in its entirety.

TECHNICAL FIELD

The present document relates to wireless communication.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks. Many of those activities involve situations in which a large number of user devices may be served by a network.

SUMMARY

This document discloses techniques that may be used by wireless networks to achieve several operational improvements.

In one example aspect, a wireless communication method is disclosed. The method includes performing a first mapping in which information bits are mapped to transmission resources in a first portion of a two-dimensional delay-Doppler grid, wherein the two-dimensional delay-Doppler grid comprises N Doppler elements and M delay elements, where N and M are positive integers; performing a second mapping in which a reference signal is mapped to transmission resources in a second portion of the two-dimensional delay-Doppler grid; and generating a transmission waveform from a signal combination of an output of the first mapping and an output of the second mapping; wherein the transmission waveform corresponds to an output of an orthogonal time frequency space (OTFS) waveform of the signal combination, and at least the output of the second mapping undergoes a time domain spreading.

In another example aspect, another wireless communication method is disclosed. The method includes receiving a wireless waveform that represents an orthogonal time frequency space (OTFS) waveform of a signal combination of modulated information bits and reference signal that are placed along a two-dimensional delay-Doppler grid comprising N Doppler elements and M delay elements, where N and M are positive integers, wherein the two dimensional delay-Doppler grid comprises a first portion in which the information bits are mapped to transmission resources and a second portion in which a reference signal is mapped to transmission resource; generating a non-spread waveform by applying a time domain inverse spreading operation to at least a portion of the wireless waveform corresponding to the second portion; and extracting information bits using further receiver-side processing of the non-spread waveform.

In another example aspect, another wireless communication method is disclosed. The method includes generating a transmission waveform comprising modulated data symbols carrying information bits, wherein the modulated data symbols are organized in a number of data frames along a delay-Doppler grid comprising N Doppler elements and M delay elements, where N and M are positive integers, and transmitting the transmission waveform using frequency and time resources wherein: (a) a reduced power frequency portion of the frequency resources is configured such that a power of the transmission waveform in the reduced power frequency portion is below a first threshold, or (b) a reduced power time portion of the time resources is configured such that the power of the transmission waveform in the reduced power time portion is below a second threshold.

In another example aspect, another wireless communication method is disclosed. The method includes receiving a transmission waveform using frequency and time resources wherein the transmission waveform comprises (a) a reduced power frequency portion of the frequency resources in which a power of the transmission waveform in the reduced power frequency portion is below a first threshold, or (b) a reduced power time portion of the time resources in which the power of the transmission waveform in the reduced power time portion is below a second threshold; wherein the transmission waveform comprises modulated data symbols carrying information bits, wherein the modulated data symbols are organized in a number of data frames along a delay-Doppler grid comprising N Doppler elements and M delay elements, where N and M are positive integers, and processing the transmission waveform to recover the information bits.

In another example aspect, another wireless communication method is disclosed. The method includes performing a first mapping in which information bits are mapped to transmission resources in a first portion of a two-dimensional delay-Doppler grid, wherein the two-dimensional delay-Doppler grid comprises N Doppler elements spaced by $\Delta v$ Hertz and M delay elements spaced by $\Delta \tau$ seconds, where N and M are positive integers; performing a second mapping in which a reference signal is mapped to transmission resources in a second portion of the two-dimensional delay-Doppler grid; and generating a transmission waveform comprising multiple frames, wherein each frame corresponds to a signal combination of an output of the first mapping and an output of the second mapping; wherein the transmission waveform corresponds to an output of an orthogonal time frequency space (OTFS) waveform of the signal combination that is generated using a two-dimensional delay-Doppler pulse, wherein the spacing between two consecutive frames is equal or larger than $1/\Delta v$.

In another example aspect, another wireless communication method is disclosed. The method includes receiving a transmission waveform that comprises multiple frames, wherein each frame corresponds to a signal combination of an output of a first mapping and an output of a second mapping, wherein the transmission waveform corresponds to an output of an orthogonal time frequency space (OTFS) waveform of a signal combination that is generated using a two-dimensional delay-Doppler pulse, wherein the spacing between two consecutive frames is equal or larger than $1/\Delta v$; wherein, for the first mapping, information bits are mapped to transmission resources in the first portion of a two-dimensional delay-Doppler grid, wherein the two-dimensional delay-Doppler grid comprises N Doppler elements spaced by $\Delta v$ Hertz and M delay elements spaced by $\Delta\tau$ seconds, where N and M are positive integers; and wherein, for the second mapping, a reference signal is mapped to transmission resources in the second portion of the two-dimensional delay-Doppler grid; and processing the transmission waveform to recover the information bits and/or the reference signal.

In another example aspect, a wireless communication apparatus that implements the above-described methods is disclosed. The wireless communication apparatus may include a transmitter circuit and/or a receiver circuit to perform signal transmissions or receptions and a processor to implement various signal processing techniques described in the present document.

In yet another example aspect, a wireless system in which one or more of the above described methods are implemented is disclosed.

In yet another example aspect, the method may be embodied as processor-executable code and may be stored on a computer-readable program medium.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

FIG. 10A shows a subframe where symbol #1 is being used for 4G LTE PDCCH (physical downlink control channel), and FIG. 10B shows a subframe where symbol #1 is being used for 5G NR PDCCH.

FIGS. 36A-36F are flowcharts for various example methods of wireless communication.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion or the embodiments to the respective sections only. Furthermore, certain standard-specific terms are used for illustrative purpose only, and the disclosed techniques are applicable to any wireless communication systems.

1. Introduction—Wireless Communication Environment Examples

The wireless or time-variant nature of the communication channel poses several challenges in design a transmission protocol suitable for wireless communication scenarios. These days, users expect their wireless devices to work everywhere and in a variety of mobile or stationary situations.

The relative movement of transmitters and receivers with respect to each other cause signal distortions such as varying channel delay, Doppler and/or angular spread, signal degradation due to Ground clutter, sea Clutter, and so on. Another example of signal degradation is flat fading in which an entire channel occupied by a transmission signal experiences fading or attenuation that may be relatively constant across the channel. In practice, a transmission scheme may need to be designed to fit within a certain link budget, maximum power constraint, or linearity of electronics used for transmitting or receiving signals.

Furthermore, a communications system may perform transmissions between a transmitter and one or more receivers using various configurations such as ad-hoc (any device to any device), or multi-user (one device to many devices). Recently, a technique called orthogonal time frequency space (OTFS) modulation has been introduced to address such problems, and others. A brief overview of the OTFS technology, which provide further details of certain aspects of the OTFS technology, is described in Section 3.

As further described in the present document, an OTFS waveform that comprises OTFS modulated data, control, and reference signal information, may be mathematically characterized in terms of use of a 2-D pulse signal in the 2-D delay-Doppler domain. The 2-D pulse may be constructed as a function of a delay pulse and a Doppler pulse. The present document provides techniques for controlling various characteristics of the delay pulse or the Doppler pulse to achieve certain target operational points as further described herein.

2. Example Wireless Systems

Figure 1A:
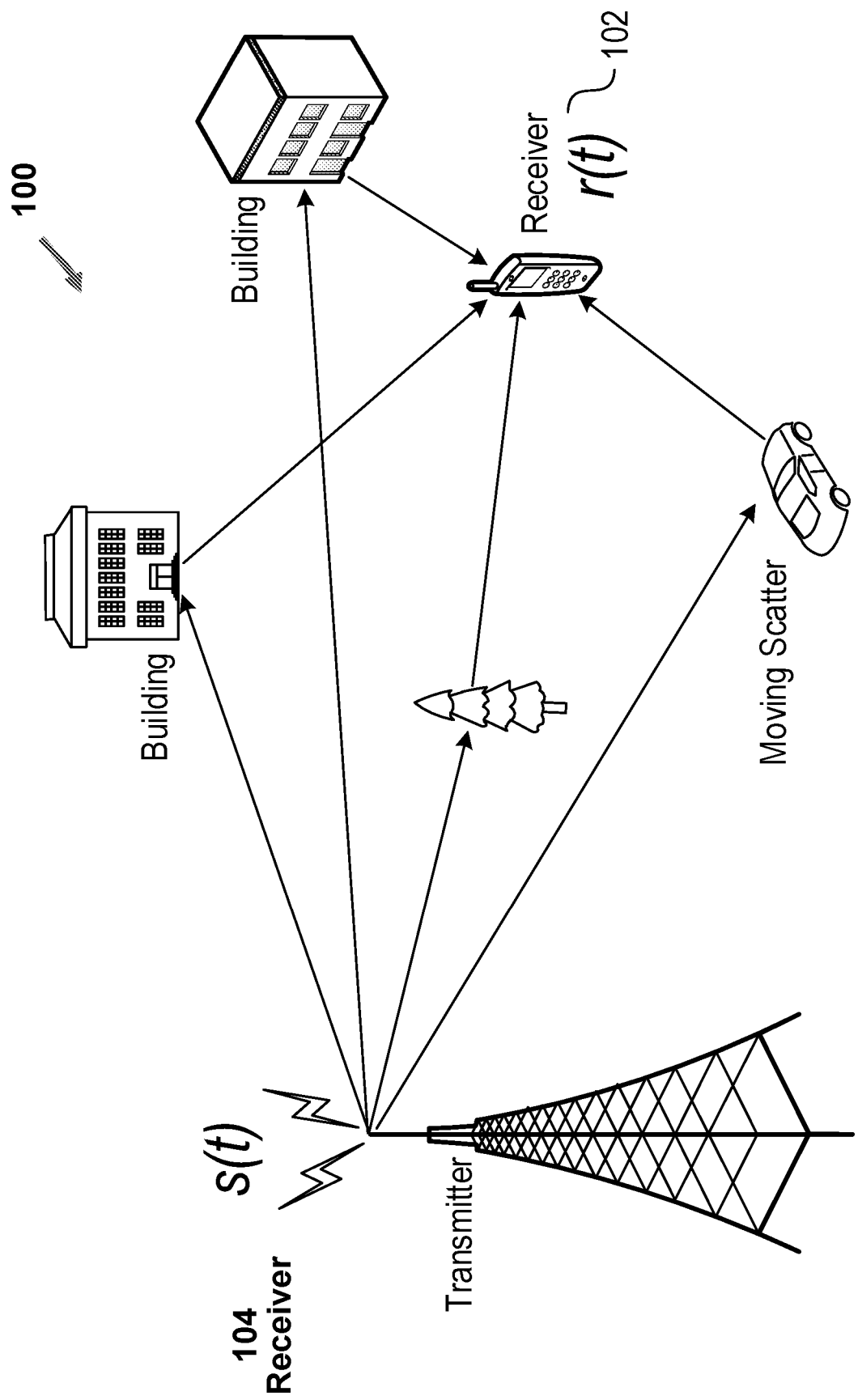
FIG. 1A shows an example communication network.

FIG. 1A shows an example of a wireless communication system 100 in which a transmitter device 102 transmits signals to a receiver 104. The signals may undergo various wireless channels and multipaths, as depicted. Some reflectors such as buildings and trees may be static, while others such as cars, may be moving scatterers. The transmitter device 102 may be, for example, a user device, a mobile phone, a tablet, a computer, or another Internet of Things (IoT) device such as a smartwatch, a camera, and so on. The receiver device 104 may be a network device such as the base station. The signals transmitted from the base station to the transmitter 102 may experience similar channel degradations produced by static or moving scatterers. The techniques described in the present document may be implemented by the devices in the wireless communication system 100. The terms "transmitter" and "receiver" are simply used for convenience of explanation and, as further described herein, depending on the direction of transmission (uplink or downlink), the network station may be transmitting or receiving and user device may be receiving or transmitting.

Figure 1B:
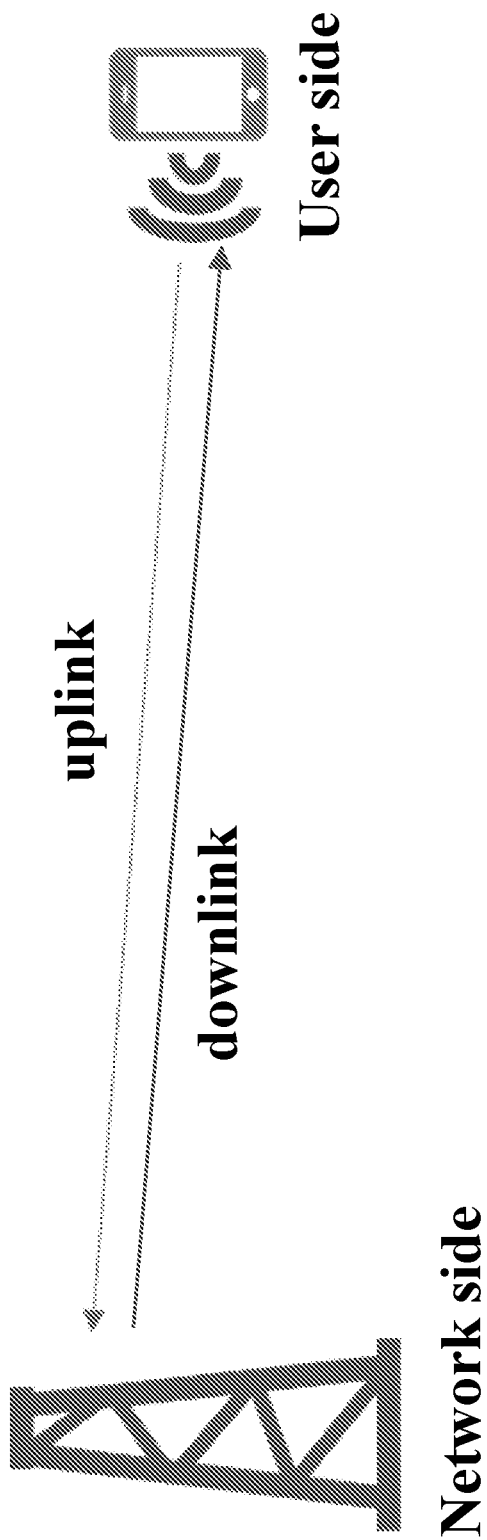
FIG. 1B shows a simplified example of a wireless communication system in which uplink and downlink transmissions are performed.

FIG. 1B shows a simplified wireless network to highlight certain aspects of the disclosed technology. A transmitter transmits wireless signals to a receiver in the wireless network. Some transmissions in the network, variously called as downlink or downstream transmissions, a network-side node such as a base station acts as a transmitter of wireless signals and one or more user devices act as the receiver of these wireless signals. For some other transmissions, as depicted in FIG. 1B, the direction of transmission may be reversed. Such transmissions are often called uplink or upstream transmissions. For such transmissions, one or more user devices act as transmitters of the wireless signals and a network-side node such as the base station acts as the receiver of these signals (as depicted in FIG. 1B). Other type of transmissions in the network may include device-to-device transmissions, sometimes called direct or sideband transmissions. While the present document primarily uses the terms "downlink" and "uplink" for the sake of convenience, similar techniques may also be used for other situations in which transmissions in two directions are performed—e.g., inbound or incoming transmissions that are received by a wireless device and outbound or outgoing transmissions that are transmitted by a wireless device. For example, downlink transmissions may be inbound transmissions for a user device, while outbound transmissions for a network device. Similarly, uplink transmission may be inbound transmissions for a network device while outbound transmissions from a wireless device. Therefore, for some embodiments, the disclosed techniques may also be described using terms such as "inbound" and "outbound" transmission without importing any 3GPP-specific or other wireless protocol-specific meaning to the terms "uplink" and "downlink."

In frequency division multiplexing (FDM) networks, the transmissions to a base station and the transmissions from the base station may occupy different frequency bands (each of which may occupy continuous or discontinuous spectrum). In time division multiplexing (TDM) networks, the transmissions to a base station and the transmissions from the base station occupy a same frequency band but are separated in time domain using a TDM mechanism such as time slot based transmissions. Other types of multiplexing are also possible (e.g., code division multiplexing, OTFS multiplexing, spatial multiplexing, etc.). In general, the various multiplexing schemes can be combined with each other. For example, in spatially multiplexed systems, transmissions to and from two different user devices may be isolated from each other using directional or orientational difference between the two end points (e.g., the user devices and a network station such as a base station).

3. Brief Introduction to Orthogonal Time Frequency Space (OTFS) Modulation

The OTFS method is based at least in part upon the realization that in many cases various advantages may accrue from spreading the data of a single symbol over multiple time-spreading intervals shared with other symbols. In contrast with prior art modulation techniques, the OTFS method may involve convolving a single data symbol over both a plurality of time slots, a plurality of frequencies or spectral regions (spread spectrum), and a plurality of spectral shapes. This approach to data convolution results in superior performance over impaired communications links.

In one aspect, and as is indicated below by Equation (1), the OTFS method recognizes that a wireless channel may be represented as a weighted superposition of combination of time and Doppler shifts:

$$h^a(\varphi)(t) = \sum_{\tau,u} a(\tau, u) e^{j2\pi u t} \varphi(t + \tau) \qquad (1)$$

In contrast to parameters associated with existing channel models, the time-frequency weights (τ, u) of Equation (1) are two-dimensional and are believed to fully characterize the wireless channel. The time-frequency weights (τ, u) are intended to represent essentially all of the diversity branches existing in the wireless channel. This is believed to substantially minimize the fading effects experienced by the OTFS system and other communication systems generally based upon two-dimensional channel models relative to the fading common in systems predicated upon one-dimensional models. Finally, in contrast to the non-stationary, one-dimensional channel models employed in conventional communication systems, the time-frequency weights (τ, u) of Equation (1) are substantially stationary; that is, the weights change very slowly relative to the time scale of exemplary embodiments of the OTFS system.

Use of the two-dimensional channel model of Equation (1) in embodiments of the OTFS communication system affords a number of advantages. For example, use of the channel model of Equation (1) enables both channel multipath delay and Doppler shift to be accurately profiled simultaneously. Use of this model and the OTFS modulation techniques described herein also facilitate the coherent assembly of channel echoes and the minimization of fading phenomena, since every symbol experience substantially all of the diversity branches present within the channel. Given that the two-dimensional channel model is essentially stationary, every symbol is deterministically distorted (smeared) according to substantially the same two-dimensional pattern. This stable, accurate characterization of the communication channel in two dimensions on an ongoing basis further enables the OTFS system to minimize data distortion by "customizing" how each bit is delivered across the channel. Finally, use of a two-dimensional channel model enables effective signal separation by decoupling and eliminating mutual interference between multiple sources.

Figure 2:
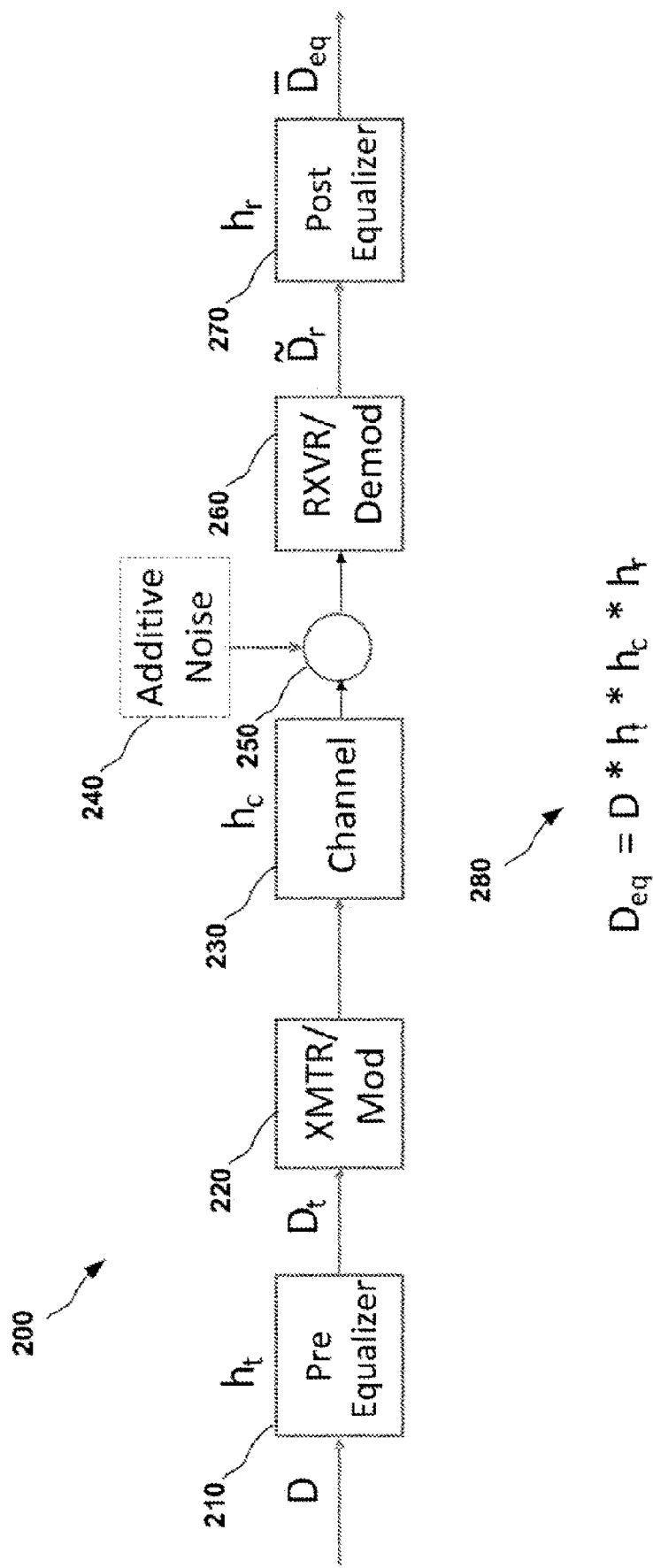
FIG. 2 shows an example mathematical model used to model communication in the wireless communication system of FIG. 1A.

FIG. 2 illustrates an example of a mathematical model 200 that can be used to model time/frequency selective fading. A transmit side of the model 200 includes a pre-equalizer 210, a transmitter/modulation component 220, a channel model 230, and additive noise 240 which is combined with the transmitted signal via a summer 250. A receive side of the model 200 includes a receiver/demodulator 260 and a post equalizer 270.

The pre-equalizer 210 is used to model a pre-distortion transfer function $h_t$ that can be used to make up for changing channel conditions in the channel model $h_c$ based on feedback received over the channel from the receive side of the model, as determined by measurements made by the receiver/demodulator 260 and/or the post equalizer 270. The transmitter/modulator 220 uses modulation schemes described herein to transmit the data over the channel 230.

The receiver/demodulator 260 demodulates the signal received over the channel 230. The received signal has been distorted by time/frequency selective fading, as determined by the channel transfer function $h_c$, and includes the additive noise 240. The receiver/demodulator 260 and the post equalizer 270 utilize methods discussed herein to reduce the distortion caused by the time/frequency selective fading and additive noise due to the channel conditions. The mathematical model 200 can be used to determine the nature of the equalized data $D_{eq}$ by performing a mathematical combination of three transfer functions operating on the original data D. The three transfer functions include the transmitter transfer function $h_t$, the channel transfer function $h_c$ and the equalizer transfer function $h_r$.

Embodiments of the OTFS methods and systems described herein are based, in part, upon the realization that spreading the data for any given symbol over time, spectrum, and/or spectral shapes in the manner described herein yields modulated signals which are substantially resistant to interference, particularly interference caused by Doppler effects and multi-path effects, as well as general background noise effects. Moreover, the OTFS method is believed to require less precise frequency synchronization between receiver and transmitter than is required by existing communication systems (e.g., OFDM systems).

In essence, the OTFS method convolves the data for a group of $N^2$ symbols (herein called a "frame") over both time, frequency, and in some embodiments spectral shape in a way that results in the data for the group of symbols being sent over a generally longer period of time than in prior art methods. Use of the OTFS method also results in the data for any given group of symbols being accumulated over a generally longer period of time than in prior art methods. However, in certain embodiments the OTFS method may nonetheless enable favorable data rates to be achieved despite the use of such longer transmission periods by exploiting other transmission efficiencies enabled by the method. For example, in one embodiment a group of symbols may be transmitted using the same spread-spectrum code. Although this could otherwise result in confusion and ambiguity (since each symbol would not be uniquely associated with a code), use of the OTFS method may, for example, enable the symbols to be sent using different (but previously defined) spread-spectrum convolution methods across a range of time and frequency periods. As a consequence, when all of the data corresponding to the symbols is finally accumulated within the receiver, the entire frame or group of symbols may be reconstructed in a manner not contemplated by prior art techniques. In general, one tradeoff associated with the disclosed approach is that either an entire multi-symbol frame of data will be correctly received, or none of the frame will be correctly received; that is, if there is too much interference within the communication channel, then the ability to successfully deconvolve and retrieve multiple symbols may fail. However, as will be discussed, various aspects of the OTFS may mitigate any degradation in performance which would otherwise result from this apparent trade-off.

Using an OTFS model of a channel, a channel can be modeled using a small set of dominant reflectors. Such a representation of the channel provides a concise and robust channel representation that is mathematically less complex (compared to traditional channel acquisition techniques). Furthermore, use of second order statistics allowed for prediction of channel at a different (future) time, or in a different frequency band, based on delay-Doppler domain modeling of a channel. Such a compact model thus allows for robust acquisition, estimation and prediction of channel.

One advantageous aspect of OTFS is the use of second order statistics for channel representation allows for a stationary channel model that does not need to be changed frequently. In some embodiments, a channel may be modeled into a stationary portion and a non-stationary portion that is updated on an occasional basis. Such a model reduced the bandwidth overhead of reference signal and/or feedback signal transmissions. Put differently, the channel state information (CSI) remains relatively static and required less frequent updates than conventional 4G or 5G New Radio (NR) technology.

As further described in the present document, OTFS waveform allows for spreading of information bits across different delay and/or Doppler values, and therefore provides mathematical ability to be invariant to mobility. Furthermore, signal precoding in delay-Doppler domain may be used to further achieve efficiency of transmission.

Other advantages of OTFS technology include:

Low Complexity—this may be achieved due to efficient channel modeling (sparse channel representation) that requires infrequent updates Scheduling—channel characteristics in a different frequency band or at a future time can be predicted with high accuracy, thereby allowing accurate scheduling, including, for example, centralized scheduling in a cooperative network.

Scalable Pairing—user devices may be paired for transmission using scalable transmissions (e.g., beamforming)

Large Number of users & Number of Layers—the use of OTFS based spectral shaping in spatial domain allows for a compact communication scheme that accommodates a large number of user devices.

Backward compatibility—Several of the channel estimation techniques can work without the need of an explicit feedback for spatial multiplexing and therefore can be implemented in networks that include legacy or previous generation device.

Co-existence 4G & 5G—OTFS spectrum can be transmitted using an orthogonal frequency division multiplexing (OFDM) scheme and be made compatible with conventional 4G and 5G technologies.

Cloud-RAN Architecture—due to the ability of OTFS to perform channel estimation using a sparse channel representation and the ability to predict future channels, the channel estimation can be made robust to computational delays. This lends itself to be able to operate a cloud based channel estimation/precoding/scheduling of a radio access network (RAN), in which the backhaul delays for communication of channel estimates do not impact system performance.

Scheduler disaggregation—for a similar reason as above, the scheduling function of a network of cellular communication cells can be controlled using a scheduler that is disaggregated from a base station function (radio access) and can be implemented in the cloud.

Joint scheduling and Coordinated multisite—as described above, the joint scheduling of cells using a disaggregated or a cloud based scheduler allows for efficient use of spectrum within a cell and more particularly in overlapping areas of different cells.

Analytics—the cloud-based architecture that collects channel state feedback from different user devices in different cells allows for generation of analytics in which user device locations, network topology and other information about a network can be extracted for further robust operation of a wireless network.

CoMP—Cooperative Multi-Point operation of base stations is possible using the above-described scheduler aggregation and cloud-RAN techniques.

Figure 3:
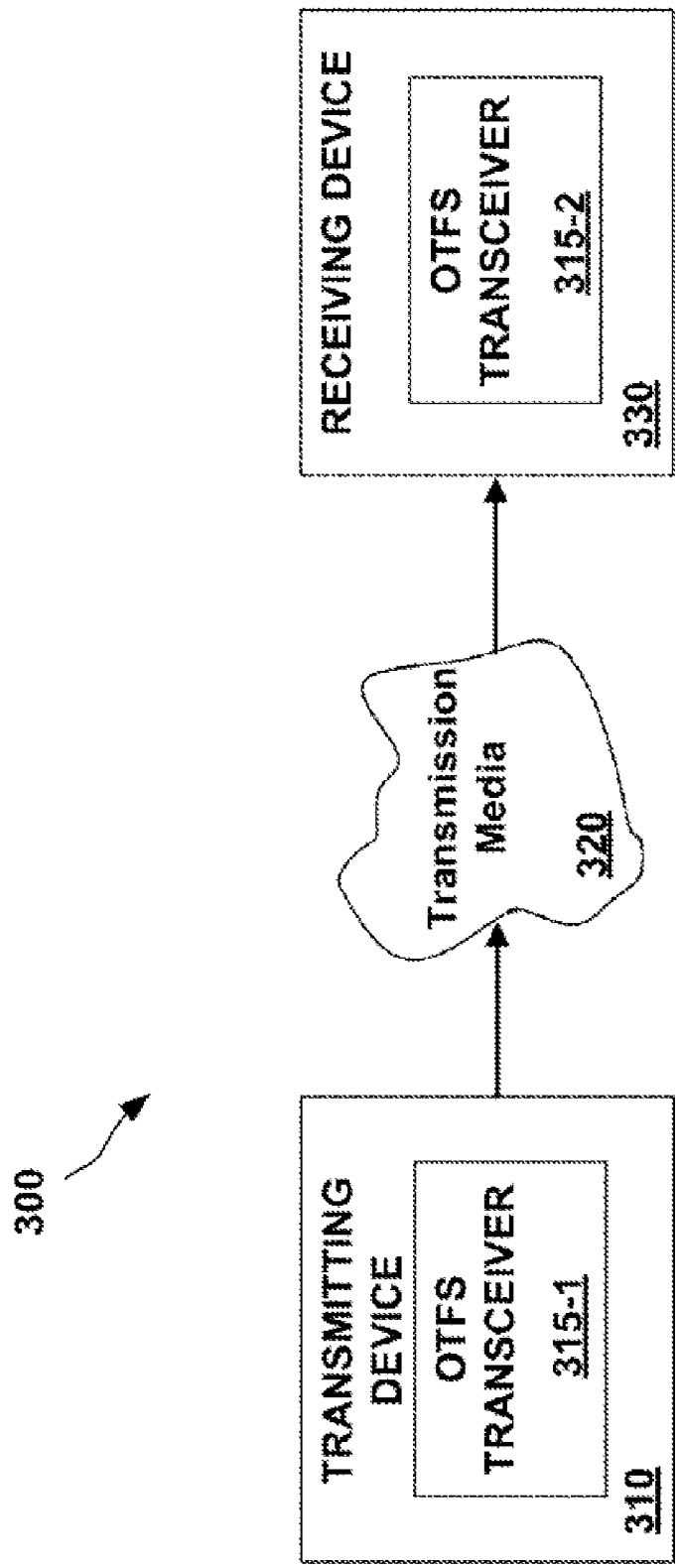
FIG. 3 shows an example block diagram of an OTFS communication system.

FIG. 3 is a block diagram of components of an exemplary OTFS communication system 300. As shown, the system 300 includes a transmitting device 310 and a receiving device 330. The transmitting device 310 and the receiving device 330 include first and second OTFS transceivers 315-1 and 315-2, respectively. The OTFS transceivers 315-1 and 315-2 communicate, either unidirectionally or bidirectionally, via communication channel 320 in the manner described herein. Although in the exemplary embodiments described herein the system 300 may comprise a wireless communication system, in other embodiments the communication channel may comprise a wired communication channel such as, for example, a communication channel within a fiber optic or coaxial cable. As was described above, the communication channel 320 may include multiple pathways and be characterized by time/frequency selective fading.

Figure 4:
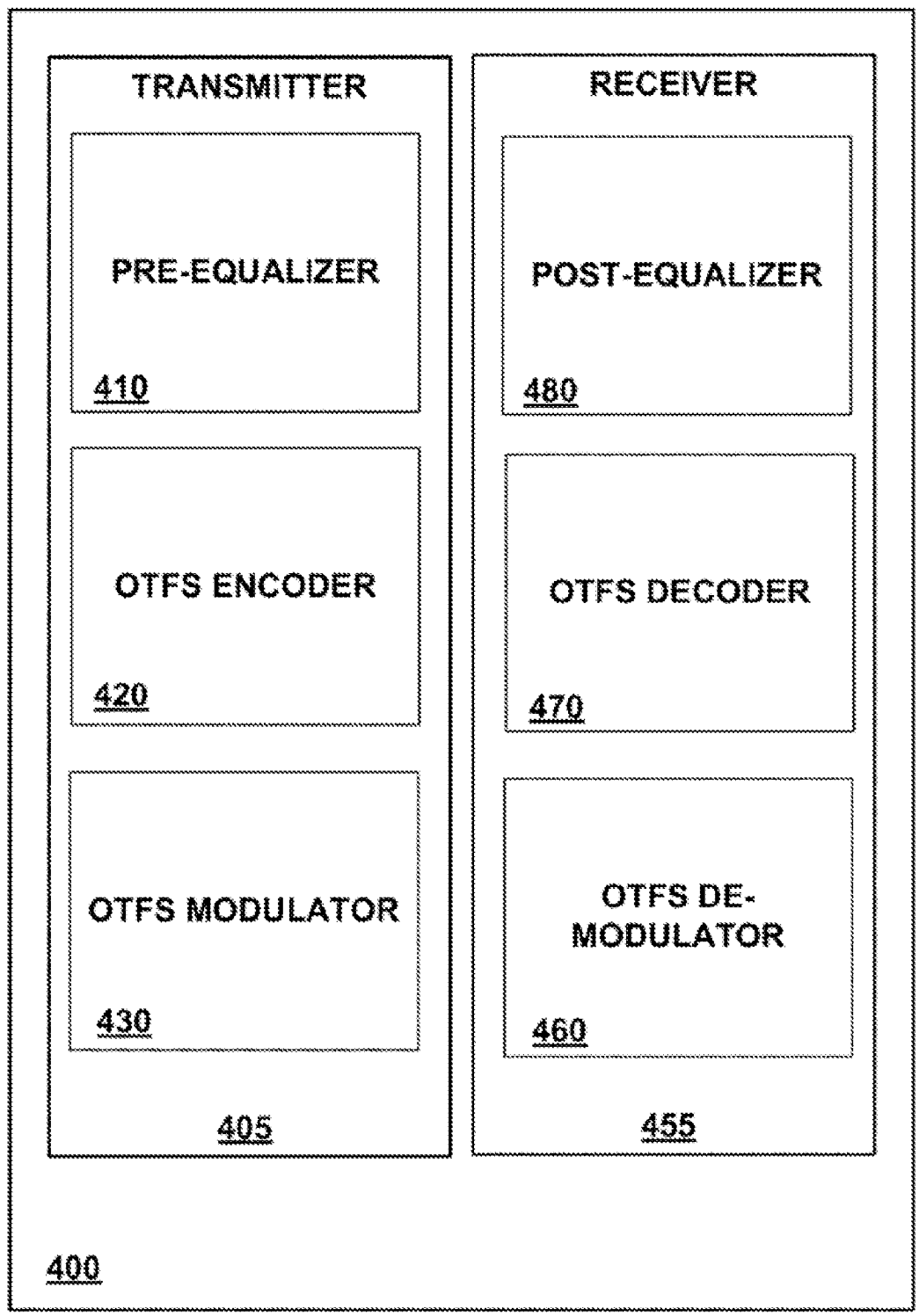
FIG. 4 illustrates components of an example OTFS transceiver.

FIG. 4 illustrates components of an exemplary OTFS transceiver 400. The OTFS transceiver 400 can be used as one or both of the exemplary OTFS transceivers 315 illustrated in the communication system 300 of FIG. 3. The OTFS transceiver 400 includes a transmitter module 405 that includes a pre-equalizer 410, an OTFS encoder 420 and an OTFS modulator 430. The OTFS transceiver 400 also includes a receiver module 455 that includes a post-equalizer 480, an OTFS decoder 470 and an OTFS demodulator 460. The components of the OTFS transceiver may be implemented in hardware, software, or a combination thereof. The disclosed OTFS methods will be described in view of the various components of the transceiver 400. In some embodiments, the receiver module 455 may be configured to implement iterative equalization and decoding (e.g., as described in Sections 10 and 11).

In one aspect a method of OTFS communication involves transmitting at least one frame of data ([D]) from the transmitting device 310 to the receiving device 330 through the communication channel 320, such frame of data comprising a matrix of up to $N^2$ data elements, N being greater than 1. The method comprises convolving, within the OTFS transceiver 315-1, the data elements of the data frame so that the value of each data element, when transmitted, is spread over a plurality of wireless waveforms, each waveform having a characteristic frequency, and each waveform carrying the convolved results from a plurality of said data elements from the data frame [D]. Further, during the transmission process, cyclically shifting the frequency of this plurality of wireless waveforms over a plurality of times so that the value of each data element is transmitted as a plurality of cyclically frequency shifted waveforms sent over a plurality of times. At the receiving device 330, the OTFS transceiver 315-2 receives and deconvolves these wireless waveforms thereby reconstructing a replica of said at least one frame of data [D]. In the exemplary embodiment the convolution process is such that an arbitrary data element of an arbitrary frame of data ([D]) cannot be guaranteed to be reconstructed with full accuracy until substantially all of these wireless waveforms have been transmitted and received.

Figure 5:
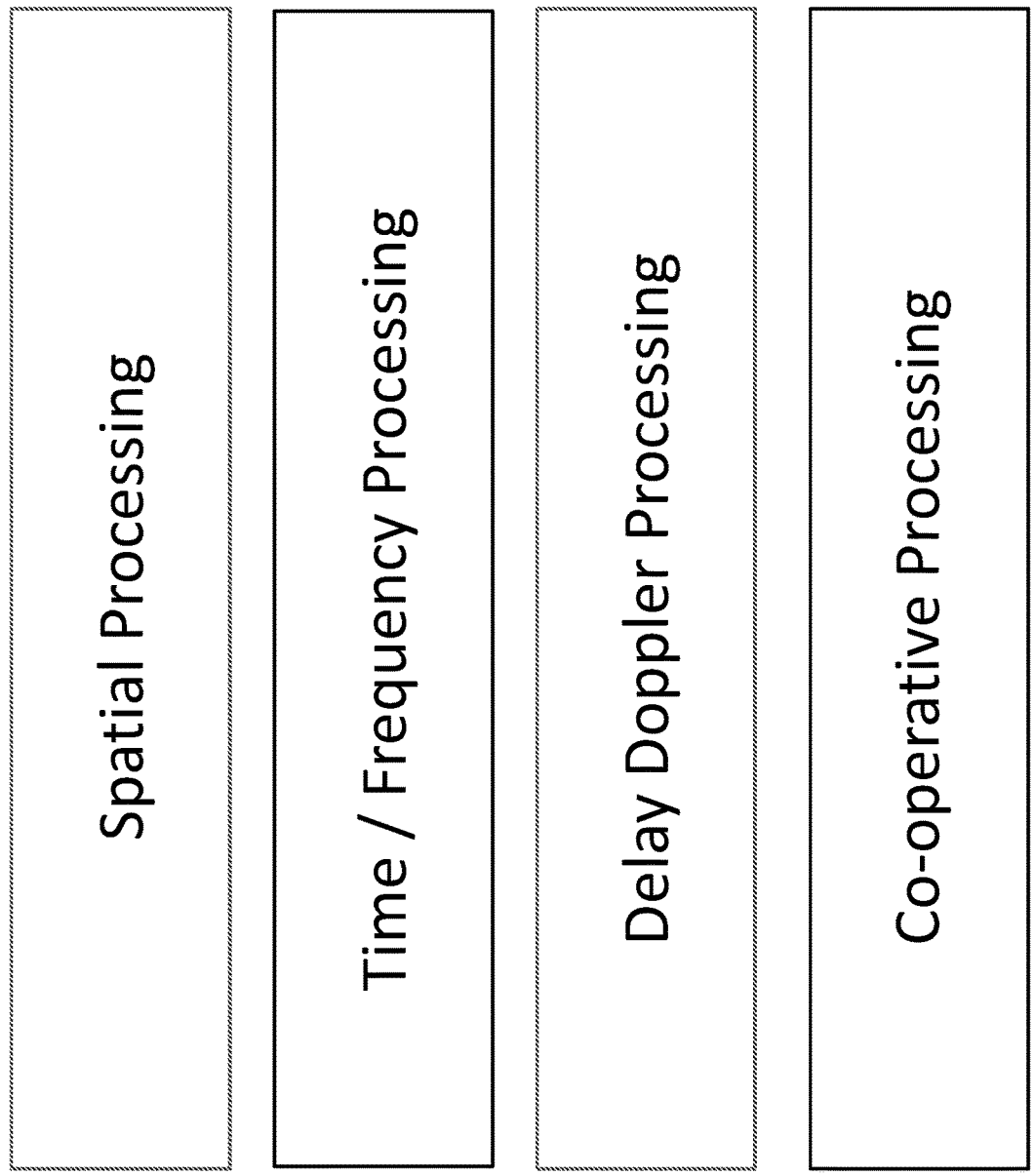
FIG. 5 depicts another example of an end-to-end wireless system implementation, at least partly using OTFS technology.

FIG. 5 depicts another example of an end-to-end wireless system implementation, at least partly using OTFS technology. As described herein, various beneficial aspects include enablement of cooperative processing, channel estimation/equalization in delay-Doppler domain, ability to provide additional control in time/frequency domain and spatial processing to form layered communication to increase density of devices in a cell.

An OTFS waveform is an efficient way of transmitting data on a wireless channel. Generating an OTFS waveform is based on a two-dimensional delay-Doppler pulse, which may be described as a (twisted) convolution of two orthogonal pulses, $\rho_\tau$ on delay and $\rho_v$ Doppler:

$$\rho = \rho_\tau * \rho_v \quad (2)$$

In this document, we discuss pulse shaping methods for $\rho_\tau$ and $\rho_v$, in OTFS systems.

4. Mathematical Description of an OTFS Waveform

An OTFS data frame is allocated on a delay-Doppler grid. Let us denote the number of Doppler elements by N and the number of delay elements by M. The grid spacing is $\Delta\tau$ and $\Delta v$ in delay and Doppler, respectively, with periods $\tau_p = M\Delta\tau$, where $\Delta\tau = 1/BW$ and $v_p = N\Delta v$, $\Delta v = 1/T$, where BW is the signal's bandwidth, T is the signal's duration and $\tau_p \cdot v_p = 1$.

Each data symbol (typically a quadrature amplitude modulation QAM symbol), x(n, m), where n=0, . . . , N−1 and M=0, . . . , M−1, is carried over a waveform called a Pulsone™ (a combination of a pulse train and a tone). The construction of a Pulsone™ is described as follows. Let $\delta_{qp}^{(n,m)}(t)$ be a quasi-periodic Dirac delta train for data symbol x(n, m), defined as:

$$\delta_{qp}^{(n,m)}(t) = x(n, m) \cdot \sum_{k=-\infty}^{\infty} e^{j2\pi n \Delta v k \tau_p} \delta(t - m\Delta\tau - k\tau_p) \quad (3)$$

$$= x(n, m) \cdot \sum_{k=-\infty}^{\infty} e^{j2\pi n k/N} \delta(t - \Delta\tau(m + kM)) \quad (4)$$

A Pulsone™ is generated by multiplying this modulated delta train by a time window function, $W_t$, which is the inverse Fourier transform of the Doppler pulse, $W_t = \mathcal{F}^{-1}\{\rho_v\}$, and then convolving it with a delay pulse, $\rho_\tau$:

$$\mathcal{P}^{(n,m)}(t) = \rho_\tau * [W_t \cdot \delta_{qp}^{(n,m)}(t)] \quad (5)$$

Figure 6:
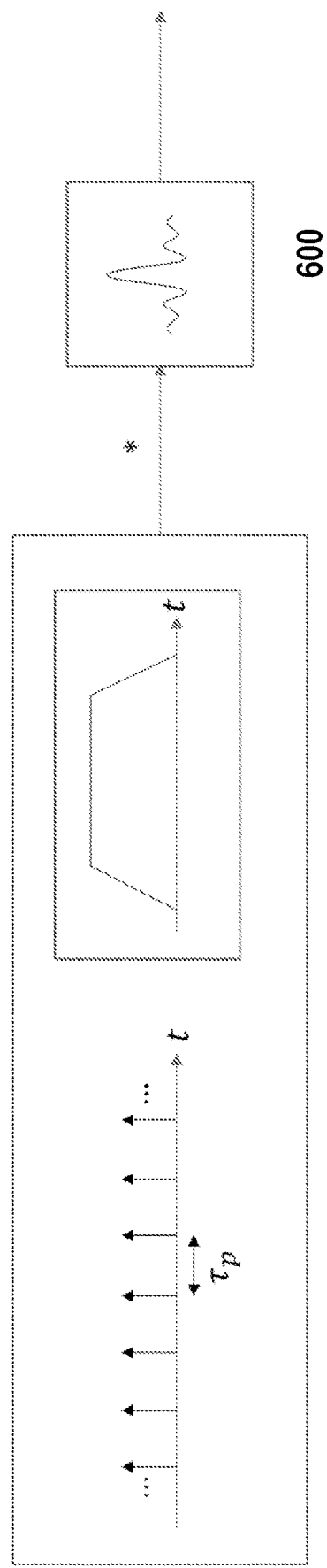
FIG. 6 depicts example waveforms in a Pulsone generation.

This concept is illustrated in FIG. 6. As shown in FIG. 6, from left to right, a delta train shown with time has the horizontal axis is passed through a time window of a certain shape and then convolved with a Doppler pulse (indicated by the * operation) to generate a desired delay-Doppler pulse 600.

For all the data symbols on the delay-Doppler grid, we can compute the OTFS waveform as:

$$OTFS(t) = \sum_{n=0}^{N-1} \sum_{m=0}^{M-1} \mathcal{P}^{(n,m)}(t) \quad (6)$$

Equivalently, we can first compute the delta train for all the data symbols and then apply the time window and delay pulse convolution:

$$\delta_{qp}(t) = \sum_{n=0}^{N-1} \sum_{m=0}^{M-1} \delta_{qp}^{(n,m)}(t) \quad (7)$$

$$OTFS(t) = \rho_\tau * [W_t \cdot \delta_{qp}(t)] \quad (8)$$

The signals described in this document may be represented by describing the waveforms in the time domain, in the frequency domain, or in the delay-Doppler domain (e.g., Zak domain). Because these three represent three different ways of describing the signals, signal in one domain can be converted into signal in the other domain via a transform. For example, a time-Zak transform may be used to convert from Zak domain to time domain. For example, a frequency-Zak transform may be used to convert from the Zak domain to the frequency domain. For example, the Fourier transform (or its inverse) may be used to convert between the time and frequency domains.

In signal processing, it is traditional to represent signals (or waveforms) either in time or in the frequency domain. Each representation reveals different attributes of the signal. The dictionary between these two realizations is the Fourier transform:

$$FT: L_2(t \in \mathbb{R}) \to L_2(f \in \mathbb{R})$$

$$\varphi(\tau + n\tau_{r1}v + mv_r) = \exp(j2\pi n v \tau_r)\varphi(\tau, v),$$

Figure 7:
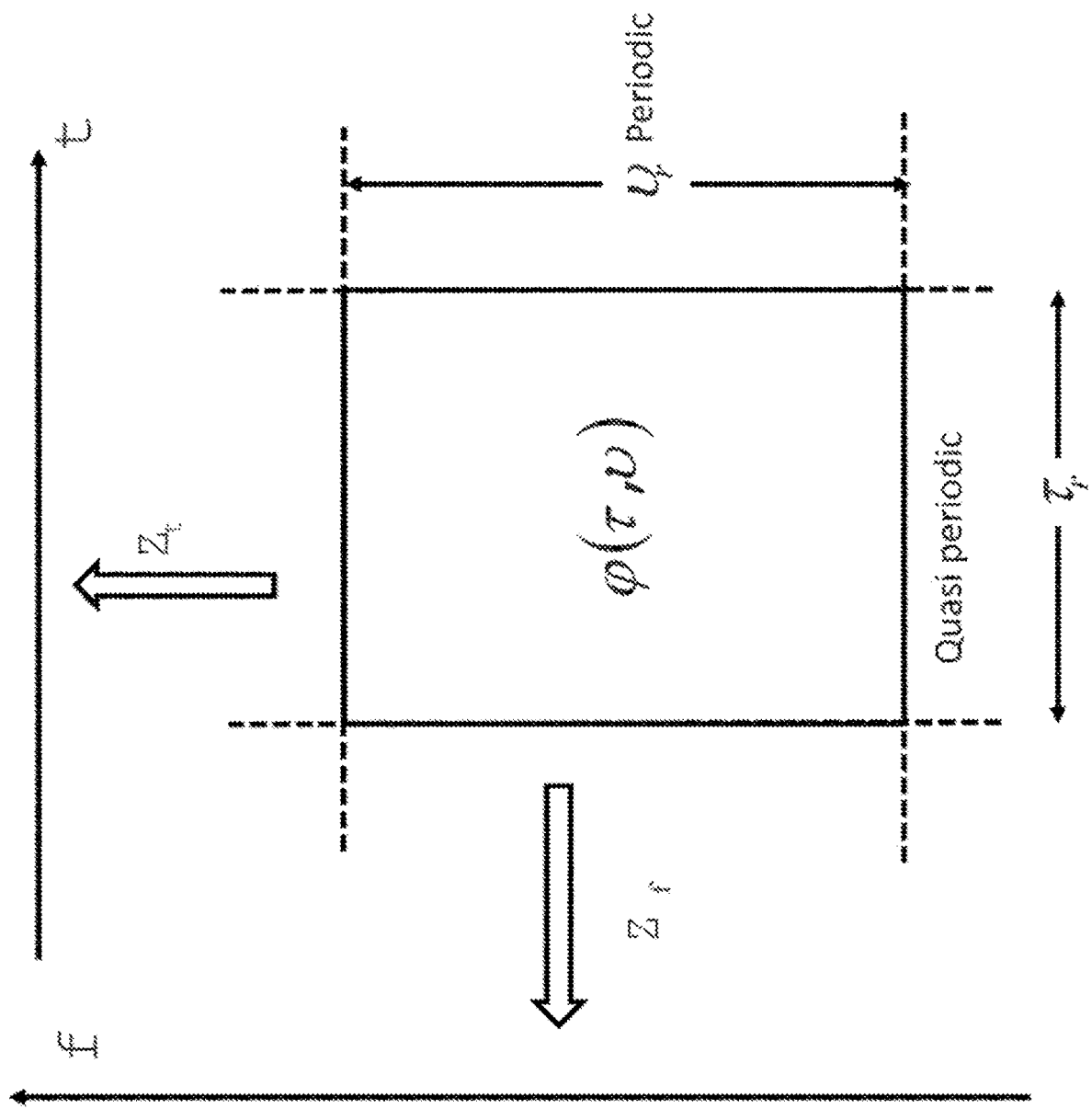
FIG. 7 depicts the relationship between the time, frequency, and Zak domains.

The periods are assumed to satisfy the Nyquist condition $\tau_r \cdot v_r = 1$. Zak domain signals are related to time and frequency domain signals through canonical transforms that are called the time and frequency Zak transforms. The time and frequency Zak transforms are principally geometric projections: the time Zak transform is integration along the Doppler variable and reciprocally the frequency Zak transform is integration along the delay variable. The different signal domains and the transformations connecting between them are depicted in FIG. 7.

Figure 8:
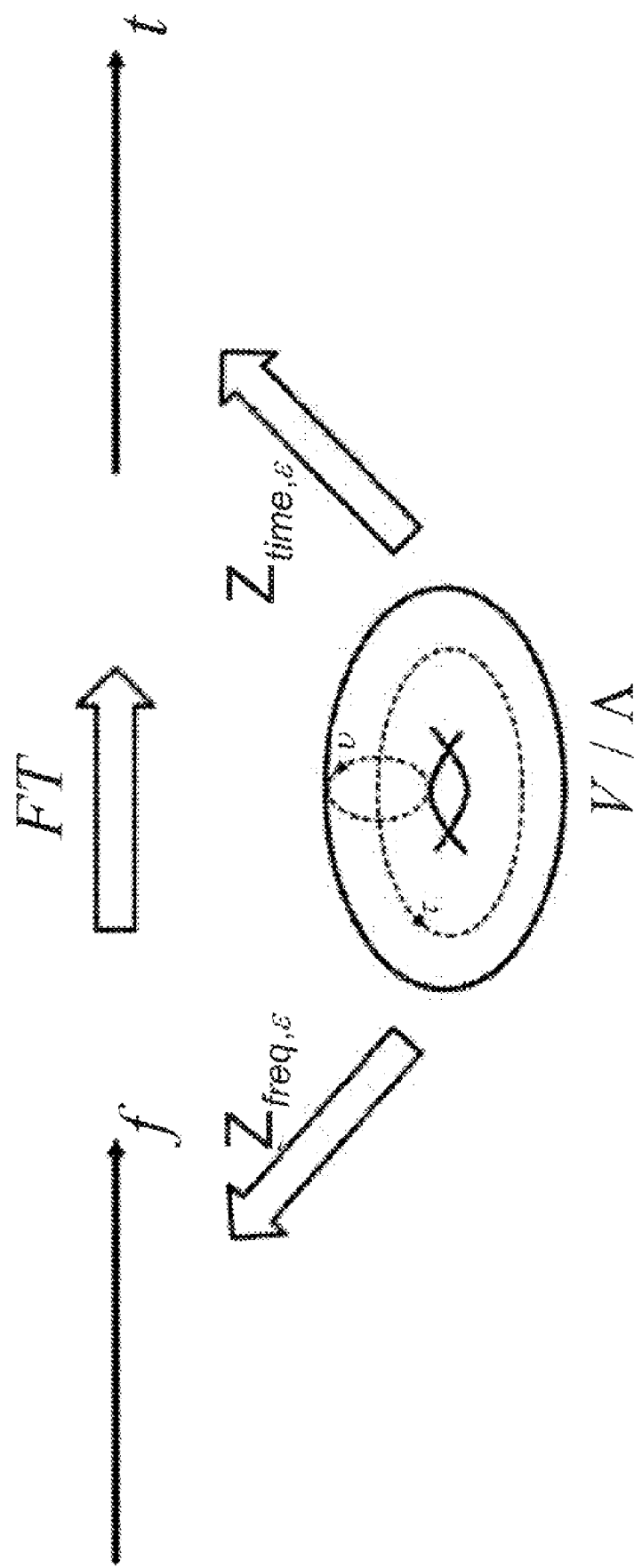
FIG. 8 pictorially depicts an example wherein the Zak domain and time/frequency Zak transforms realizing the signal space realization lie in between time and frequency realizations.

The Zak transform plays for OTFS the same role the Fourier transform plays for OFDM. For example, the time Zak transform is integration along the Doppler dimension (taking the DC component) for every point of time. Reciprocally, the frequency Zak transform is Fourier transform along the delay dimension. In other words, the pair of Zak trans-forms constitute a square root decomposition of the Fourier transform, reinforcing the interpretation of the Zak realization as residing between the time and the frequency realizations (see FIG. 8).

Figure 9:
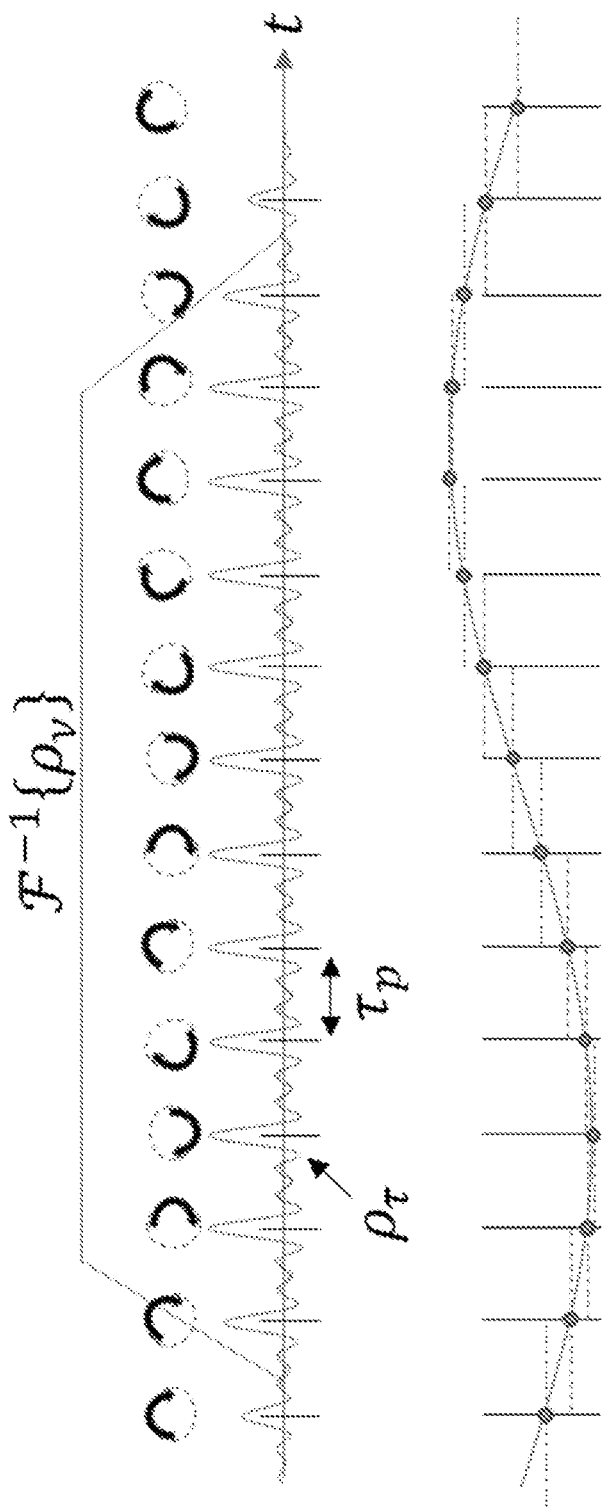
FIG. 9 shows an example of generation of a Pulsone waveform.

An example of an OTFS waveform in shown in FIG. 9. As depicted in the top waveform, the OTFS waveform includes a train of pulses separated in time by $\tau_p$ such that the phases of each subsequent pulse are rotated with respect to each other, as indicated by the curved arrows above each pulse. The lower graph shows a corresponding waveform.

After the interaction with the channel, the received OTFS signal, y, is processed in a reversed order to the transmitter. First it is convolved with a pulse, $\rho_\tau^{Rx}$, then it is multiped by a time window, $W_t^{Rx}$, and finally an inverse Zak transform is applied to the received data, to obtain the received delay-Doppler grid elements:

$$y' = W_t^{Rx} \cdot [\rho_\tau^{Rx} * y] \qquad (9)$$

$$\hat{y}(n, m) = \frac{1}{N} \sum_{k=-\infty}^{\infty} e^{-j2\pi n \Delta v k \tau_p} y'(t - m\Delta\tau - k\tau_p) =$$

$$\frac{1}{N} \sum_{k=-\infty}^{\infty} e^{-j2\pi n k / N} y'(t - \Delta\tau(m + kM))$$

5. Pulse Shaping an OTFS Waveform for Channel Estimation

Figures 10A, 10B:
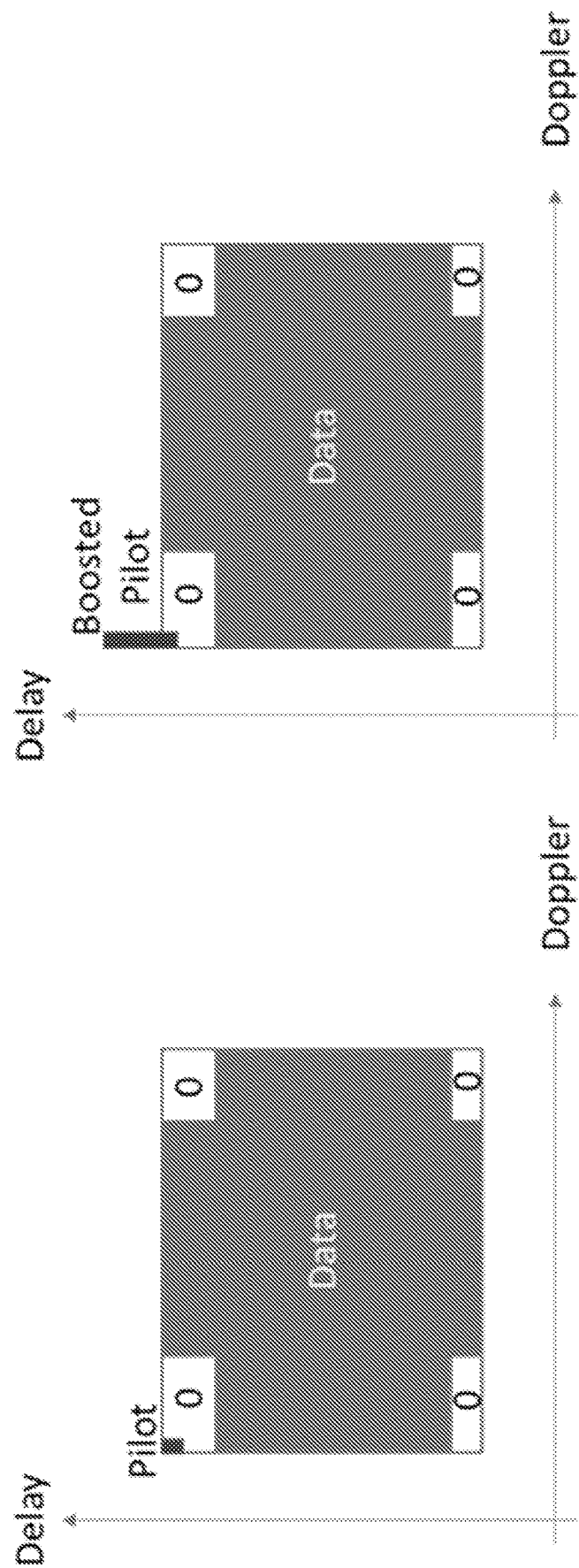
FIGS. 10A and 10B show examples of pilot symbols in a delay-Doppler plane.

An OTFS waveform may include a known reference signal for channel estimation, such as a known data symbol, called as a pilot symbol. Typically, the pilot symbol will be cyclically surrounded by empty grid elements (value of zero) that will be used at the receiver, as a channel estimation area and possibly a guard area from interfering data symbols. An example of such an arrangement is illustrated in FIG. 10A. In FIGS. 10A and 10B, a frame of transmission resources is depicted along the Delay (vertical) and Doppler (horizontal) dimensions. The corner regions "O" are reserved for pilot, however, in general, pilots may be inserted anywhere within the frame in a predetermined position known to both the transmitter-side and the receiver-side.

After the interaction of the waveform with a wireless channel, replicas of the pilot symbol (with a complex gain) will appear at the receiver in the channel estimation area (corresponding to the physical reflectors of the channel). Detection of these replicas forms a channel estimation and enables equalization of the received signal. However, at low Signal to Noise Ratios (SNR), it will be very difficult to distinguish between replicas of the pilot symbol and noise at the channel estimation area. For example, at 0 dB SNR, the strongest replica will have the same energy as the noise. Therefore, to enable adequate channel estimation, the power of the pilot symbol must be boosted, such that the pilot replicas can be detected in the presence of noise. Note, that in the creation of the waveform, the unassigned transmission power to the grid elements of the channel estimation area, may be used to boost the power of the pilot. For example, for a delay-Doppler grid with an average data symbol power of 1 and $N_{CE}$ grid elements reserved for channel estimation (including the pilot location), the pilot symbol may be assigned as:

$$\text{Pilot} = \sqrt{N_{CE}} \qquad (10)$$

An example of such an arrangement is illustrated in FIG. 10B.

Figure 11:
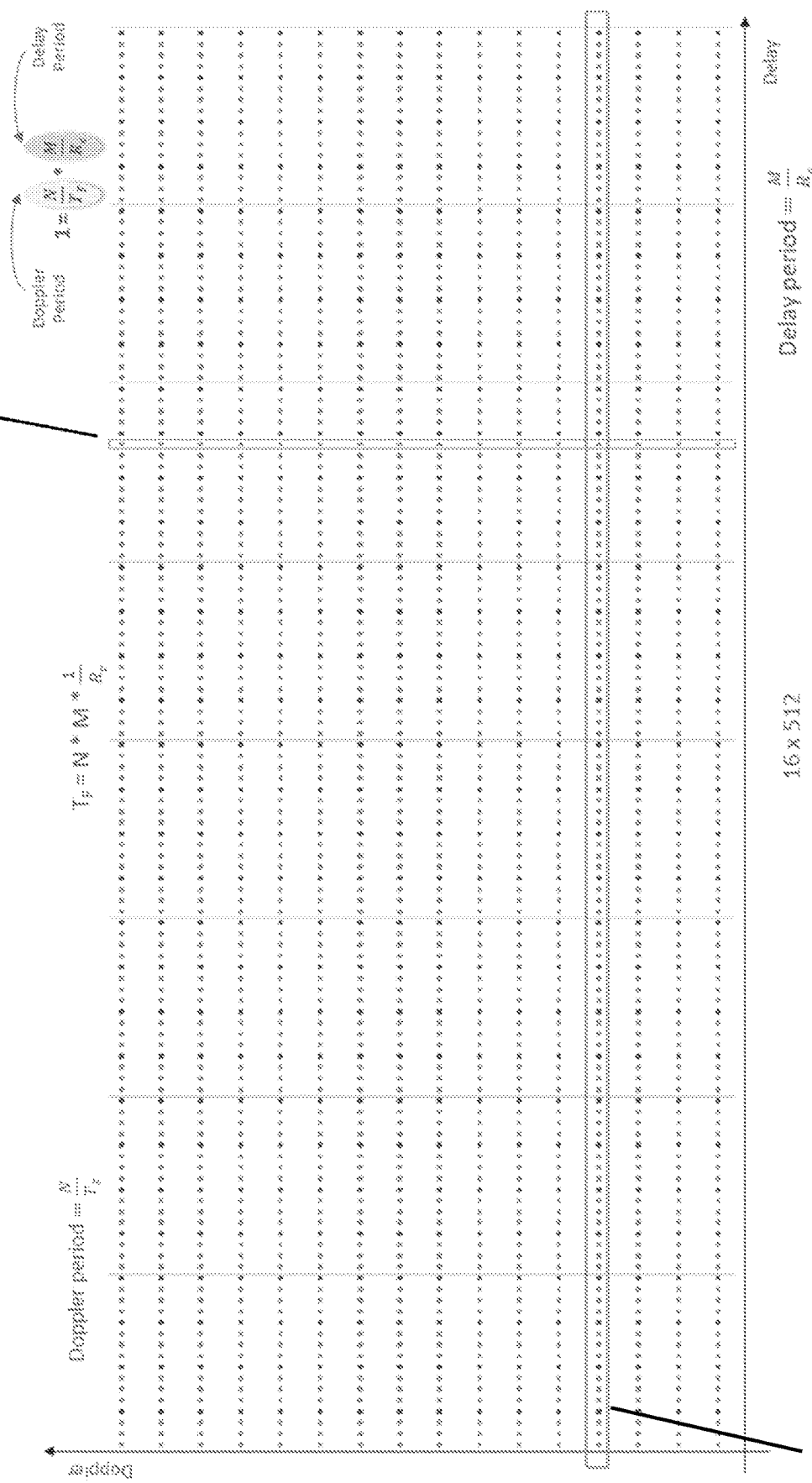
FIG. 11 shows an example of a delay-Doppler plan in which symbols that contain information bits rate show.

FIG. 11 shows an example of a delay-Doppler plane in which symbols that contain information bits are shown. In FIG. 11, the horizontal axis is the delay axis and the vertical axis is Doppler axis. Each dot in the graphs shows a modulation symbol that comprises information bits. One example of a symbol 1102 in the delay domain is shown by a tall rectangle that comprises all modulated bits having a same delay, but different Doppler values. Another example of a symbol 1104 in the Doppler domain is shown by a wide rectangle that comprises all modulated bits have a same Doppler value, but different delay values. The example depicted in FIG. 11 shows a delay-Doppler grid where N=16 (elements along Doppler direction) and M=512 (elements along delay direction). Here, delay resolution is reciprocal of channel bandwidth. The Doppler resolution is inversely proportional to the frame time used for the communication.

Figure 12:
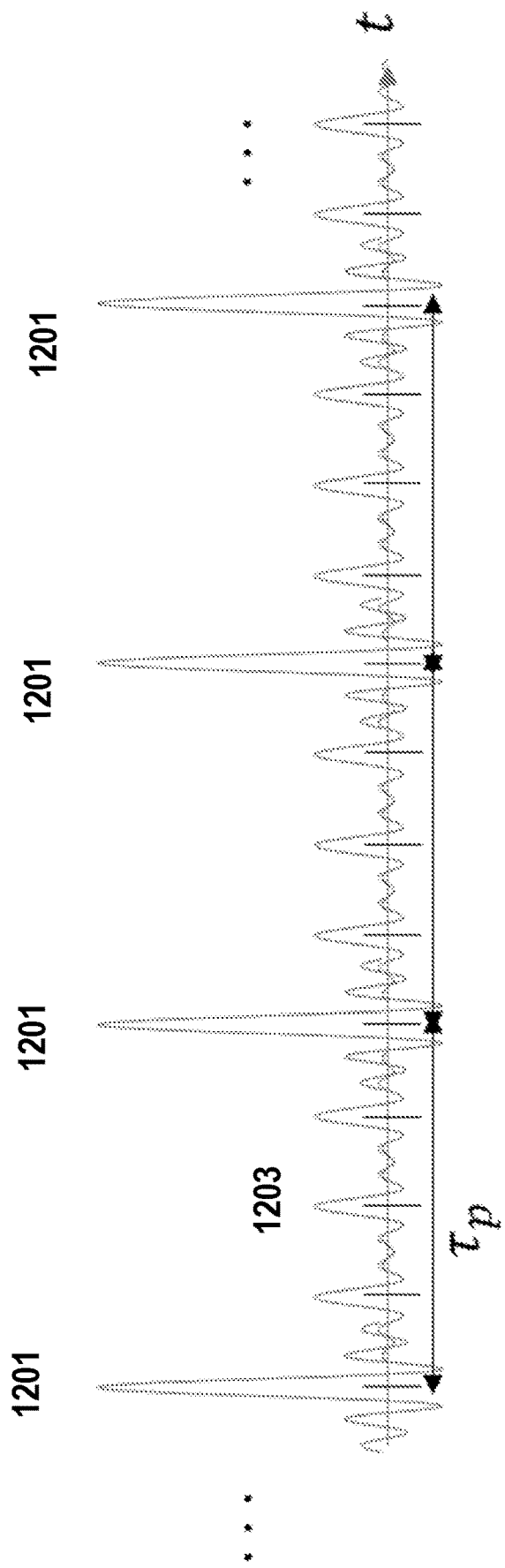
FIG. 12 shows another example of pilot symbols in a delay-Doppler plane.

If we examine the OTFS waveform, generated from a power-boosted pilot, we can see that the pulse train has a boosted pulse at a delay location corresponding to the location of the pilot, as seen in FIG. 12. This waveform suffers from a high Peak-to-Average-Power-Ratio (PAPR), which is undesirable. For example, in FIG. 12, the high peaks 1201 are shown to have an amplitude or signal power that is greater than the "typical" pulse peaks, e.g., 1203. Depending on run-time conditions and values of N and M, the high PAPR may amount to 6 to 12 dB greater than the nominal pulse power.

To reduce the PAPR, while keeping the power of the pilot boosted, the OTFS waveform must be spread over time. Unlike, the spread spectrum (or spread time) techniques, detailed in [2], this spreading does not extend the bandwidth or the duration of the OTFS waveform. One possible method to achieve this is to convolve the OTFS waveform with a spreading signal, such as a chirp. This is equivalent to convolving the delay pulse with a spreading signal, $\psi(t)$, resulting in a new combined delay pulse:

$$\rho_\tau^{spread} = \rho_\tau * \psi(t) \qquad (11)$$

Figure 13:
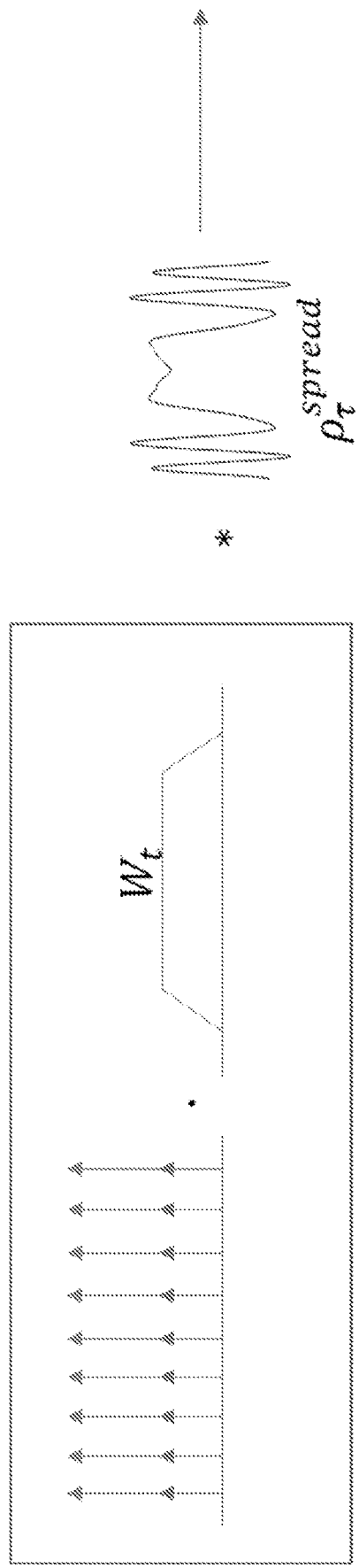
FIG. 13 shows an example of an orthogonal time frequency space (OTFS) waveform having a power-boosted pilot signal.

For example, a chirp spreading signal, $\psi(t)=e^{j2\pi a t^2}$, where a is a spreading constant, as shown in FIG. 13 (compared to FIG. 6). The bandwidth of the signal remains the same, but the data and pilot symbols are spread over the entire duration of the OTFS signal, resulting in a lower PAPR signal.

At the receiver, the inverse of the spreading signal is applied to regain the non-spread waveform. For example, a conjugated chirp signal is applied at the receiver. Afterwards, the receiver operations are the same. Alternatively, the receiver may use a combined pulse, $\rho_\tau^{spread,Rx}$ instead of $\rho_\tau^{Rx}$.

6. Pulse Shaping an OTFS Waveform for Coexistence

Spatial multiplexing (detailed in Section 12) enables coexistence of an OTFS waveform with other waveforms, where each waveform is carried by an orthogonal beam. However, the non-OTFS waveforms, may require from time to time to transmit broadcast information on a wide beam, which cannot be orthogonal to the OTFS beam. Such broadcast information may be synchronization signals or a control channel (such as 3GPP 5G NR, synchronization signal blocks SSB and physical downlink control channel PDCCH). To maintain coexistence in the presence of broadcast transmissions of other waveforms, the OTFS signal may be punctured in frequency, time or both for the bandwidth and duration of the broadcast signal.

With the appropriate pulse shaping design of the delay pulse or the Doppler pulse of the OTFS waveform, puncturing in frequency and/or time can be achieved. More specifically, to puncture a certain bandwidth where the OTFS signal is attenuated and does not interfere with other transmissions, the spectrum of the delay pulse, $\rho_\tau^{puncture}$ must have these spectral properties. Similarly, to puncture a certain period where the OTFS signal is attenuated and does not interfere with other transmissions, the time characteristics of the Doppler pulse, $\rho_v^{puncture}$ must have these properties.

As an example, we demonstrate spectrum puncturing by designing a delay pulse that punctures ¼ of the bandwidth at a normalized frequency offset of 0.2 (other values of these parameters may be used also). A broadcast signal transmitted in the frequency window, will coexist with the OTFS waveform. The delay pulse is a linear combination of two raised cosine pulses, parameterized by $\alpha$ the pulse roll-off, $\omega$ the relative bandwidth to be punctured and $\mu$ the relative frequency shift. Let us define:

$$\rho_\tau^1 = RasiedCosine(\tau, \alpha_\tau^1) \quad (12)$$

$$\rho_\tau^2 = RasiedCosine(\tau \cdot \omega, \alpha_\tau^2) \cdot e^{j2\pi\mu\tau} \quad (13)$$

$$\rho_\tau^{puncture} = \rho_\tau^1 - \omega \cdot \rho_\tau^2 \quad (14)$$

Figure 14:
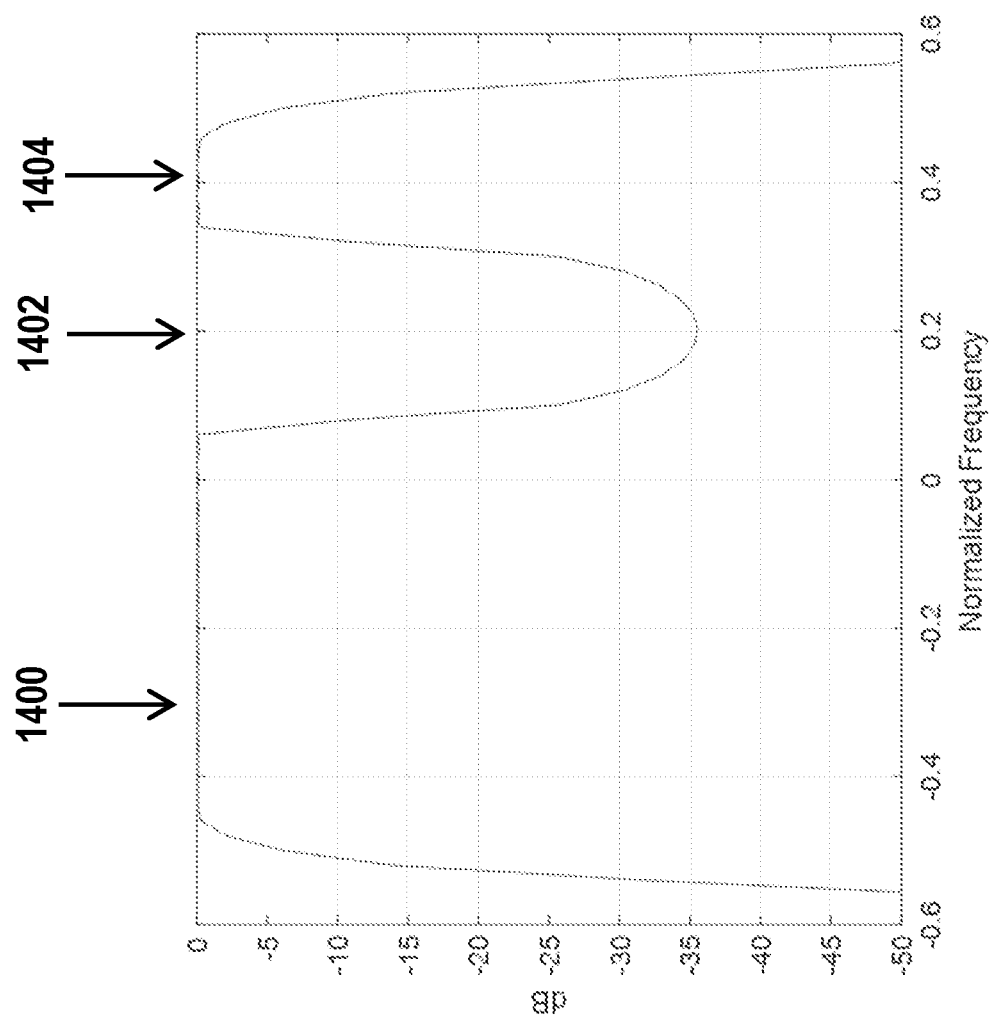
FIG. 14 pictorially depicts an example of spreading of a pulse signal.

When we assign: $\omega=\frac{1}{4}$, $\mu=0.2$, $\alpha_\tau^1=\alpha_\tau^2=0.1$, we get $\rho_\tau^{puncture}$ with a spectrum shown in FIG. 14. In FIG. 14, frequency portions 1400 and 1404 show examples of frequency portions used by OTFS waveform, while the frequency portion 1402 shows a frequency portion where the OTFS waveform power level is "sufficiently" attenuated to permit co-existence of another transmissions waveform. Here, the term "sufficiently" may mean that the OTFS waveform is attenuated below a certain threshold that allows transmission and reception of the other waveform with a certain performance (such as a target bit error rate). In the graph shown in FIG. 14, the attenuation threshold is approximately 20 dB. In various embodiments, the number K1 of OTFS frequency bands and the number K2 of attenuated portions may be different. FIG. 14 shows the example where K1=2 and K2=1. In various embodiments, the threshold may be a relative number that is relative to a maximum power in the passbands or may be a pre-specified fixed number and may depend on the desired signals transmissions in the "stopband" where OTFS waveform is attenuated.

An equivalent pulse design may be applied for the time window, for puncturing of the OTFS waveform in time. Note that puncturing does not mean that spreading cannot be applied. Both methods, described in this document, can be applied together for a combined pulse:

$$\rho_\tau^{spread,puncture} = \rho_\tau^{puncture} * \psi(t) \quad (15)$$

7. Embodiments of Pulse Shaping for Multi-Frame OTFS

Figure 15:
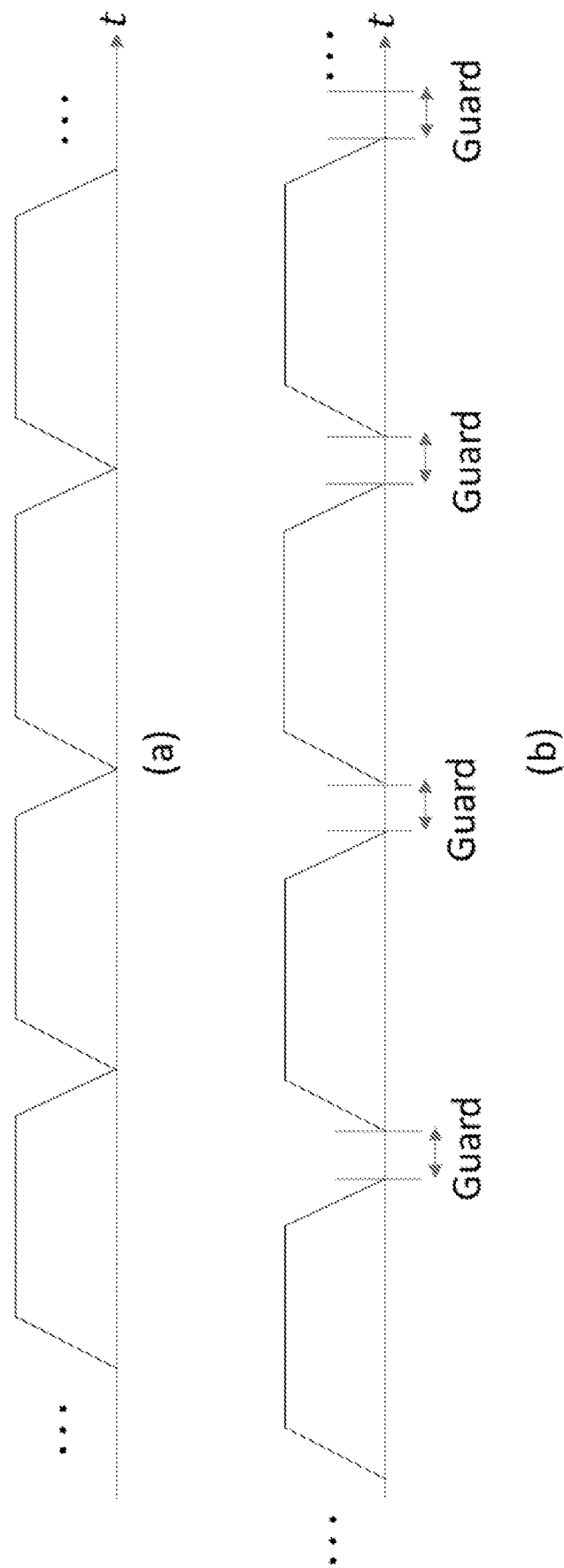
FIG. 15 shows an example of spectrum puncturing.

The Doppler pulse shape at the transmitter and receiver, or their time window equivalents, affects the packing of consecutive OTFS frames, similarly to how the spectrum of the delay pulse affects packing an OTFS channel with adjacent channels. For some Doppler pulses, a guard interval (typically at the order of the delay spread of the channel) may be required, as shown in FIG. 15. The top graph in FIG. 15 shows the example where frames are transmitted without any gaps, with the inter-frame separation (center to center gap separation of consecutive frames, $1/\Delta v$; where $\Delta v$; which is the separation of Doppler elements along the delay-Doppler grid). Compared to this, the lower graph shows a transmission where the inter-frame guard bands result in inter-frame separation that is greater than the graph (a) in FIG. 15.

Figure 16:
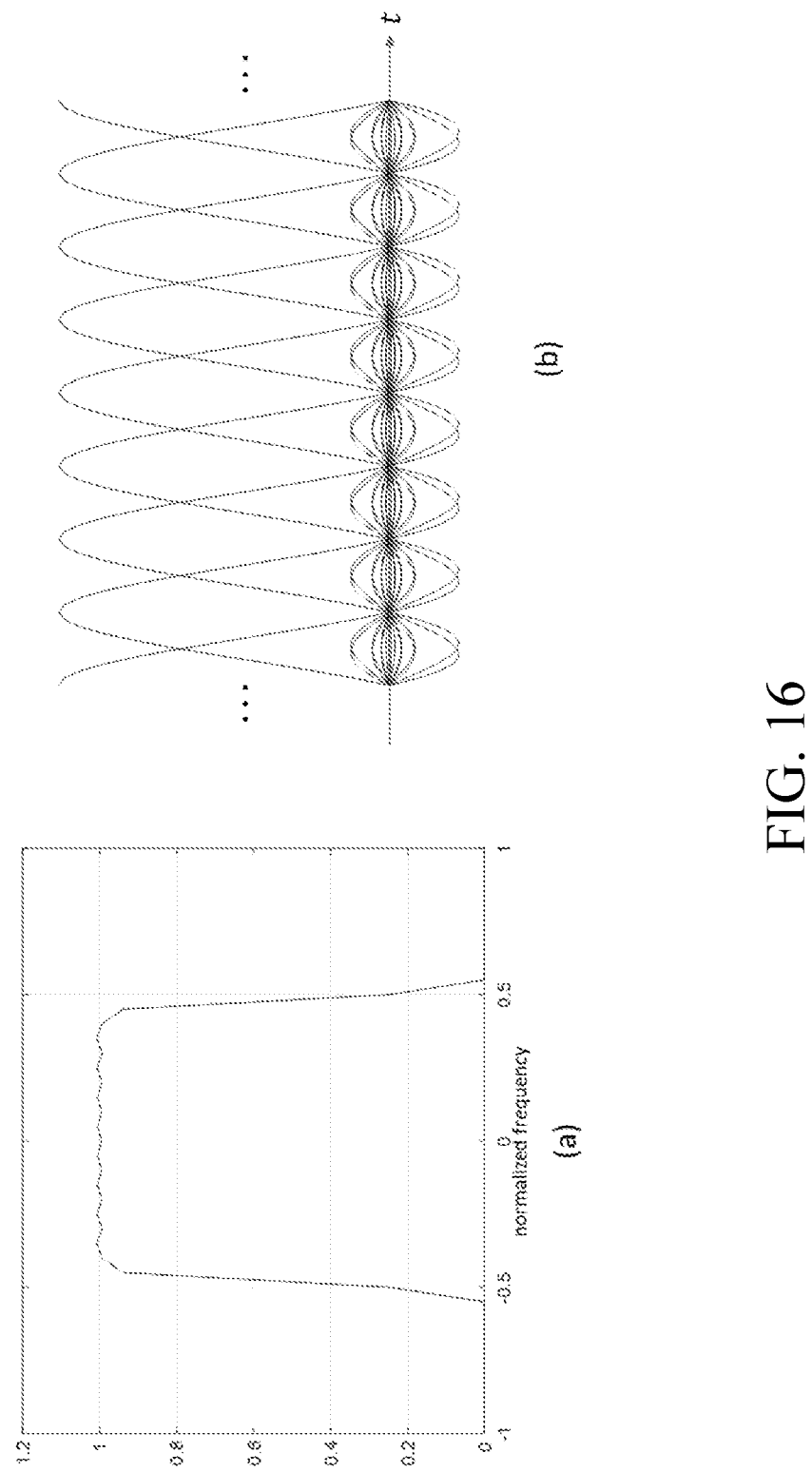
FIG. 16 shows an example of guard bands in an OTFS transmission.

The OTFS waveform may also be designed with Doppler pulses that are band-limited (such as the Fourier transform of a raised cosine pulse), as shown in FIG. 16. Here, horizontal axis is drawn with respect to normalized frequency units and vertical axis represents signal amplitude. These Doppler pulses have an infinite overlapping time windows, as illustrated in FIG. 16, right side graph (b).

It will be appreciated that the shape of the Doppler pulse affects the spacing of the OTFS frames. In implementations that use a bandlimited Doppler pulse, OTFS frames may be spaced every $T=1/\Delta v$ seconds. However, for implementations where Doppler pulse is not bandlimited, spacing between the frames (e.g., center of one frame to the center of next frame) with a $T>1/\Delta v$, due to the roll-off shape of the transformed Doppler pulse to time (see, e. g., FIG. 16).

Figure 17:
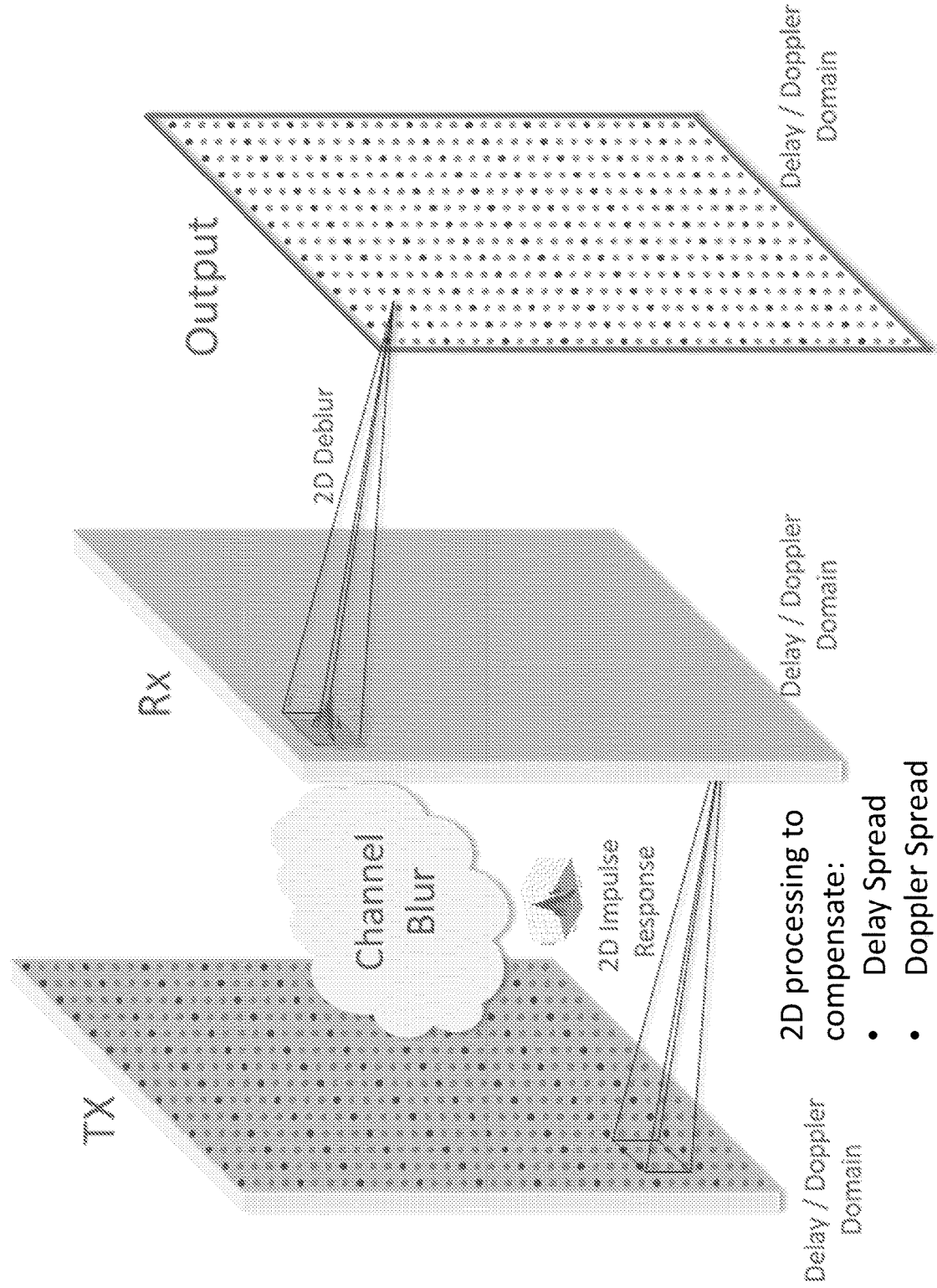
FIG. 17 pictorially depicts the concept of twisted convolution.

FIG. 17 pictorially depicts the concept of twisted convolution. Starting from left to right, the two-dimensional arrangement of symbols in the delay-Doppler domain is depicted on the transmitter side. During transmission from the transmitter TX to a receiver Rx, the signal may get blurred or distorted based on a 2D impulse response of the channel. This alteration is depicted as channel blur. The received signal in the delay-Doppler domain may be recovered using deblurring to obtain estimates of the transmitted symbols. The end-to-end process is considered to include twisted convolution due to the changes in delay-Doppler position of the transmission waveform.

Figure 18:
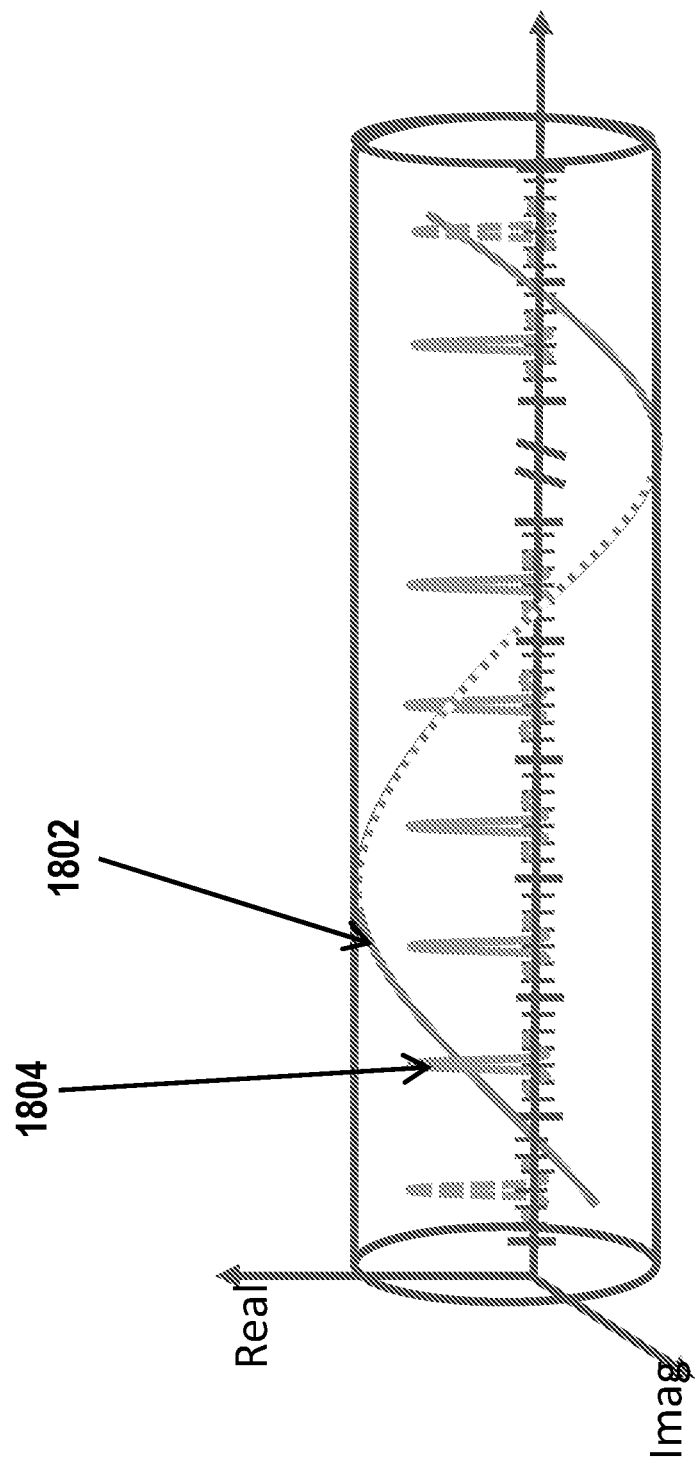
FIG. 18 shows an example of an OTFS waveform.

FIG. 18 shows another depiction of an OTFS waveform. As depicted, an OTFS waveform can be conceptually considered to comprise time-localized pulses (1804) that are frequency localized due to modulation from a phase function (1802) which modifies the pulses along time axis.

Figure 19:
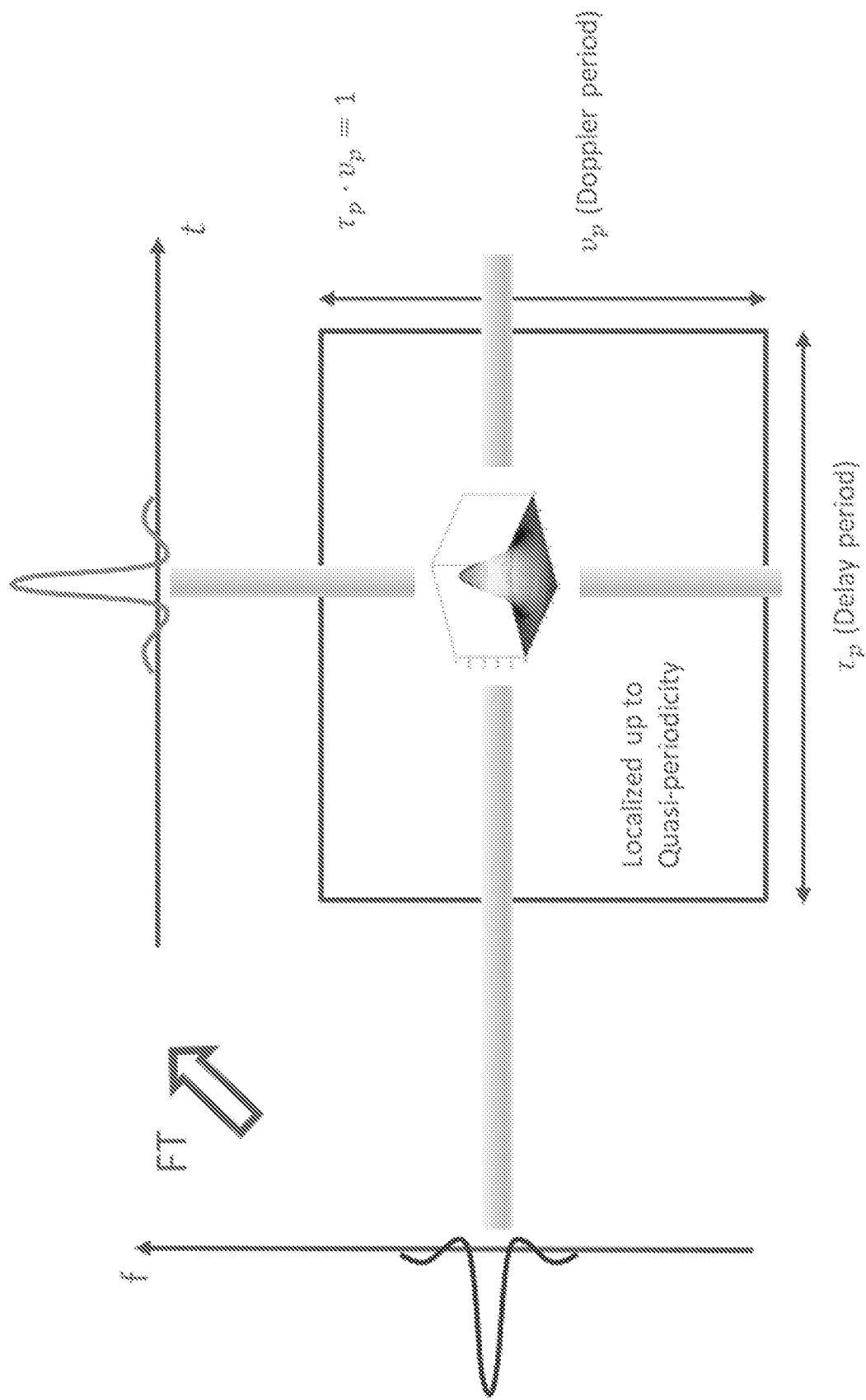
FIG. 19 shows an example of localization properties of a transmission waveform in delay-Doppler domain.

FIG. 19 shows an example of a delay-Doppler pulse in delay-Doppler domain. Here, the vertical axis represents frequency and horizontal axis represents time. A conventional pulse that is frequency limited, is not limited in time, while another convention pulse that is time limited, will not be limited in frequency. By contrast, the delay-Doppler pulse, shown in the center, will maintain its 2-D localized shape that remains quasi periodic (same shape, different phase) throughout the delay-Doppler plane.

8. Examples of OTFS Transmission and Reception

The dimensions of the channel estimation area (e.g., the pilot signal regions depicted in FIGS. 10A and 10B) depend on the expected channel response and its delay and Doppler spreads. Within the channel estimation area, pilot symbols may be placed. A pilot symbol has a known value, and its power may be larger than the other data symbols.

Figure 20A:
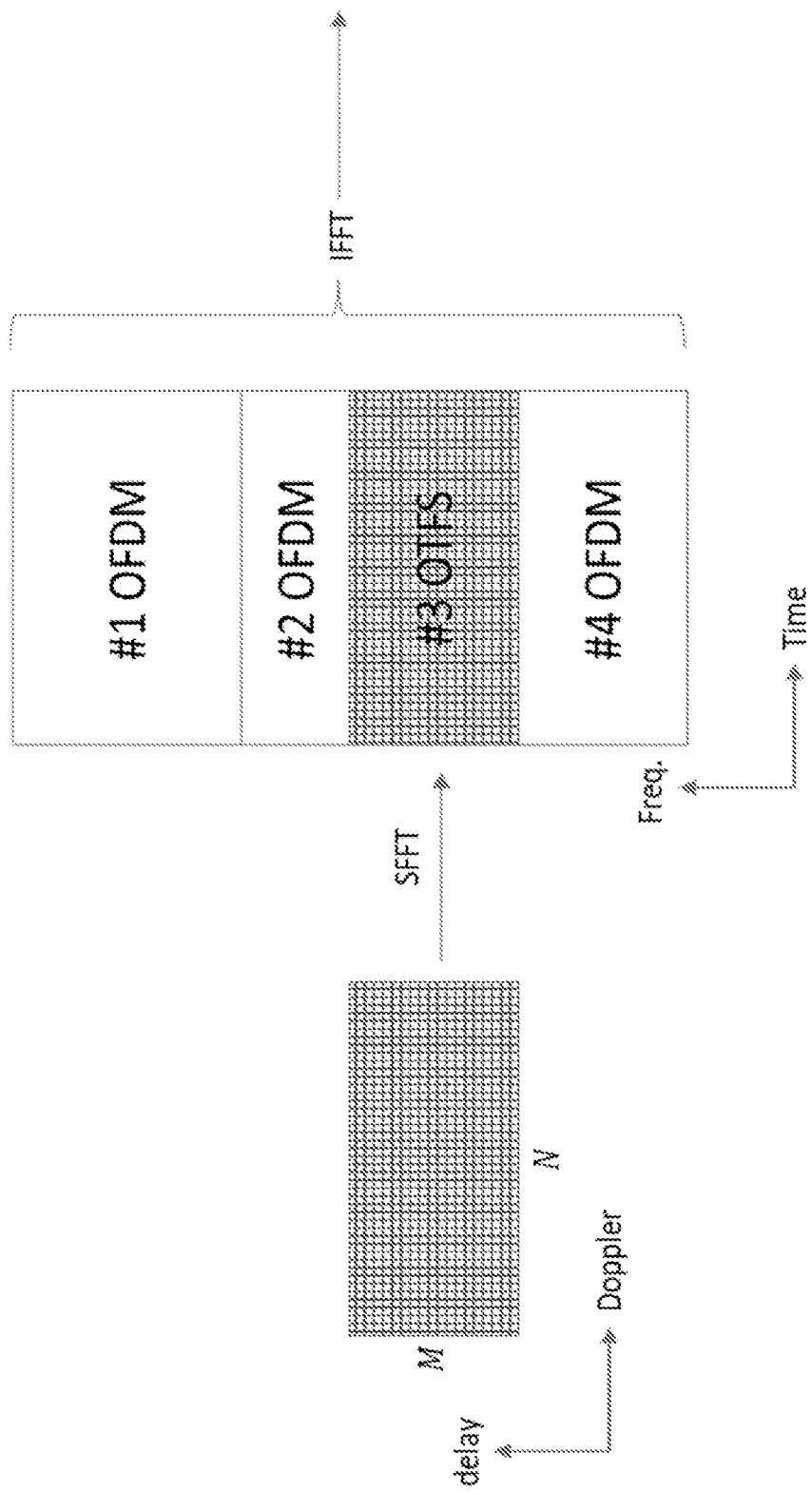
FIG. 20A shows an example of a transmission method in which a delay-Doppler grid is transformed to a time-frequency grid using a Symplectic Fast Fourier Transform (SFFT).
Figure 20B:
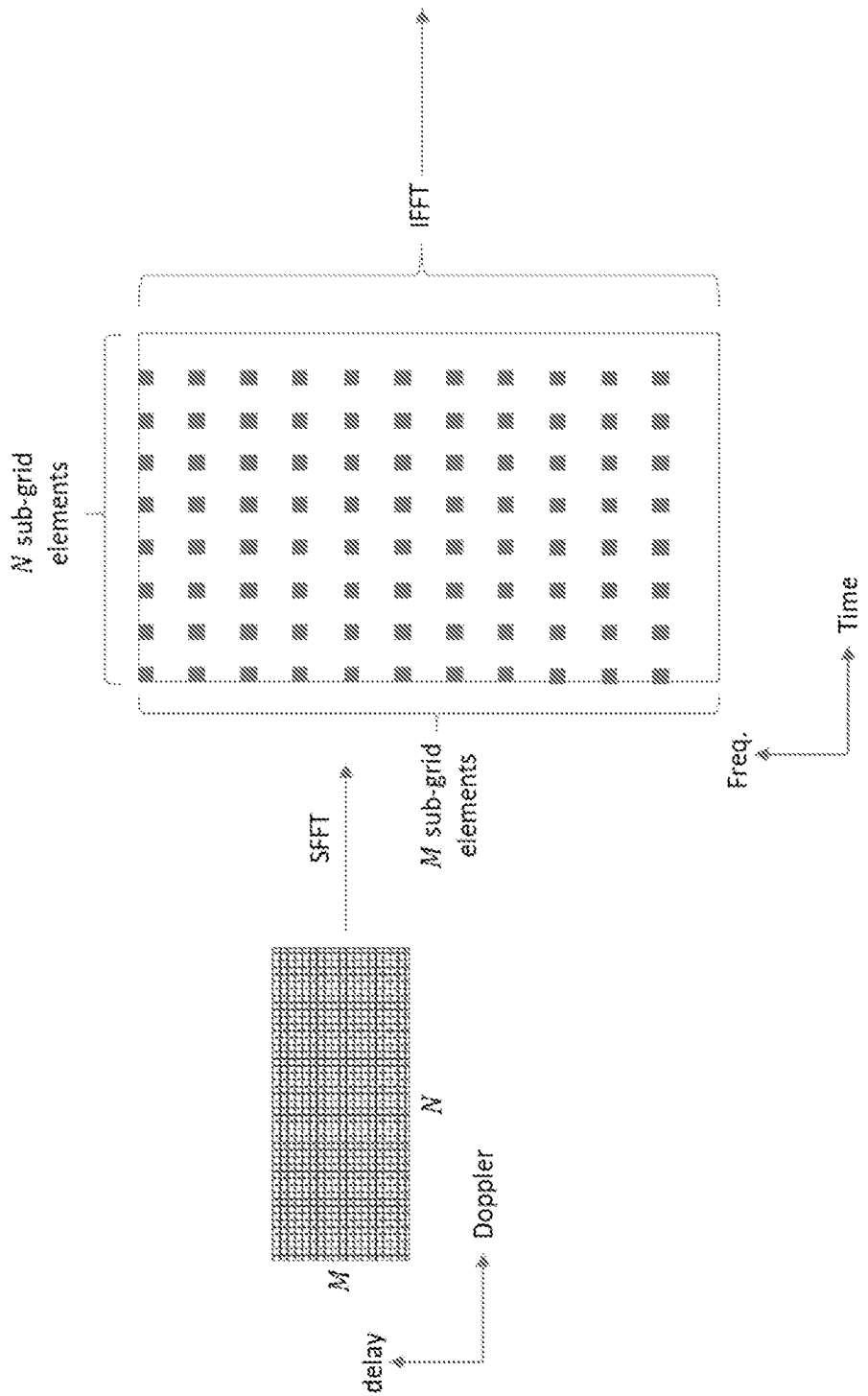
FIG. 20B shows an example of a transmission method in which a delay-Doppler grid is transformed to a time-frequency sub-grid.

The delay-Doppler grid may be transformed to a transmission waveform in one of the following methods:
1. Transformation to a time-frequency equivalent grid via a discrete Symplectic Fast Fourier Transform (SFFT). This method creates a time-frequency grid, like the one used for OFDM modulation. This OTFS transformed grid may be multiplexed with other time-frequency elements in the OFDM grid, as shown in FIG. 20A, thus allowing multi-user data multiplexing. Then, an OFDM waveform may be generated using an inverse Fourier transform (IFFT) over each OFDM symbol.
2. Transformation to a time-frequency equivalent sub-grid via discrete SFFT, as shown in FIG. 20B. The sub-grid is part of a larger time-frequency grid and has M elements along frequency and N elements along time. Then, an OFDM waveform may be generated using an inverse Fourier transform (IFFT) over each OFDM symbol.
3. Direct transformation to the time domain using a Zak transform over the Doppler dimension of the grid (after extending the grid in a quasi-periodic manner and applying a two-dimensional transmission pulse), as shown in FIG. 20C.

FIG. 20A shows an example of transmission method 1, where a delay-Doppler grid is transformed to a time-frequency grid using a Symplectic Fast Fourier Transform (SFFT). This transformed grid, denoted as "#3 OTFS", is multiplexed with the data of other OFDM users (denoted as #1, #2 and #4) in the overall OFDM time-frequency grid. An inverse Fast Fourier Transform (IFFT) may be applied to the OFDM symbols to generate the transmission waveform.

FIG. 20B shows an example of transmission method 2, where a delay-Doppler grid is transformed to a time-frequency sub-grid with N elements along the time dimension and M elements along the frequency dimension, using a Symplectic Fast Fourier Transform (SFFT). Note, that the sub-grid may not take all the time-frequency resources and other sub-grids may be also allocated for other delay-Doppler transformations (possibly of different users).

Figure 20C:
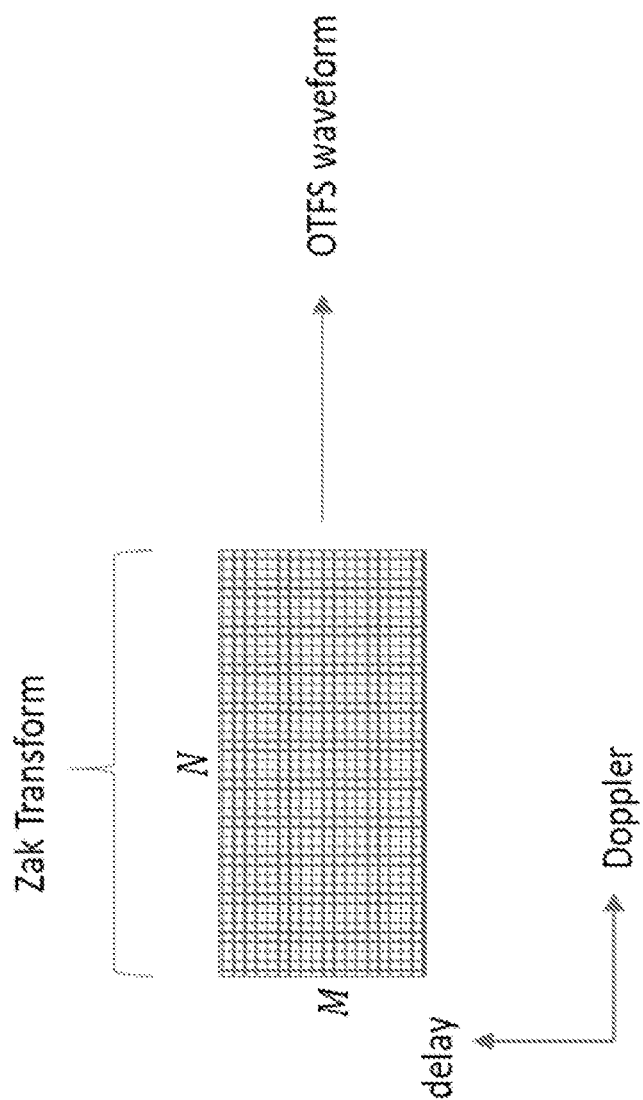
FIG. 20C shows an example of transmission method in which a delay-Doppler grid is transformed to an OTFS waveform using a Zak transform over the Doppler dimension.

FIG. 20C shows an example of transmission method 3, where a delay-Doppler grid is transformed to an OTFS waveform using the Zak transform over the Doppler dimension.

9. Examples of Receiver-Side Signal Processing

At a receiver, the received waveform is transformed back to delay-Doppler for further processing. This transformation depends on how the waveform was transmitted:
1. A waveform of transmission method 1, is first transformed to a time-frequency grid using a Fast Fourier Transform (FFT) and then the OTFS section of the grid is extracted and converted to delay-Doppler via the Inverse Symplectic Fast Fourier Transform (ISFFT). An example for this is given in FIG. 20D.
2. A waveform of transmission method 2, is first transformed to a time-frequency grid using a Fast Fourier Transform (FFT) and then the OTFS sub-grid is extracted and converted to delay-Doppler via the Inverse Symplectic Fast Fourier Transform (ISFFT). An example for this is given in FIG. 20E.
3. A waveform of transmission method 3, is transformed directly to delay-Doppler via an inverse Zak transform over the time dimension, as shown in FIG. 20F. Afterwards, a receive two-dimensional pulse may be applied to it.

Figure 20D:
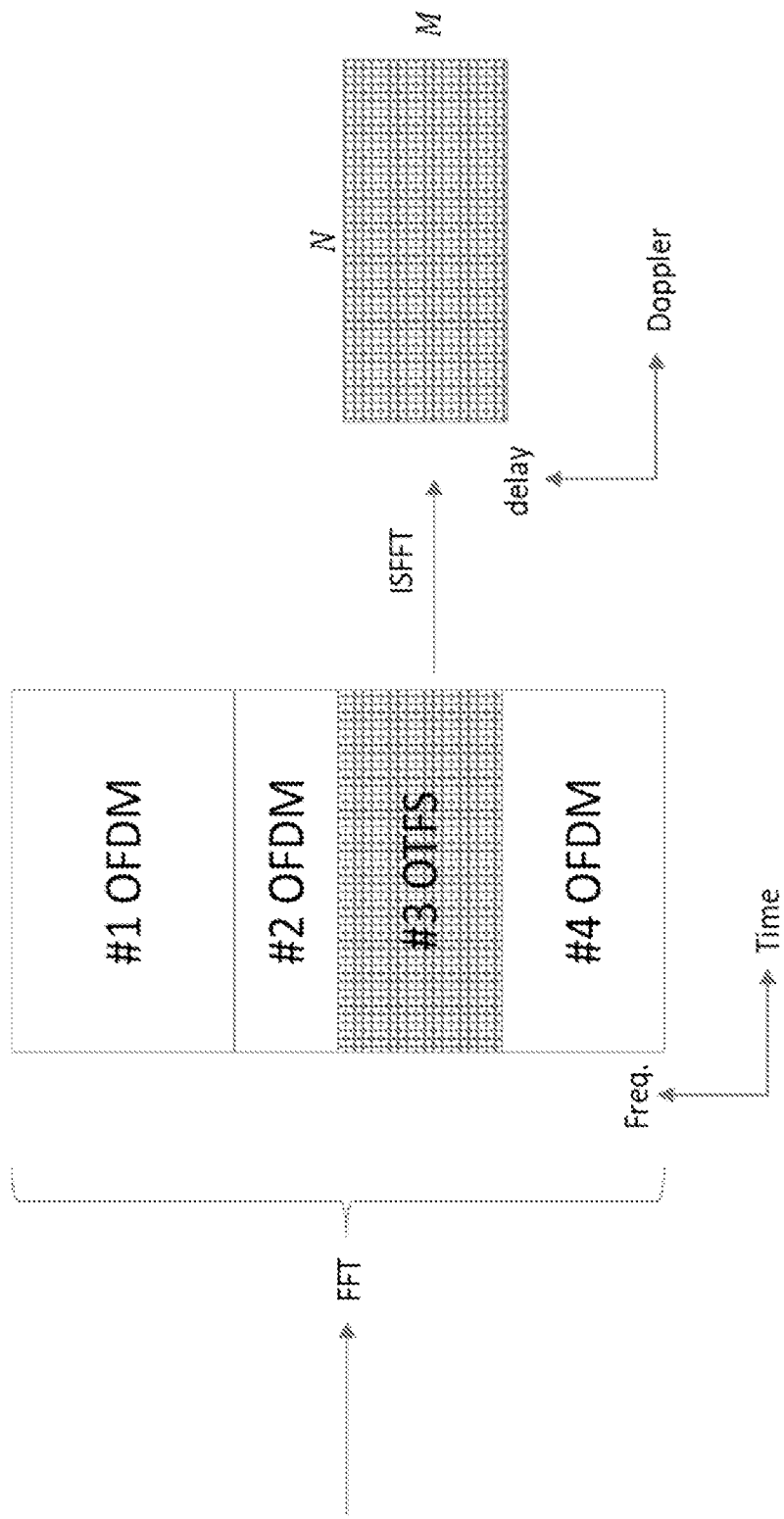
FIG. 20D shows an example of a reception method in which Inverse SFFT (ISFFT) is used to recover information bits from a received waveform.

FIG. 20D depicts a receiver processing example for a waveform generated by transmission method 1. The received waveform is transformed to a time-frequency grid using a Fast Fourier Transform (FFT) and the OTFS part (denoted as "#3 OTFS") is extracted and transformed to delay-Doppler via an Inverse Symplectic Fast Fourier Transform (ISFFT).

Figure 20E:
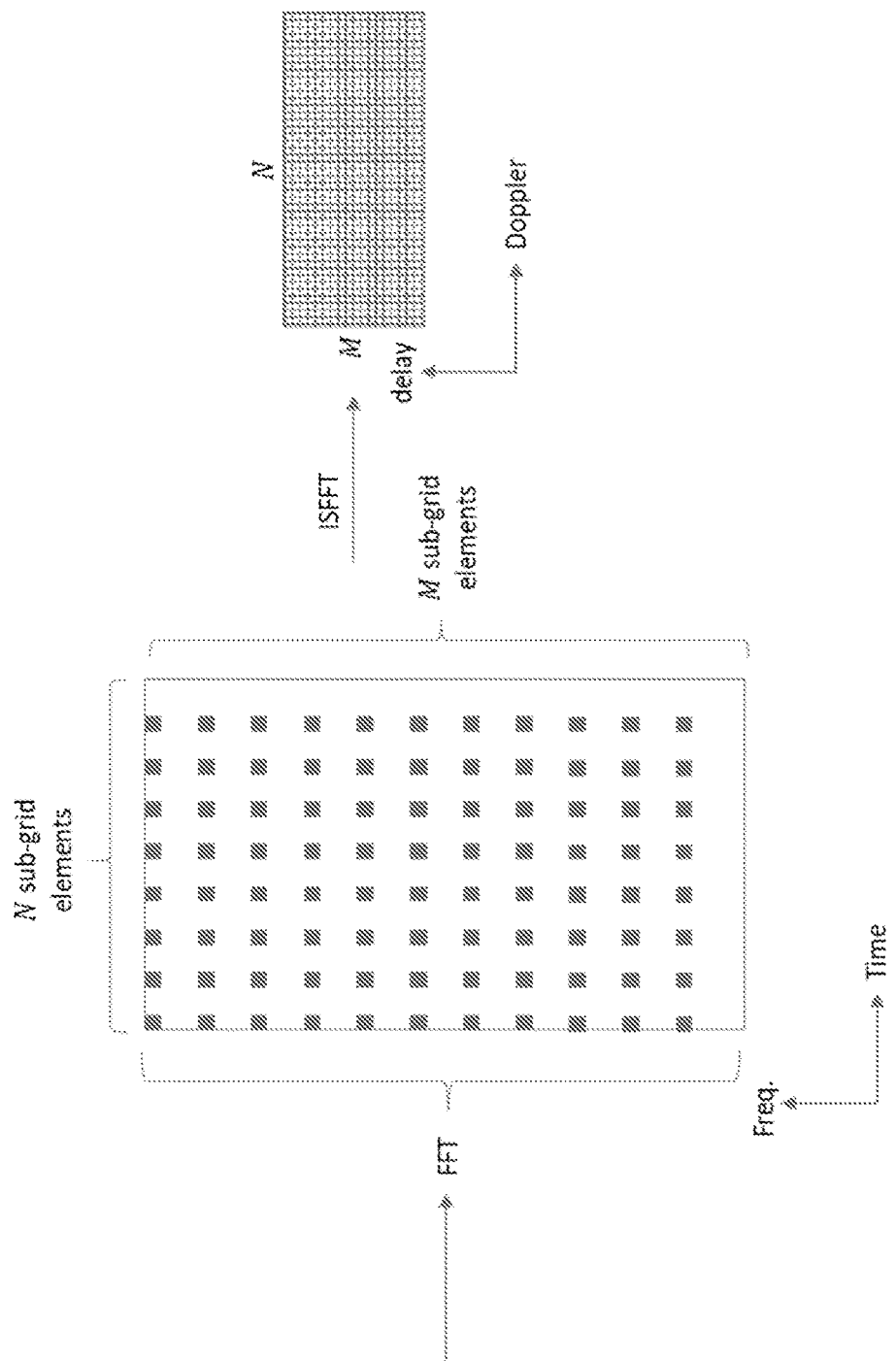
FIG. 20E shows an example of a reception method in which Inverse SFFT (ISFFT) is used to recover information bits from an OTFS sub-grid of a received waveform.
Figure 20F:
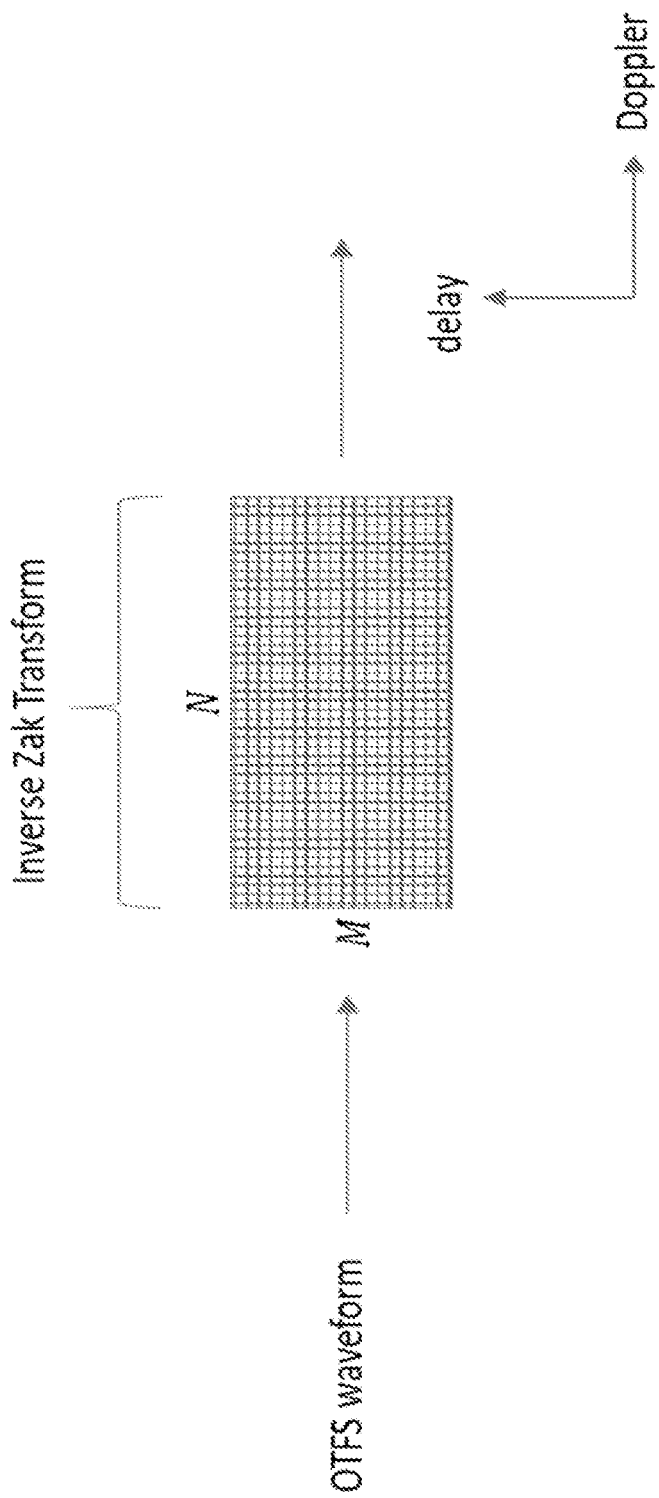
FIG. 20F shows an example of a reception method in which an inverse Zak transform over the time dimension is used to recover information bits from a received waveform.

FIG. 20E depicts a receiver processing example for a waveform generated by transmission method 2. The received waveform is transformed to a time-frequency grid using a Fast Fourier Transform (FFT) and the OTFS sub-grid is extracted and transformed to delay-Doppler via an Inverse Symplectic Fast Fourier Transform (ISFFT).

FIG. 20F depicts a receiver processing example for a waveform generated by transmission method 3. The received OTFS waveform is arranged in a grid N×M elements and transformed to delay-Doppler via the inverse Zak transform over the time dimension. It is noted that in the description of OTFS signal generation and reception as described in the present document, while reference signals are not specifically described, in practical systems, some resources may be allocated to various reference signals for monitoring or calibration of the channel between a transmitter and a receiver.

In some embodiments, the described embodiments include receiver signal processing that can be configured to implement iterative equalization and decoding of multi-level encoded symbols (in Section 10) and iterative two-dimensional (2-D) equalization (in Section 11).

Figure 21:
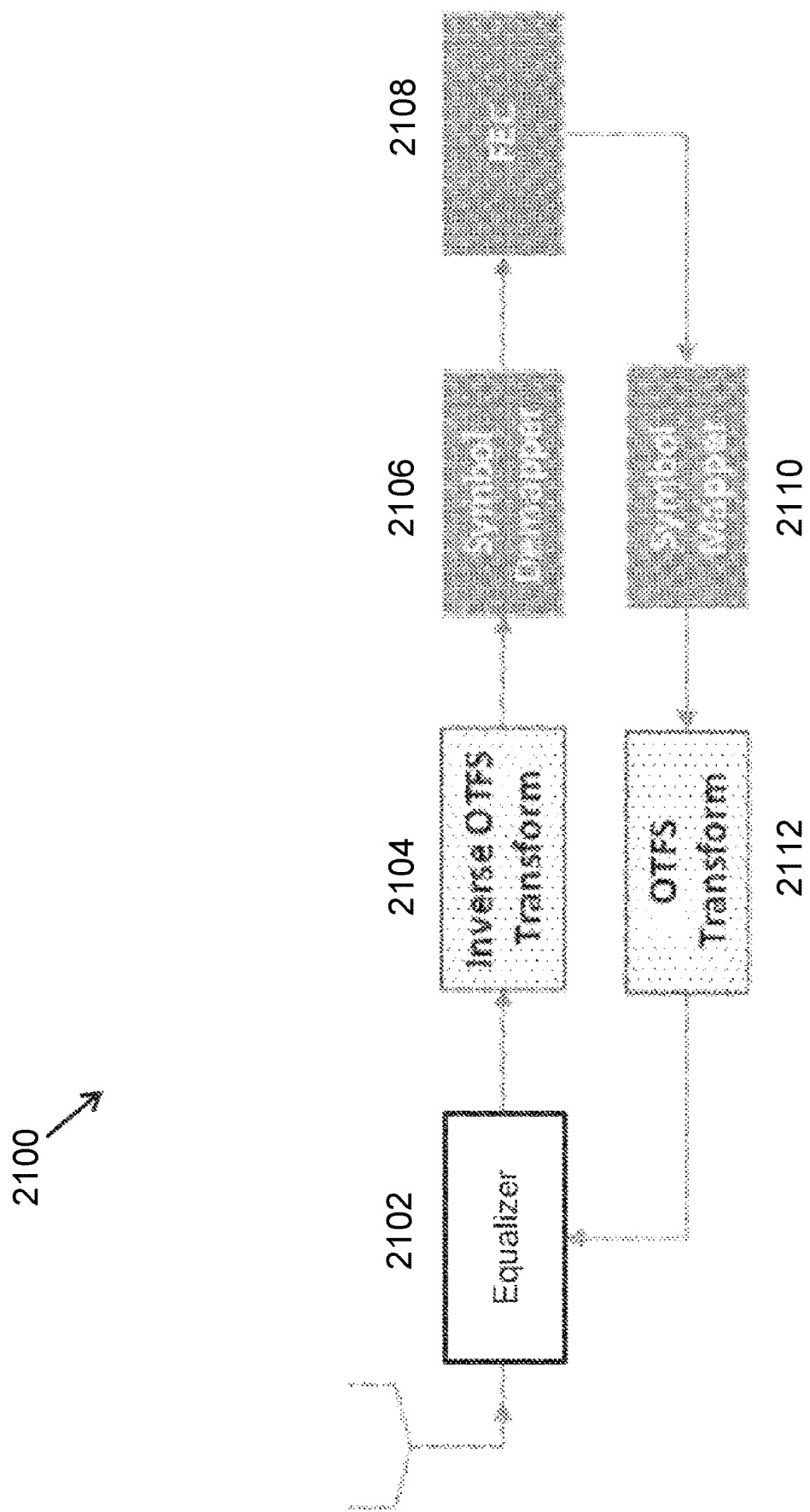
FIG. 21 shows a block diagram of an example iterative receiver apparatus.

10. Examples of Iterative Equalization and Decoding for Multi-Level Encoding In general, iterative receivers exchange extrinsic information between the equalizer and the FEC (forward error correction) decoder to achieve close to optimal performance, as shown in FIG. 21 for an OTFS receiver 2100. The extrinsic information may include a priori knowledge of which transmission resources (e.g., time slots of subcarriers) use which particular FEC. For example, the equalizer 2102 uses prior information on the data symbols coming from the FEC feedback path to improve the equalization of the symbols. This feedback path comprises a symbol mapper 2110 and OTFS transformation module 2112. Then, these symbols are converted to bit likelihoods that are FEC decoded. Several iterations are performed until all the source data is decoded correctly, or until some other stopping criteria is met. An inverse OTFS transform module 2104 may apply inverse OTFS transform and a symbol demapper 2106 may recover bits from modulation symbols.

Compared to other techniques described next, the error-rate performance of the scheme 2100 may be degraded. One reason for the degradation may be because of the mixture of bits with different level of reliability in every FEC codeword that is being decoded. The constellation bits with low reliability make it harder for the FEC decoder to converge to the correct codeword and therefore, the feedback to the equalizer has less information to improve the equalization.

Figure 22:
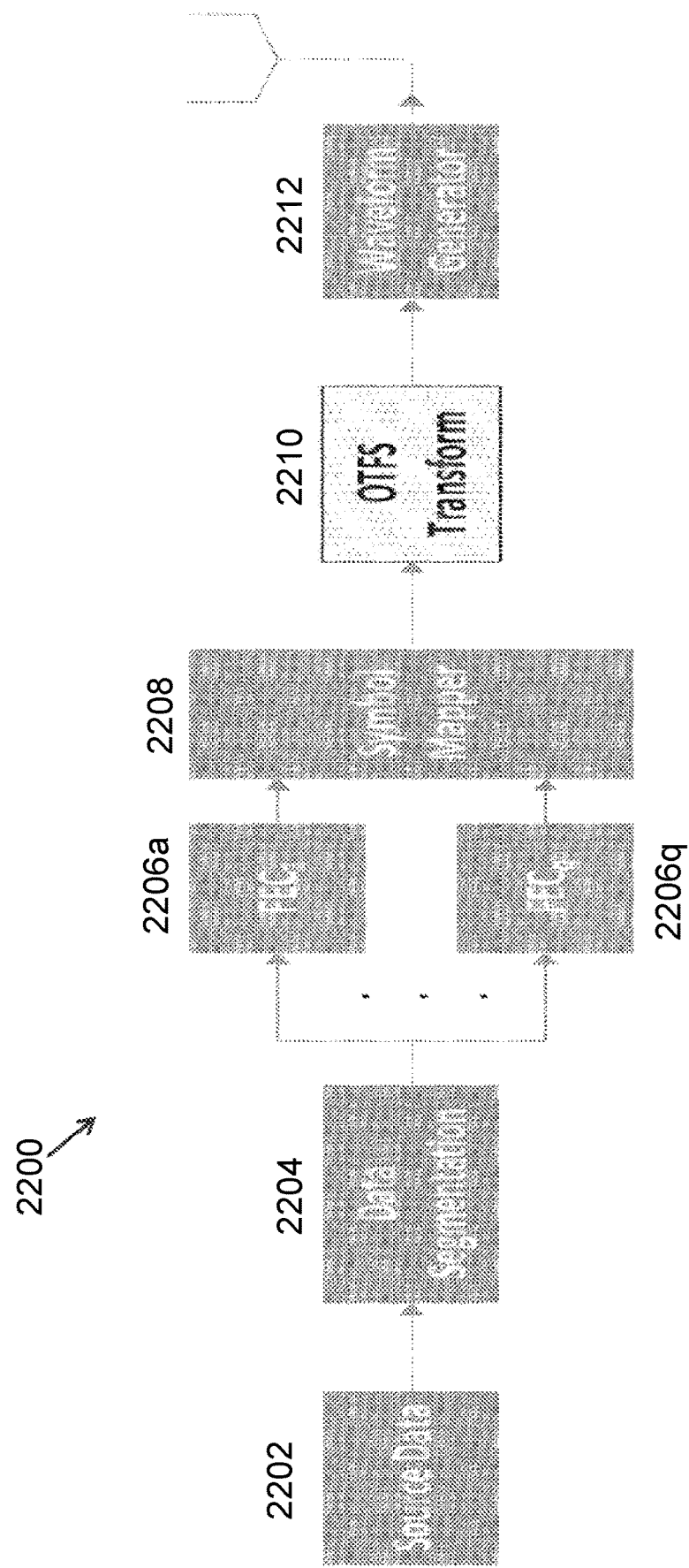
FIG. 22 is a block diagram showing an example of a multi-level transmission system.
Figure 23:
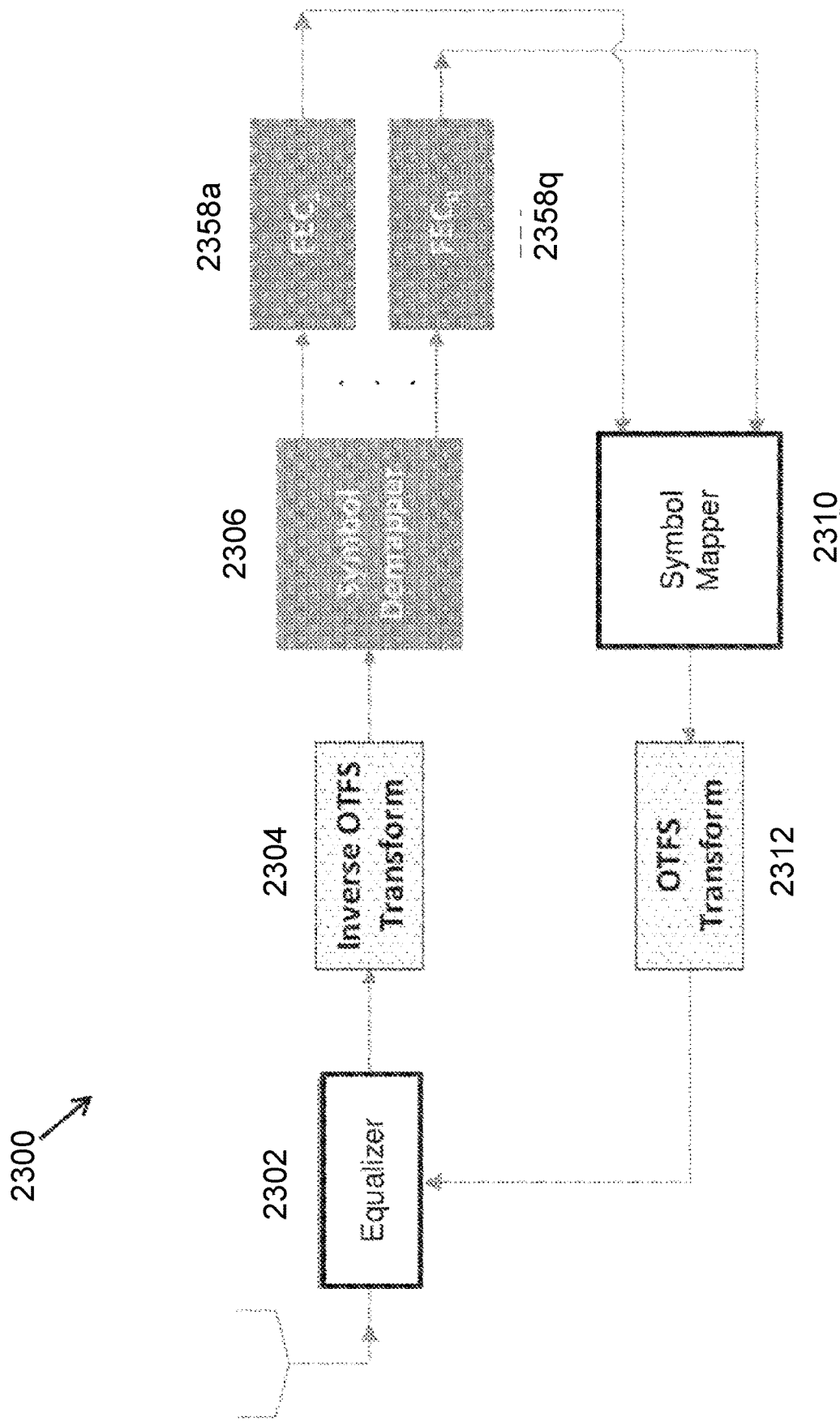
FIG. 23 shows a block diagram of an example iterative receiver apparatus that uses multi-level decoding.

When multi-level encoding is applied at the transmitter (e.g., as shown in FIG. 22), the iterative receiver 2300, in each decoding iteration, decodes only a part of the constellation bits. It typically starts with the most reliable bits and then proceeds in the next iterations to less reliable ones. This scheme, shown in FIG. 23, allows the equalizer to receive in earlier iterations priors, which are dominant from the constellation symbols point of view and better improve the equalization. When the FEC has successfully decoded one level, it switches to decode the next one. The receiver continues to iterate until all levels have been decoded successfully or until some other stopping criteria is met. The most reliable bits are often bits that are used to decide the "macro" region within the constellation map where a symbol lies—e.g., the quadrant in which a constellation symbol of a 4 or 8 QAM signal lies, followed by sub-quadrant within the quadrant, and so on. Thus, as shown in FIG. 23 the received signal may be equalized by the equalizer 2302. In the forward path, the equalized signal may undergo an inverse OTFS transform (2304), and the symbols from the resulting transformed signal may be demapped for decoding by multiple different FECs FEC1 to FECq (modules 2358a to 2358q). In the feedback path, the decoded symbol (bit) outputs of the FEC modules may be mapped to symbols (2310) and transformed into OTFS domain signals (symbols) for feedback to the equalizer 2302. As described above, in some implementations, different forward error correction codes are used for symbols from the multiple symbols corresponding to header and payload portions of the bits from the signal.

11. Examples of Iterative 2-D Equalization

Figure 24:
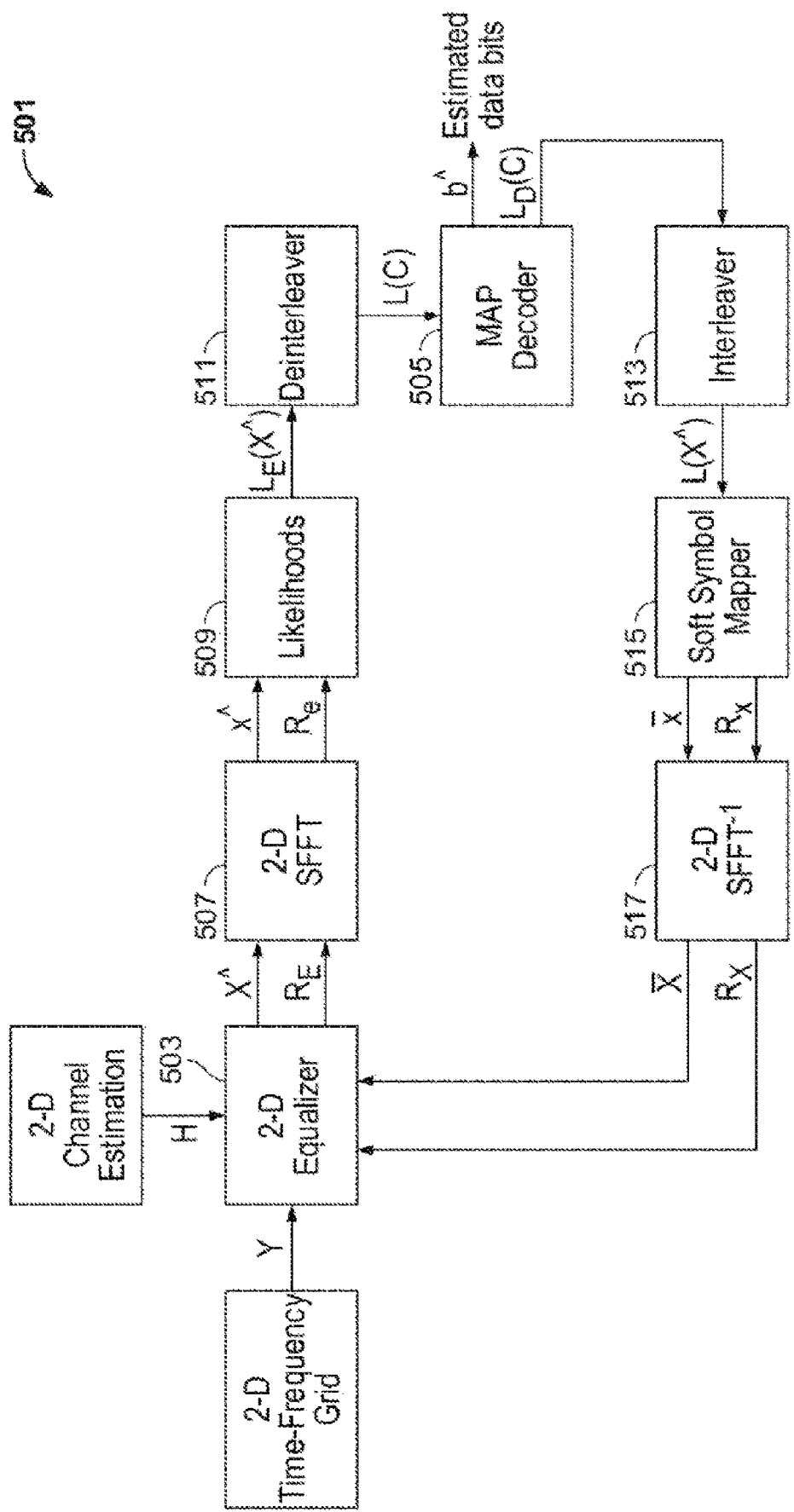
FIG. 24 is a block diagram showing an example 2-D iterative equalizer.

FIG. 24 is a block diagram of an example embodiment of an iterative 2-D equalizer 501. The 2-D Iterative equalizer, illustrated in FIG. 24, iterates between the 2-D equalizer 503 and the FEC MAP decoder 505, by passing information from one to the other. After several iterations, the MAP decoder outputs estimation on the information bits. In various embodiments, the iteration termination criteria may be based on a total number of iterations, meeting, but not exceeding, a time budget for the iterative process, the improvement in successive iterations falling below a threshold, and so on.

11.1 2-D Equalizer (503)

In some embodiments, the 2-D equalizer may be implemented as an affine MMSE (minimum mean square error) equalizer, computing the Wiener estimator of X $$\hat{X} = CY + (I - CH)\bar{X} \quad (16)$$

Herein, $C = R_{XY} R_Y^{-1}$ and I is the identity matrix. Note that C is a function of $R_X$ and $R_W$. For the first iteration there is no prior information on the symbols of X, therefore we set X=0 and $R_X$=I. The 2-D equalizer also computes the variance of the estimation error, denoted as $R_E$.

11.2 2-D SFFT (507)

The estimated symbols and error variances, $\hat{X}$ and $R_E$ respectively, are transformed from the 2-D Time-Frequency grid to the 2-D Delay-Doppler grid via a 2-D Symplectic Fourier transform to $\hat{x}$ and $R_e$ respectively.

11.3 Likelihoods (509)

Likelihoods for the coded bits $L_E(\hat{x})$, are computed from the symbols $\hat{x}$. Gaussian distribution may be assumed for $\hat{x}$ and the likelihoods can be derived from it. The probabilities for this case are $$P(\hat{x} \mid x = \omega) \propto e^{\frac{1}{R_Z}(\hat{x}-\mu(\omega,A))^2} \quad (17)$$

Herein, $\omega \in \Omega$ is a constellation symbol, $A = 1 - R_e R_x^{-1}$, $R_Z = AR_e$ and $\mu(\omega, A) = \omega A + (1-A)\bar{x}((18))$. Note that $\bar{x}$ is defined in Equation (21). For each symbols, the extrinsic coded bits log likelihoods ratio (LLR) can be derived as $$L_E(\hat{x})_i = \log \left( \frac{\sum_{\omega: s(\omega)_i=1} P(\hat{x} \mid x = \omega) \cdot \prod_{j \neq i} P(\omega)_j}{\sum_{\omega: s(\omega)_i=0} P(\hat{x} \mid x = \omega) \cdot \prod_{j \neq i} P(\omega)_j} \right)$$

Herein, i, j=0, ..., q−1, s(ω) is the constellation bits label that is associated with the constellation symbol ω and $P(\omega)_j$ is defined in Equation (20).

11.4 Deinterleaver (511)

The deinterleaver permutes the likelihoods $L_E(\hat{x})$ to L(C). These likelihoods will be used as a priori information for the MAP decoder. In some implementations this deinterleaver might be optional.

11.5 MAP Decoder (505)

The maximum a posteriori (MAP) decoder computes the a posteriori probabilities (APP's) of the information bits and also the extrinsic probabilities for the coded bits, which when using LLRs, are the APP's minus the a priori inputs.

11.6 Interleaver (513)

The interleaver permutes the likelihoods $L_D(C)$ to $L(\hat{x})$. These likelihoods will be used as a priori information for the MAP decoder. Note that in some implementations this interleaver might be optional.

11.7 Symbol Mapper (515)

The symbol mapper estimates the probabilities of each constellation symbol $\omega \in \Omega$ from the likelihood values $L(\hat{x})$:

$$P(\omega)j \cong \frac{1}{2}\left(1 + (2 \cdot s(\omega)_j - 1) \cdot \tanh\left(\frac{L(\hat{x})_j}{2}\right)\right)$$

$$P(\omega) \cong \prod_{j=0}^{q-1} P(\omega)_j$$

These probabilities are used for computing the expectation of the constellation and the variance:

$$\bar{x} = \sum_{i=0}^{q-1} \omega \cdot P(\omega)$$

$$R_x = \sum_{i=0}^{q-1} \omega \omega^H P(\omega) - \bar{x}\bar{x}^H$$

11.8 2-D SFFT$^{-1}$ (517)

The 2-D Delay-Doppler domain symbols' expectation and variance $\bar{x}$ and $R_x$ are transformed to $\bar{X}$ and $R_X$ in the 2-D Time-Frequency domain using a 2-D Inverse Symplectic Fourier transform to transform from the delay-Doppler domain to the Time-Frequency domain. These are used as priors to the 2-D Equalizer in the next iteration. In some embodiments, the 2-D transforms used by operation 507 and 517 may be swapped. In other words, an inverse SFFT may be used in the operation 507, while an SFFT may be used in the operation 517.

In some embodiments, the iterative 2-D Equalizer may be operated so that the receiver gets side information about some resource elements in the time-frequency grid that have been "erased" (e.g., not transmitted, or not useable) and the receiver can ignore them. The receiver may skip equalization for these resources and directly use the prior estimates as outputs for the equalizer. In this case, Equation (16) simply becomes for these resources: $\hat{X} = \bar{X}$.

12. Examples of Spatial Multiplexing of Different Radio Technologies

Embodiments of the disclosed technology provide, inter alia, dynamic spatial multiplexing of multi-users on orthogonal beams, where on each beam, on any time and frequency resources, any radio technology may be transmitted. The beams are created in such a way that the crossbeam interference is minimized. The beams may be created from multiple antenna elements that are spatially separated (e.g., an antenna array) or from any other type of antenna (such as a Luneburg lens). This technique is applicable for both downlink and uplink transmissions.

Figure 25:
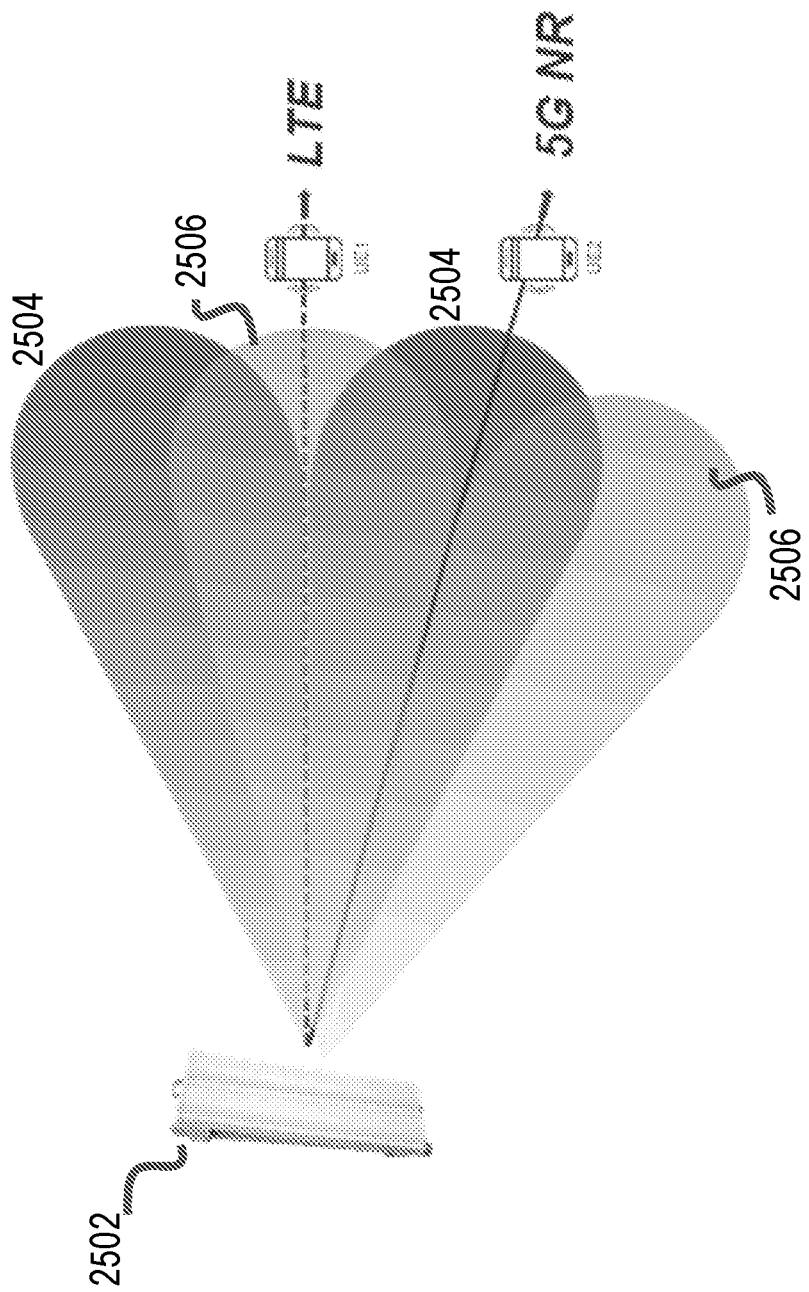
FIG. 25 shows an example of spatial multiplexing of 4G LTE and 5G NR. The two user-equipment (UE) devices are receiving at the same time and on the same frequency band different waveforms with different radio technologies.

FIG. 25 shows an example of spatial multiplexing of two radio technologies—4G LTE and 5G NR. The two antennas (2502) are creating two orthogonal beams—a first beam (2504) with a 5G NR waveform on it, and a second beam (2506) with a 4G LTE waveform on it. UE1 in this example, can receive 4G LTE and the second beam is targeted towards it, while the first beam has a minimum energy on its direction. UE2 in this example, can receive 5G NR and the first beam is targeted towards it, while the second beam has a minimum energy on its direction. These two waveforms with two different radio technologies coexist on the same time and frequency resources, separated only spatially.

Each radio technology may have in each transmission interval common resources and user-specific resources. Common resources are typically not targeted for a specific device and therefore may be transmitted in a way that will be received by most of the devices in the transmission sector (denoted as unprecoded transmission). Examples of such signals are reference signals (4G LTE channel reference signal CRS), synchronization signals (4G LTE/5G NR primary synchronization signal PSS & secondary synchronization signal SSS) and broadcast channels (4G LTE/5G NR physical broadcast channel PBCH). In some cases, common resources may be targeted for a specific device, when the channel attributes of this device are still unknown (for example, during initial access).

User-specific resources are targeted for a specific device and therefore precoded on a beam, which is orthogonal to the other beams. Examples of user-specific resources are downlink data channels (4G LTE/5G NR physical downlink shared channel PDSCH) and downlink control channels (5G NR physical downlink control channel PDCCH over USS).

For spatial multiplexing of different radio technologies, common resources should be kept unprecoded and orthogonal to any other transmitted signal. This ensures that these signals are received from the transmitter without interference or adverse impact. In some examples, user-specific resources may be transmitted simultaneously on multiple orthogonal beams. In other examples, overlaying transmissions of multiple user-specific data streams on the same frequency and time resources is enabled by multiple antennas at the base-station and the usage of the spatial domain, wherein a different spatial precoder is applied to each data stream targeting a specific user device.

In FIGS. 26 to 34J, various examples of configuration of resource elements are depicted in which the horizontal axis represents time divided in units of time and vertical axis represents frequency in units of subcarriers. The time axis units may be, for example symbols of orthogonal frequency division multiplexing (OFDM) symbols.

Figure 26:
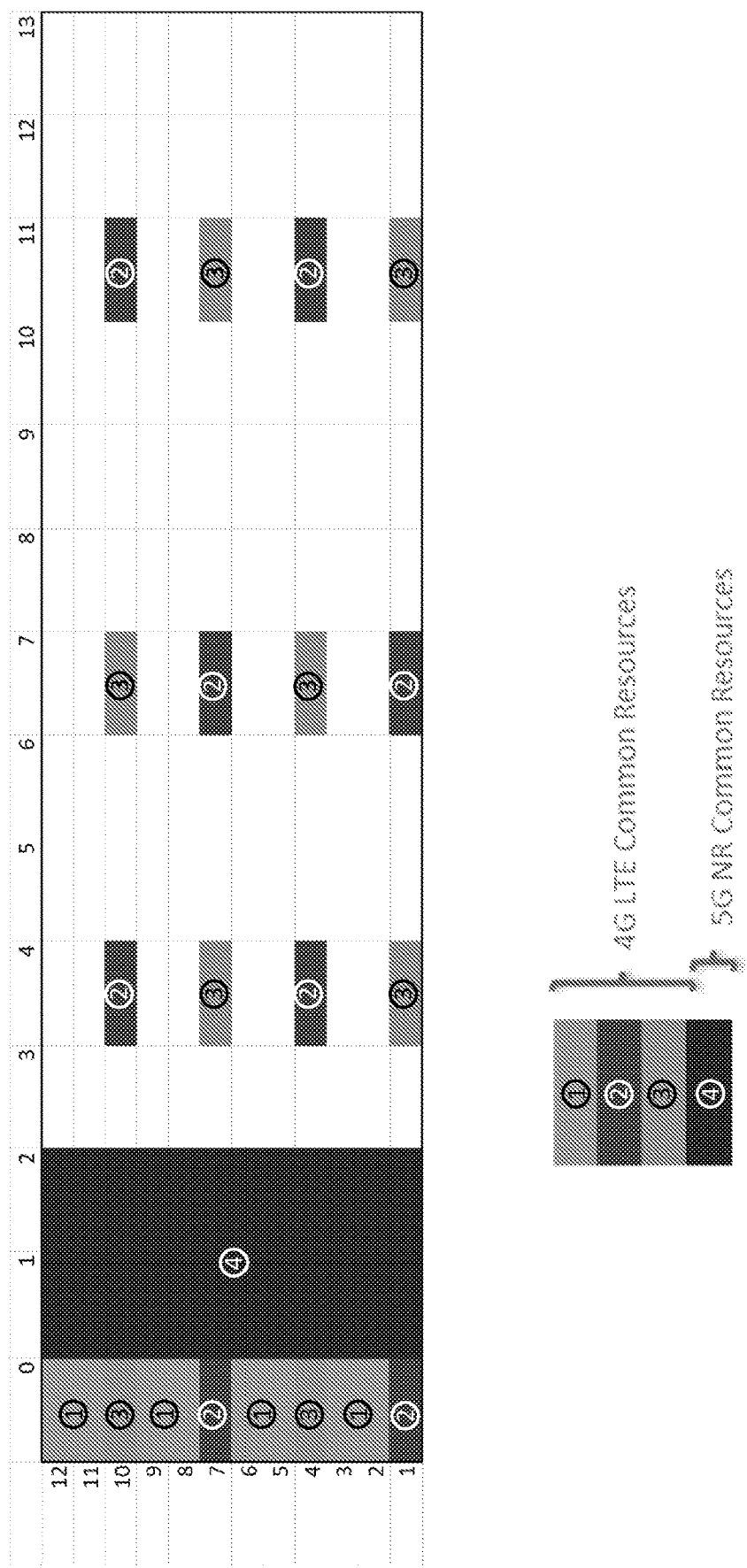
FIG. 26 shows a common resources example in a physical resource block, PRB, time-frequency grid, with 3 common symbols.
Figure 27:
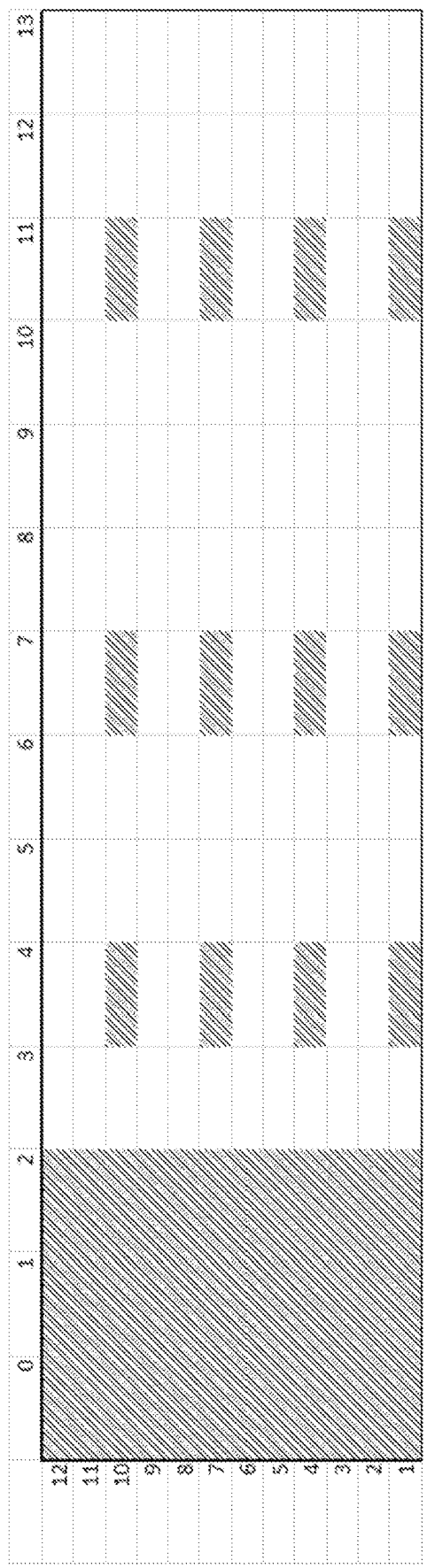
FIG. 27 shows an example of common resources (gray) and User-specific resources (white) example in a PRB time-frequency grid with 3 common symbols. The common resources are transmitted in a beam targeting all the users.
Figure 27:
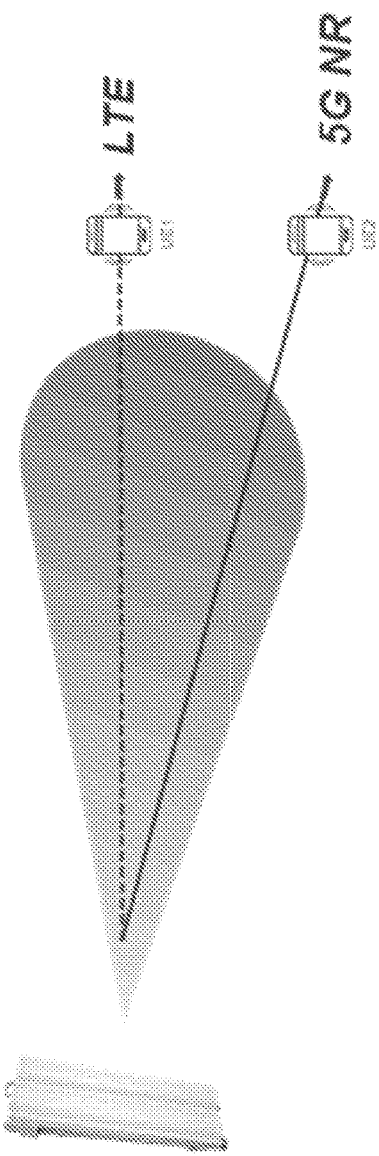
Figure 28:
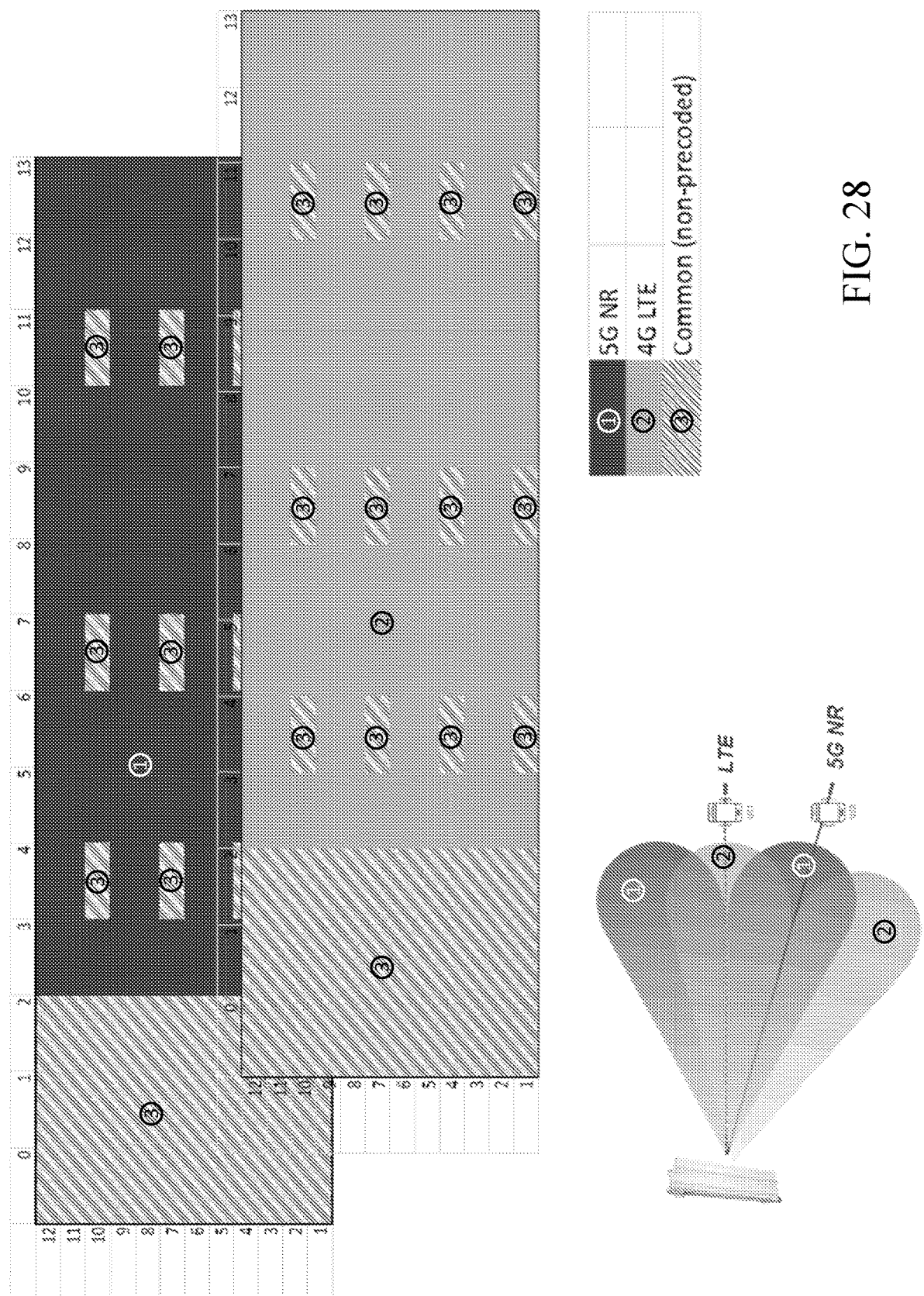
FIG. 28 shows an example of user-specific data on two time-frequency grids for spatial multiplexing over two beams, with 3 common symbols. Note that the like-shaded resource elements in these grids are the same and are transmitted on a single beam.

FIG. 26 shows an example of common resources in a time-frequency grid of 12 subcarriers and 14 OFDM symbols (also known in 4G LTE as a PRB=Physical Resource Block). For 5G NR with 15 kHz subcarrier spacing, the same grid can be used. The first symbol (#0) is allocated with common resources for 4G LTE, the second and third symbols (#1, #2) are allocated with common resources for 5G NR and symbols #4, #7 and #11 have some common resources in them for 4G LTE. Note, that there is no common resource on the time-frequency grid, which has more than one radio technology assigned to it and therefore, all these common resources are transmitted unprecoded. The remaining resources, indicated by white elements in FIG. 27, are available for spatial multiplexing of user-specific data on different waveforms, as also shown in FIG. 28.

Figure 29:
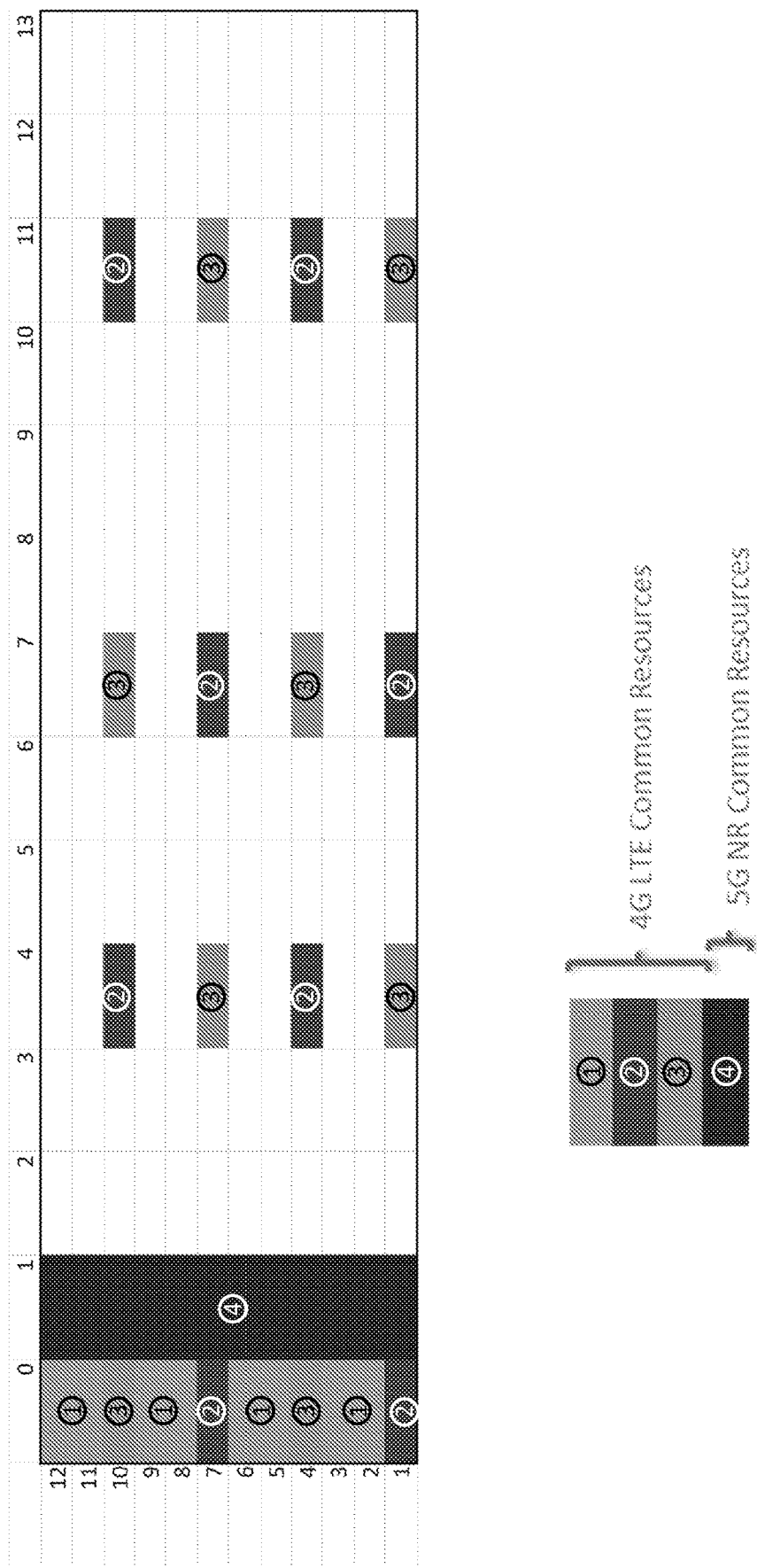
FIG. 29 depicts a common resources example in a PRB time-frequency grid, with 2 common symbols.
Figure 30:
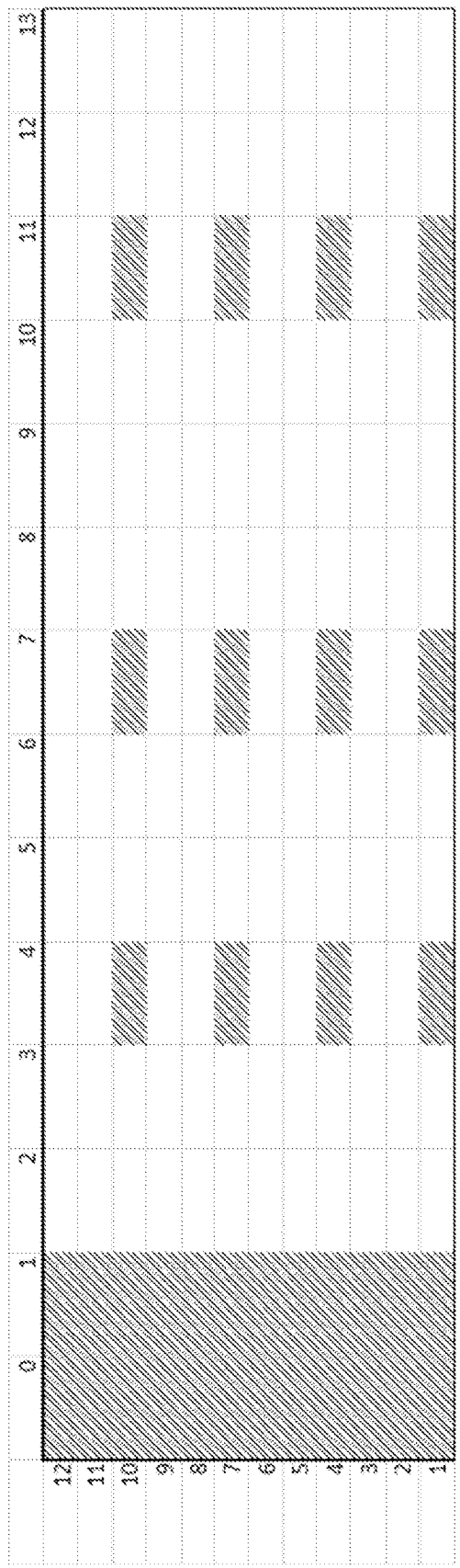
FIG. 30 shows a common resources (gray) and User-specific resources (white) example in a PRB time-frequency grid, with 2 common symbols. The common resources are transmitted in a beam targeting all the users.
Figure 30:
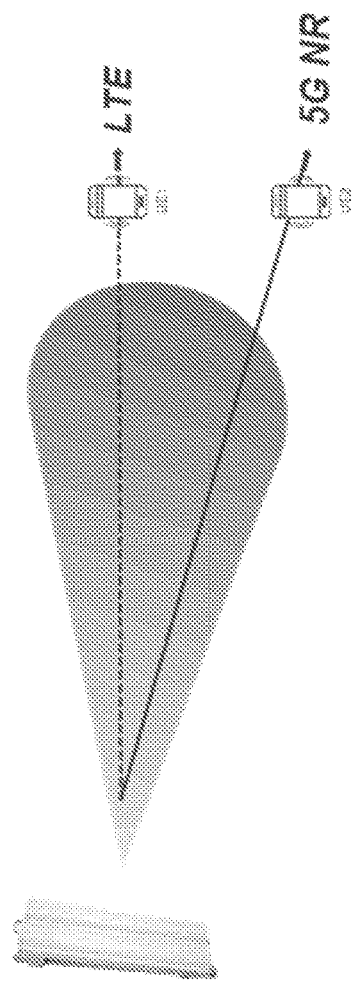
Figure 31:
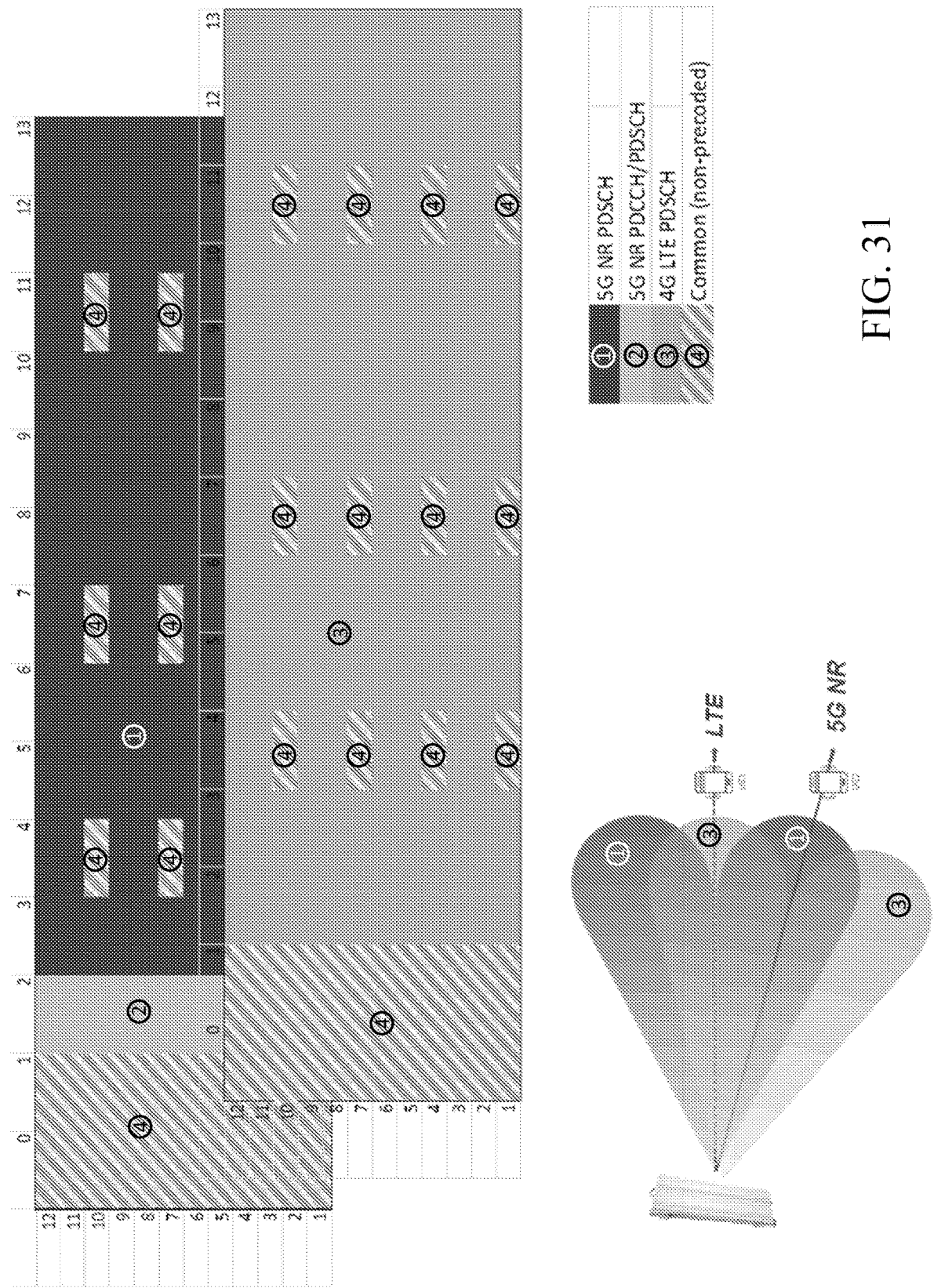
FIG. 31 shows a User-specific data on two time-frequency grids for spatial multiplexing over two beams, with 2 common symbols. Note, that the gray elements in these grids are the same and are transmitted on a single beam.

Another example with a slightly different configuration of only two common symbols at the beginning of the subframe is shown in FIG. 29, FIG. 30, and FIG. 31. The third symbol is spatially multiplexed and may be used for transmitting precoded 4G LTE data (PDSCH) and/or precoded 5G NR control or data (PDCCH or PDSCH).

12.1 Different Allocations within a Subframe

Figure 32A:
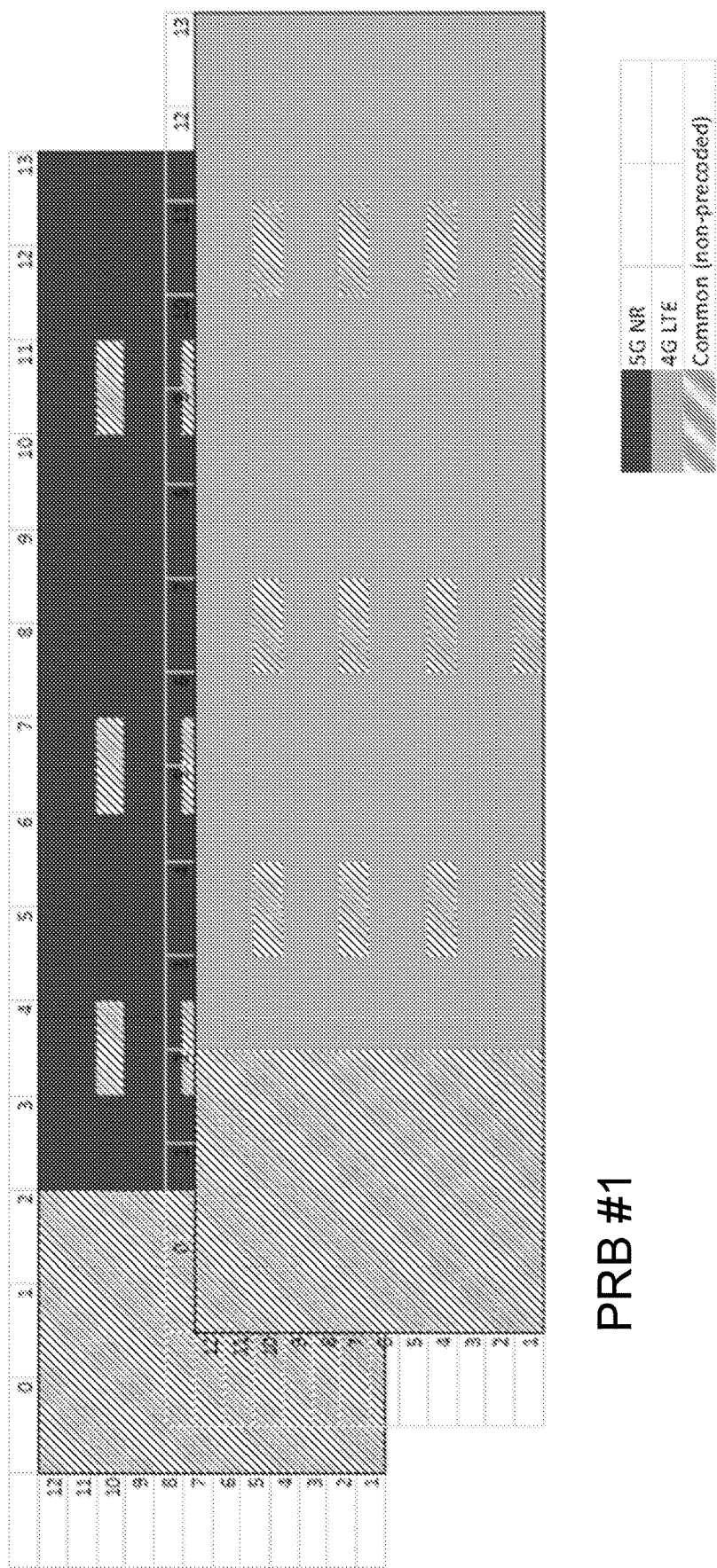
FIGS. 32A-32C are examples of different allocations for spatial multiplexing.
Figure 32B:
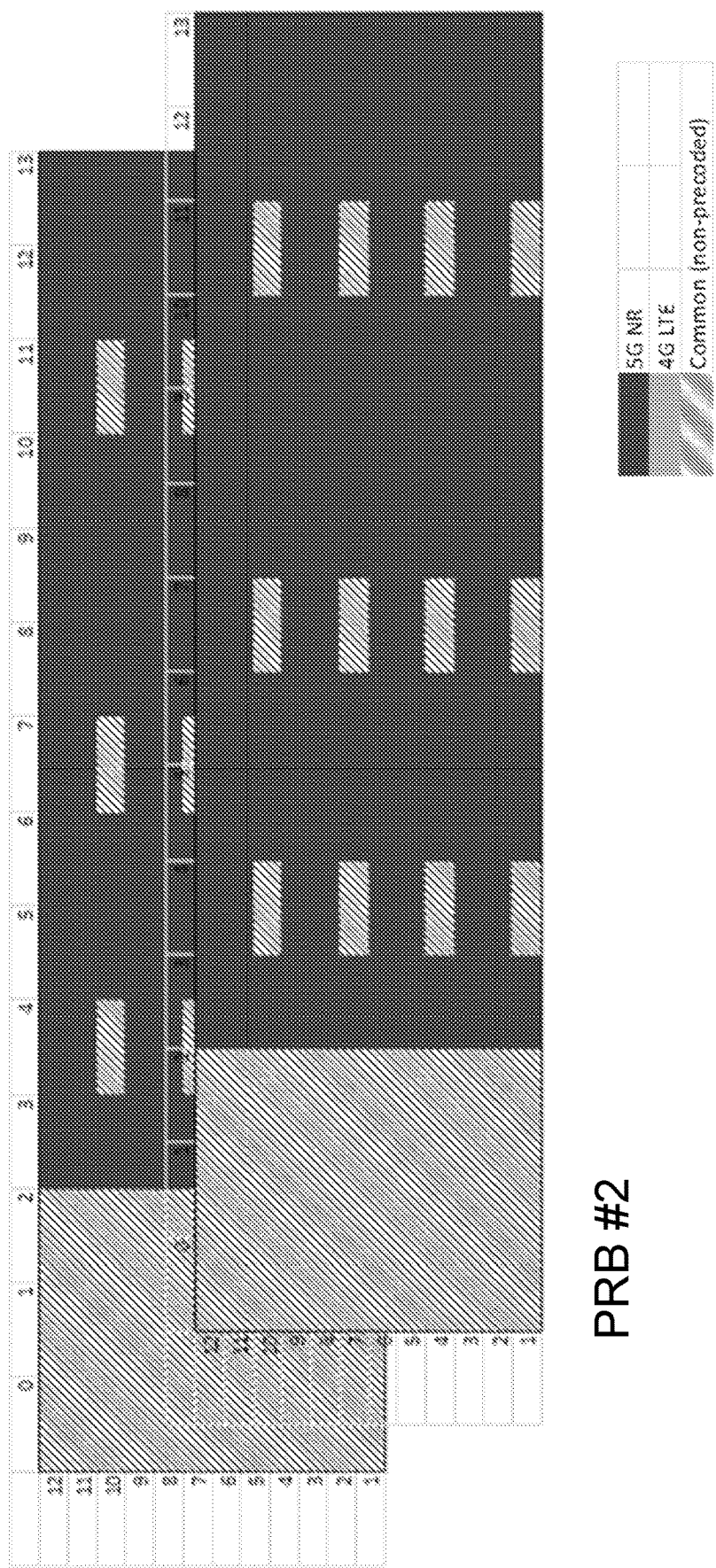
Figure 32C:
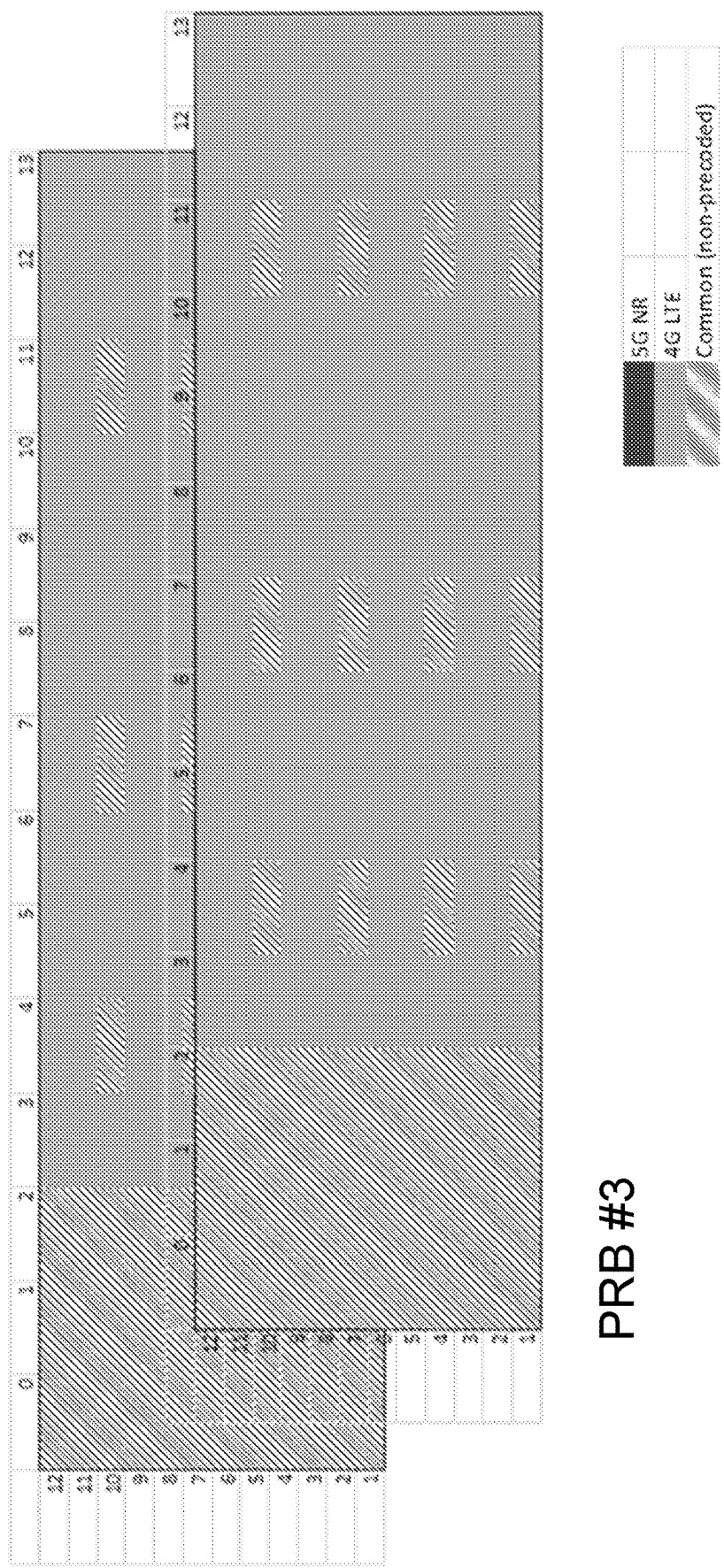

Spatial multiplexing is applied on a resource element (RE) level and each RE in the time-frequency grid may have a different spatial multiplexing and a different set of beams transmitted from the antennas. The ability to spatially multiplex different radio technologies, does not imply that on any resource element, the same radio technology cannot be transmitted over one or more beams to one or more devices. Some resource elements may spatially multiplex different radio technologies and some may spatially multiplex the same radio technologies. FIGS. 32A-32C show examples for a subframe with 3 PRBs. The first PRB (#1) is spatially multiplexing transmissions to two user devices, one is a 4G LTE device and the other is a 5G NR device (as shown in FIG. 32A), the second PRB (#2) is spatially multiplexing transmissions to two user devices, both are 5G NR devices (as shown in FIG. 32B) and the third PRB (#3) is spatially multiplexing transmissions to two user devices, both are 4G LTE (as shown in FIG. 32C).

12.2 Sharing Common Resources Between Different Radio Technologies

Figure 33A:
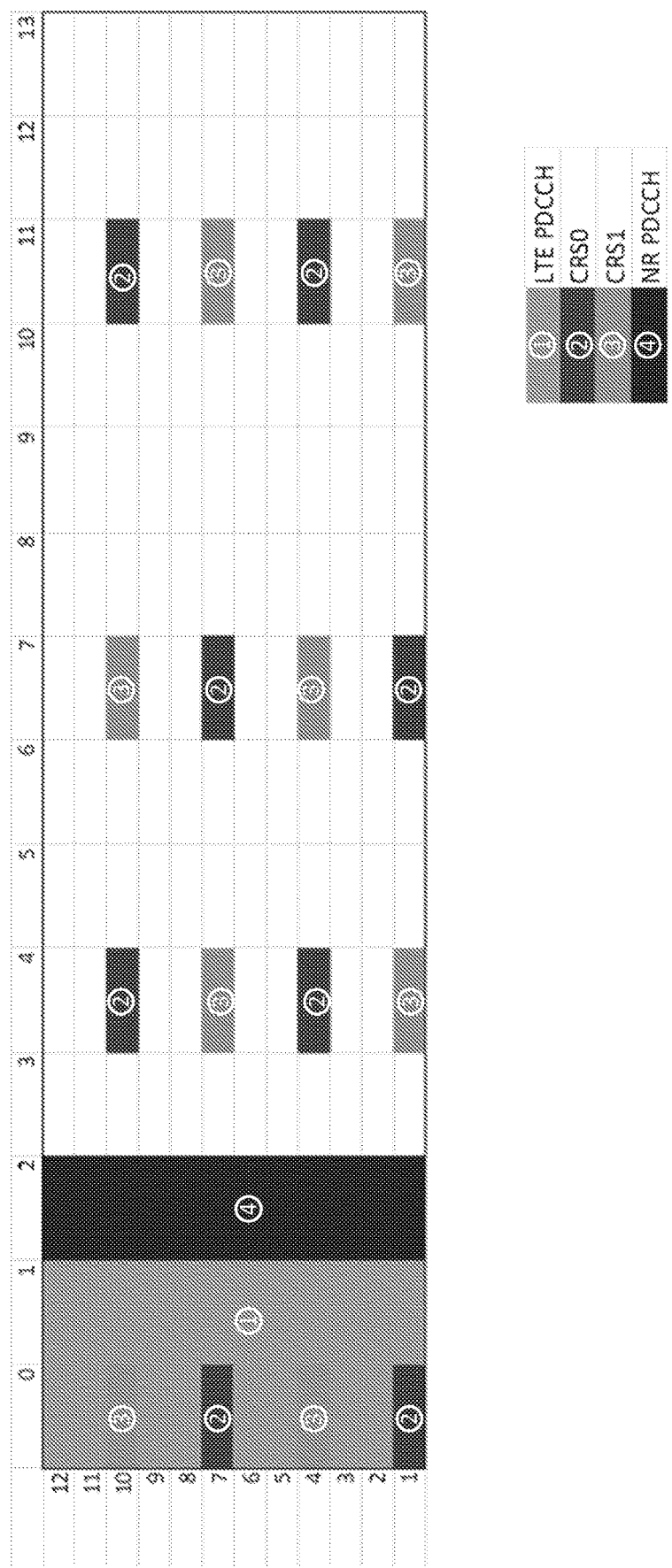
FIGS. 33A and 33B depict a common resource sharing example.
Figure 33B:
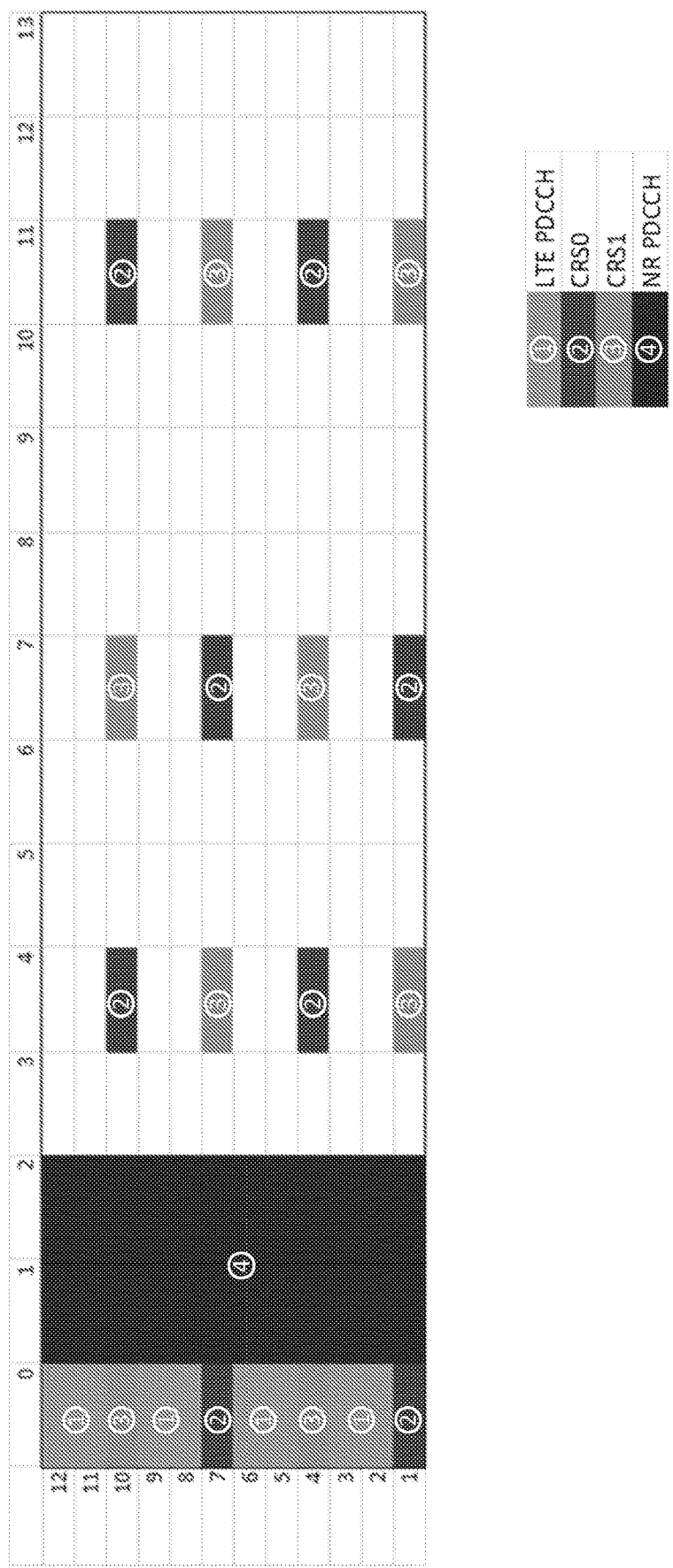

Although common resources are not spatially multiplexed, it is possible to configure some of the common resources, for multiple radio technologies. For example, configuring some resources on the same symbol for the downlink control channel (PDCCH) of both 4G LTE and 5G NR. User devices of both radio technologies will search this symbol for messages targeted to them. However, in each subframe, a control channel of only one radio technology will be allocated to these resources. FIGS. 33A and 33B illustrate such an example, where symbol #1 is a shared common resource. In some subframes, where there is more 4G LTE traffic, two symbols can be used for 4G LTE PDCCH and one symbol for 5G NR PDDCH, as shown in FIG. 33A. In other subframes, where there is more 5G NR traffic, two symbols can be used for 5G NR PDCCH and one symbol for 4G LTE PDDCH, as shown in FIG. 33B. In any case, all user devices of both radio technologies, are configured to receive the PDCCH over two symbols. When they search a symbol of a different radio technology, they will not detect any valid message targeted to them.

12.3 Configuration of 4G LTE and 5G NR for Spatial Multiplexing

As discussed in previous section, when coexisting multiple radio technologies, we must ensure that common resources do not collide with any other resources (common or user-specific). Both 4G LTE and 5G NR has some flexibility to configure their system in different ways. This section describes two specific sets of configurations that ensures this for the coexistence of 4G LTE and 5G NR. Other configuration sets may also be valid.

12.4 Configuration A: Three Common Symbols
12.4.1 4G LTE:
1. Configure LTE without MBSFN (Multimedia Broadcast Single Frequency Network) subframes.
2. Configure the downlink control channel (PDCCH) over three symbols. Transmit PDCCH over symbol #0 and optionally on any of the symbols #1-#2.
3. Transmit PDSCH over symbols #3-#13.
12.4.2 5G NR:
1. Configure the first slot in the frame (which has the Synchronization Signal Block=SSB) to be aligned with an 4G LTE subframe, which is not #0 or #5.
2. Configure SSB subcarrier spacing of 30 kHz and use SSB index #2.
3. Configure both cell and user-devices for rate-matching LTE CRS.
4. Configure subcarrier spacing of 15 kHz
5. Define CORESETs for downlink control channel (PDCCH) with CSS (Common Search Space) over any of the symbol #1-#2 and USS (UE-specific Search Space) on any of the symbols #1-#3. Define CORESET 0 over symbol #1 or #2.
6. Transmit PDSCH on symbols #3-13 or #4-13.
7. Configure DMRS (demodulation reference signal) on symbols #3 and #12
8. Configure uplink grid alignment of 7.5 kHz.
9. Configure SRS on the last symbol of the slot.
12.5 Configuration B: Two Common Symbols
12.5.1 4G LTE:
1. Configure LTE without MBSFN (Multimedia Broadcast Single Frequency Network) subframes
2. Configure the downlink control channel (PDCCH) over two symbols. Transmit PDCCH over symbol #0 and optionally on symbol #1.
3. Transmit PDSCH over symbols #2-#13.
12.5.2 5G NR:
1. Configure the first slot in the frame (which has the Synchronization Signal Block=SSB) to be aligned with an 4G LTE subframe, which is not #0 or #5.
2. Configure SSB subcarrier spacing of 30 kHz and use SSB index #2.
3. Configure both cell and user-devices for rate-matching LTE CRS.
4. Configure subcarrier spacing of 15 kHz
5. Define CORESETs for downlink control channel (PDCCH) with CSS (Common Search Space) over symbol #1 and USS (UE-specific Search Space) on any of the symbols #1-#2. Define CORESET 0 over symbol #1.
6. Transmit PDSCH on symbols #2-13 or #3-13.
7. Configure DMRS on symbols #3 and #12
8. Configure uplink grid alignment of 7.5 kHz.
9. Configure SRS on the last symbol of the slot.
12.6 A Frame Example for 4G LTE/5G NR for Spatial Multiplexing Configuration FIGS. 34A-34J show examples for one possible frame configuration, where common 4G LTE and 5G NR signals do not collide with other resources. These configuration examples have three common symbols. Each subframe is represented by a single PRB for simplicity. However, other PRBs in each subframe may have less signals than what is presented in the figures.

Figure 34A:
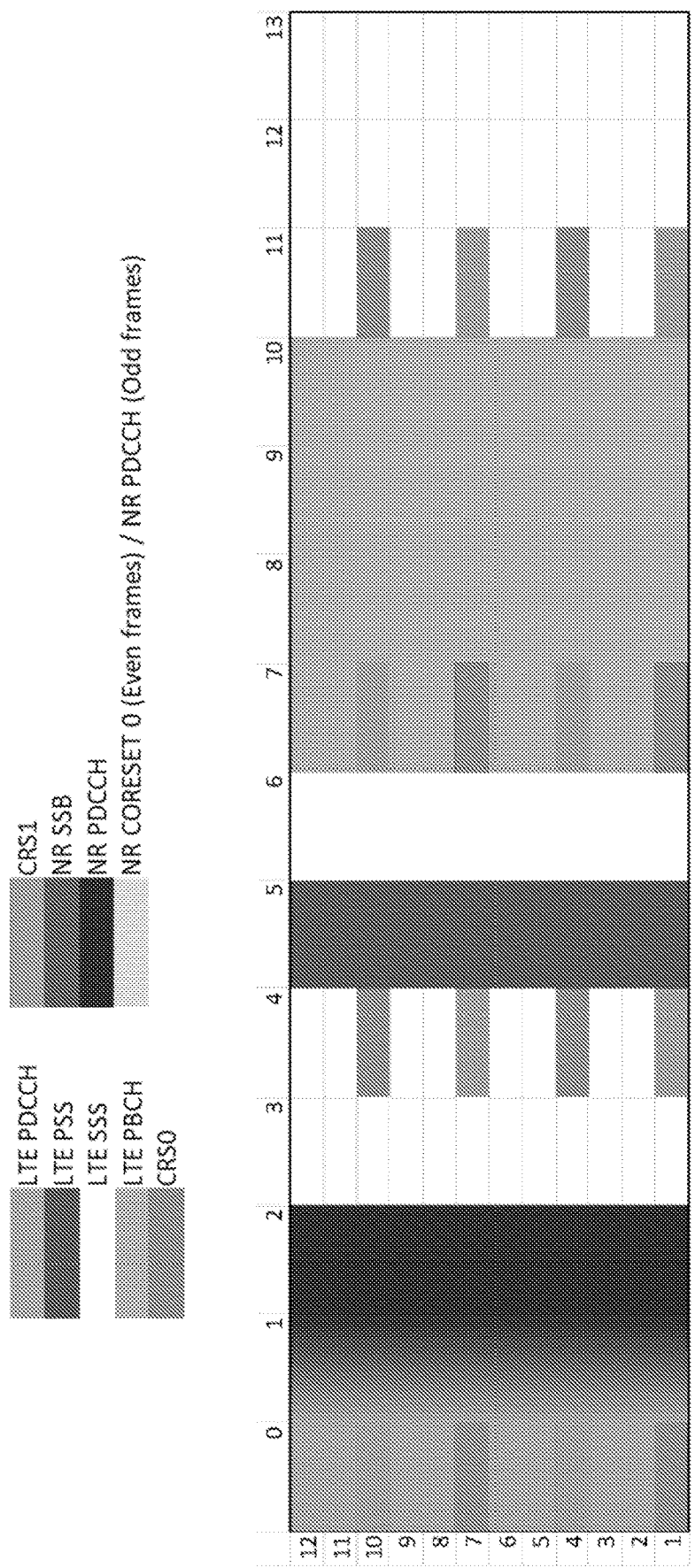
FIGS. 34A-34J show examples of coexistence configuration for 4G LTE and 5G NR, wherein each subframe/slot is represented with a single PRB for simplicity.

FIG. 34A shows the example of a 4G LTE Subframe #0/5G NR slot #9.

Figure 34B:
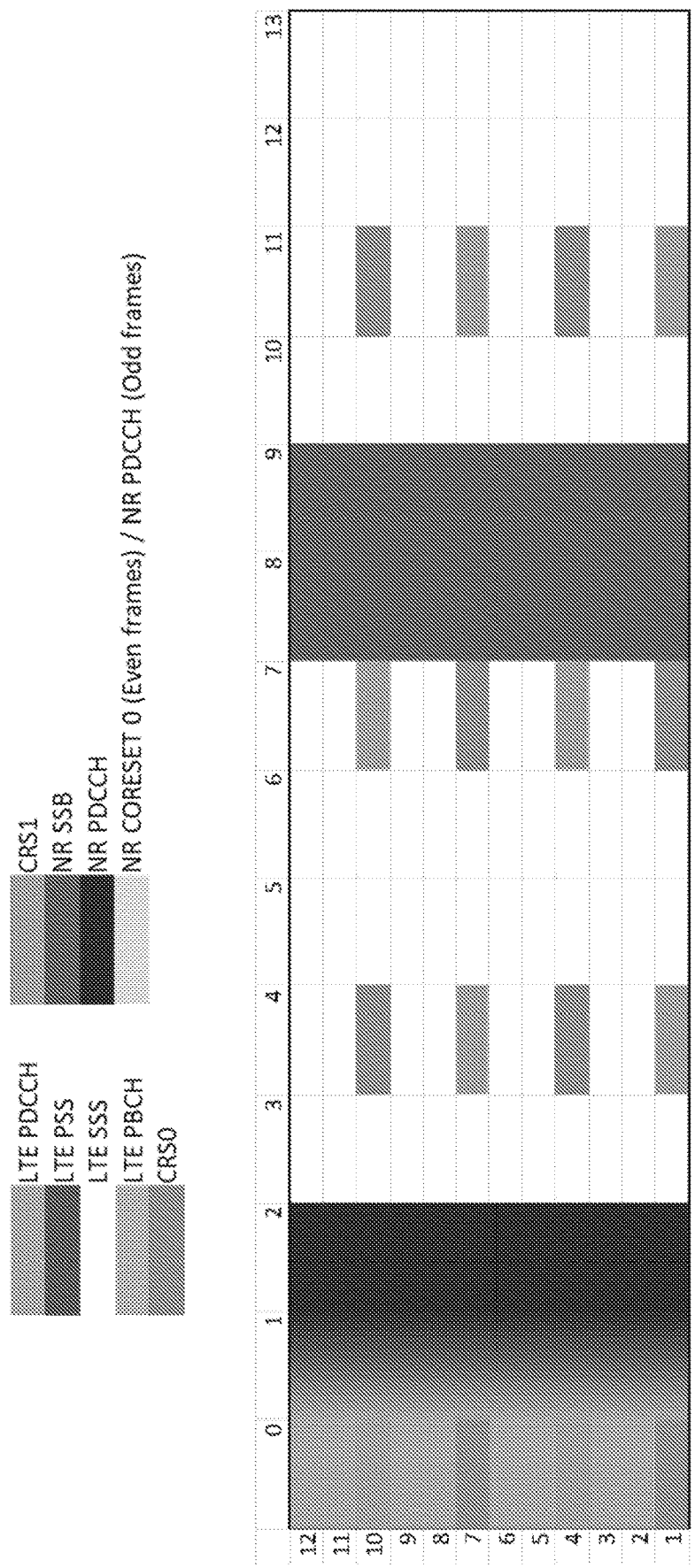

FIG. 34B shows the example of a 4G LTE Subframe #1/5G NR slot #0.

Figure 34C:
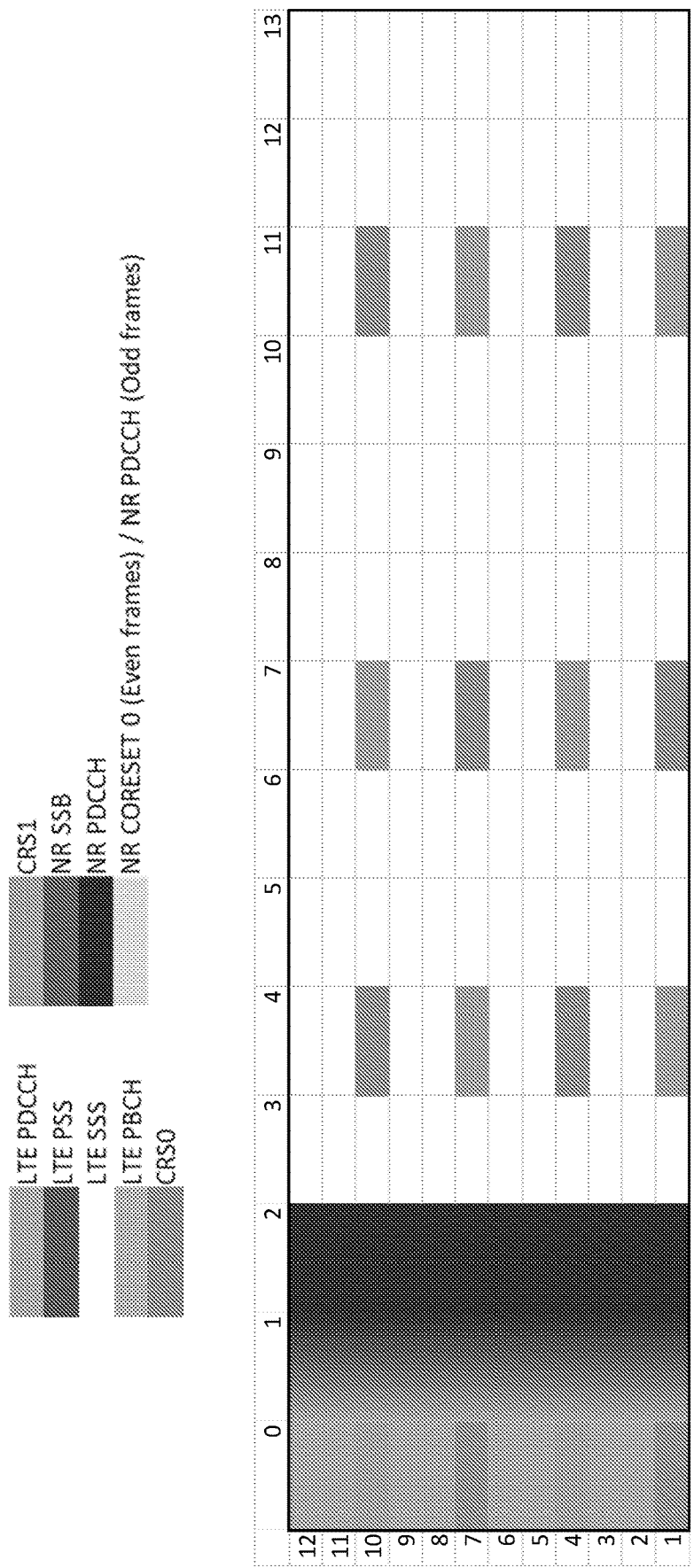

FIG. 34C shows the example of a 4G LTE Subframe #2/5G NR slot #1.

Figure 34D:
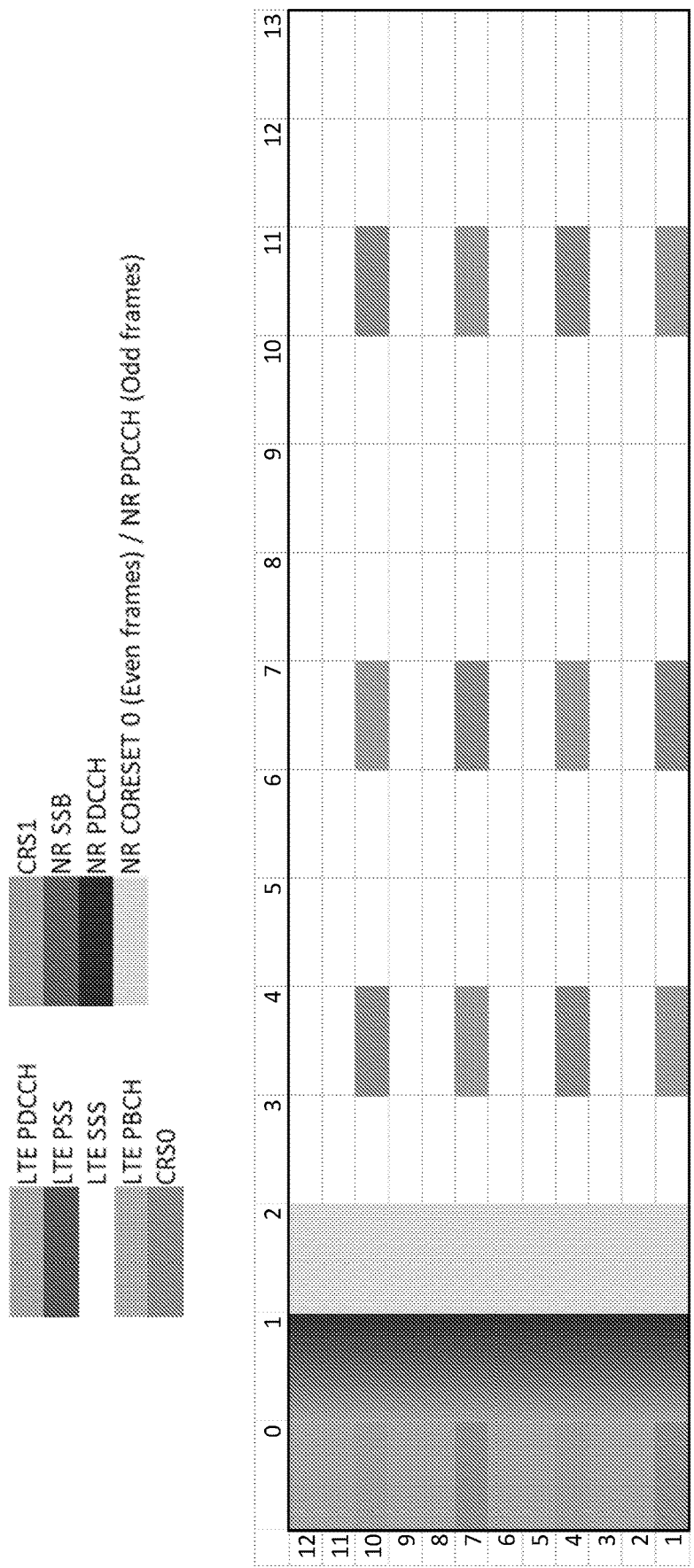

FIG. 34D shows the example of a 4G LTE Subframe #3/5G NR slot #2.

Figure 34E:
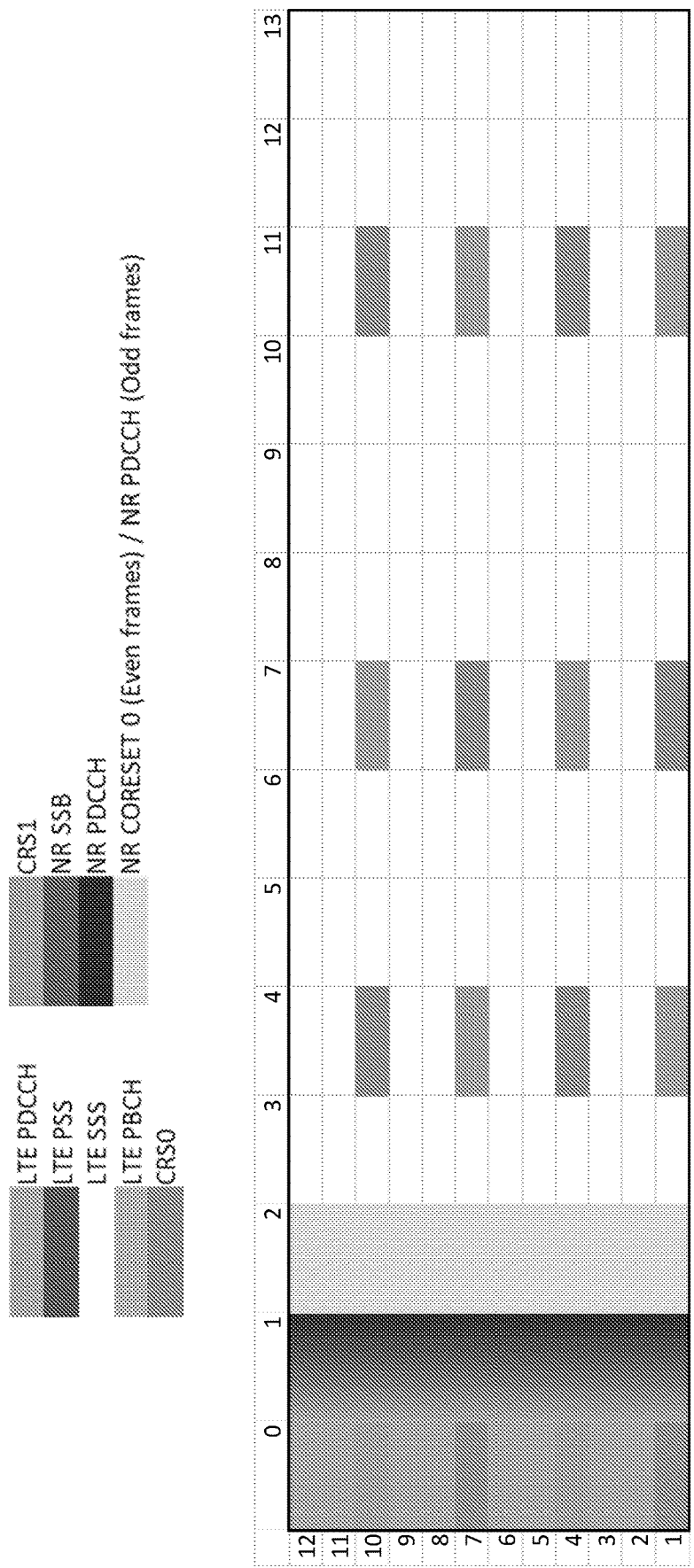

FIG. 34E shows the example of a 4G LTE Subframe #4/5G NR slot #3.

Figure 34F:
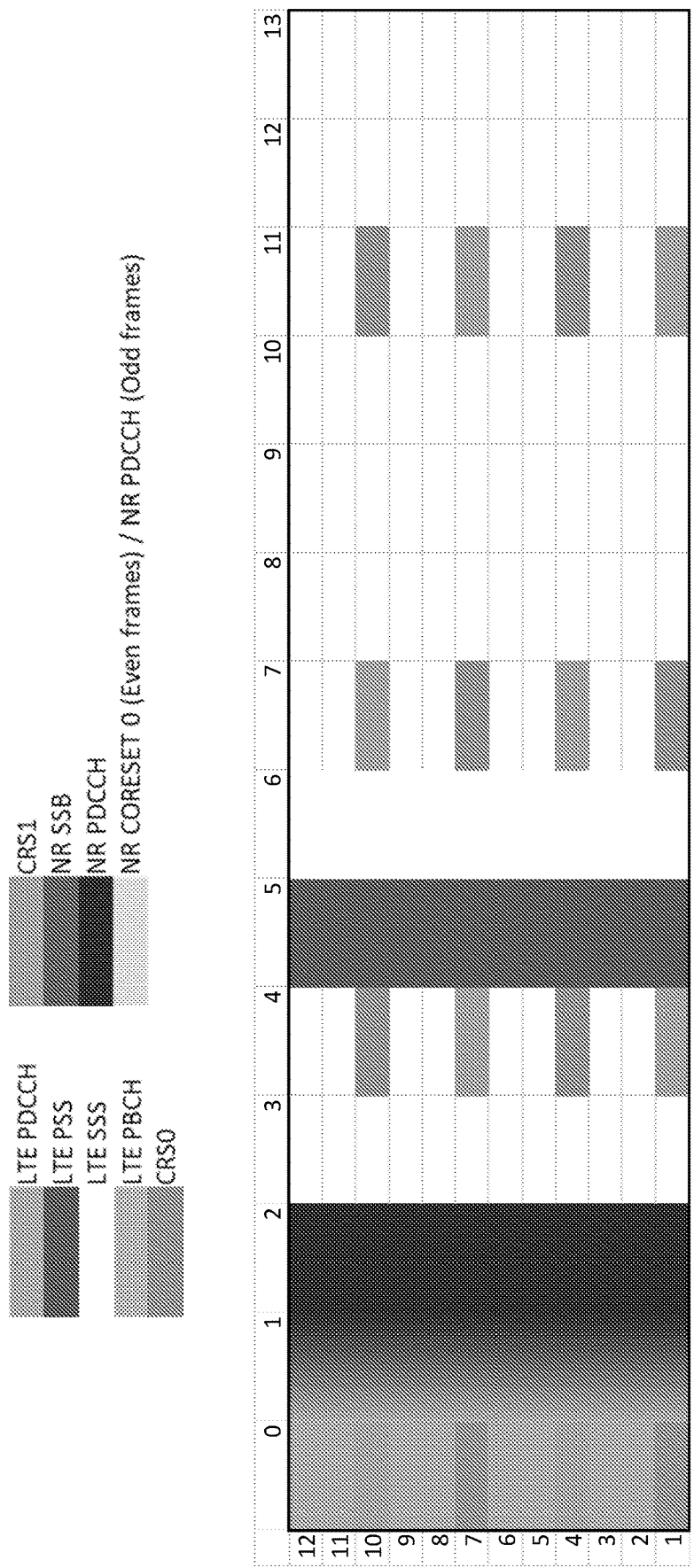

FIG. 34F shows the example of a 4G LTE Subframe #5/5G NR slot #4.

Figure 34G:
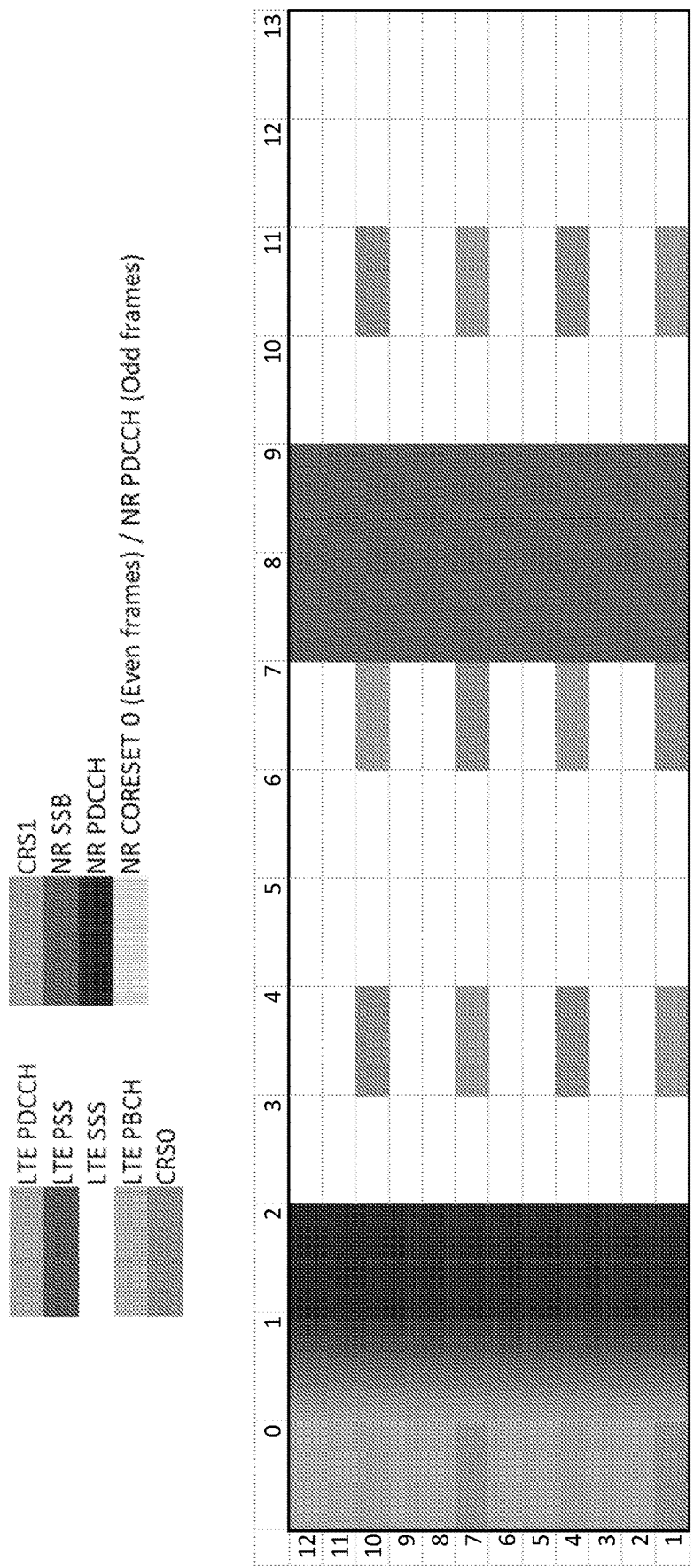

FIG. 34G shows the example of a 4G LTE Subframe #6/5G NR slot #5.

Figure 34H:
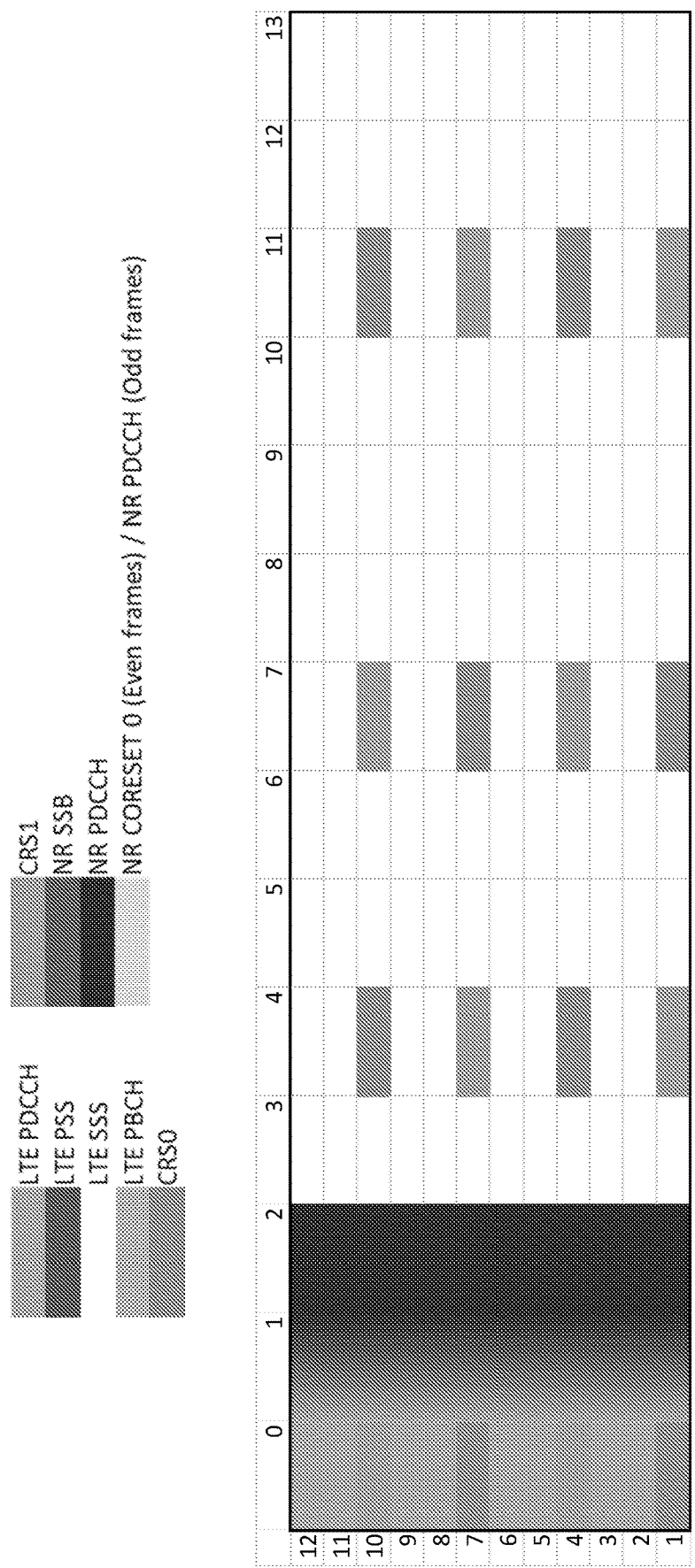

FIG. 34H shows the example of a 4G LTE Subframe #7/5G NR slot #6.

Figure 34I:
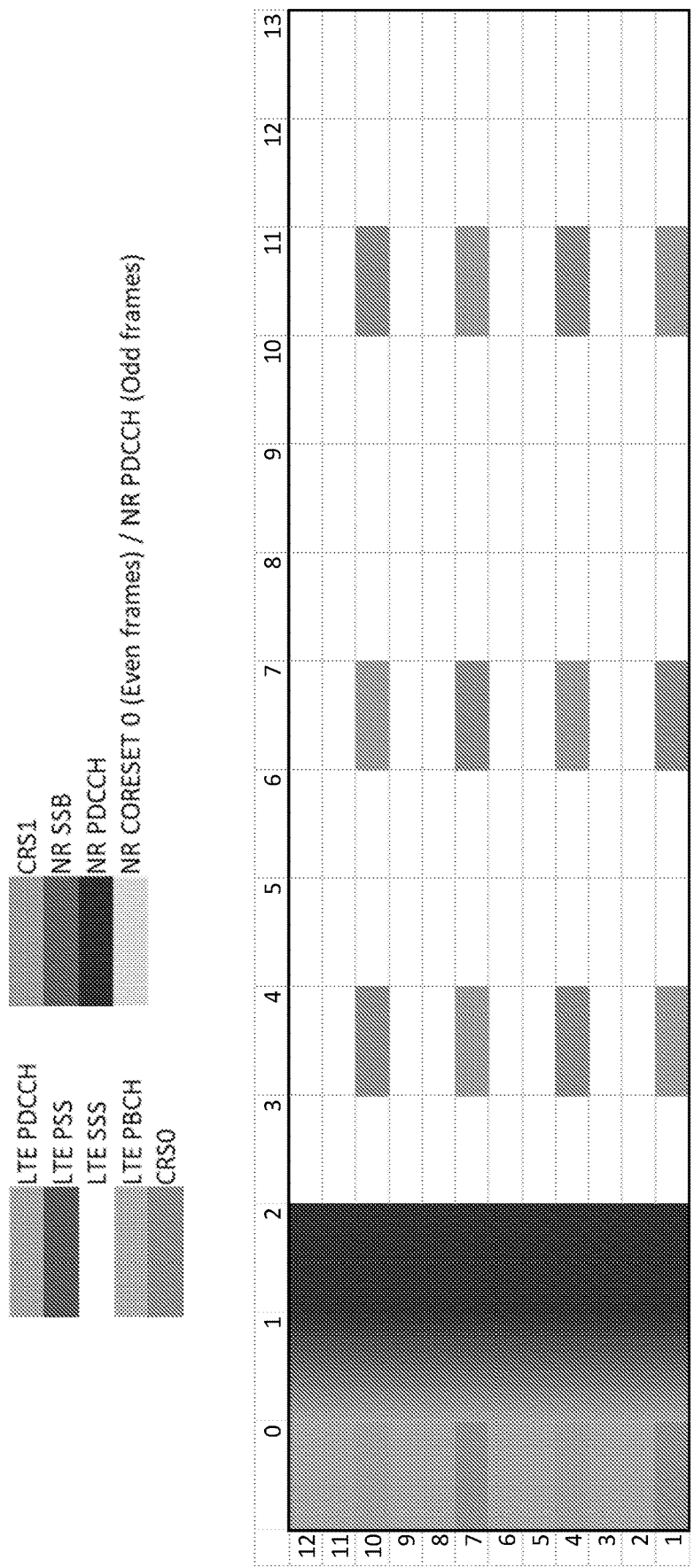

FIG. 34I shows the example of a 4G LTE Subframe #8/5G NR slot #7.

Figure 34J:
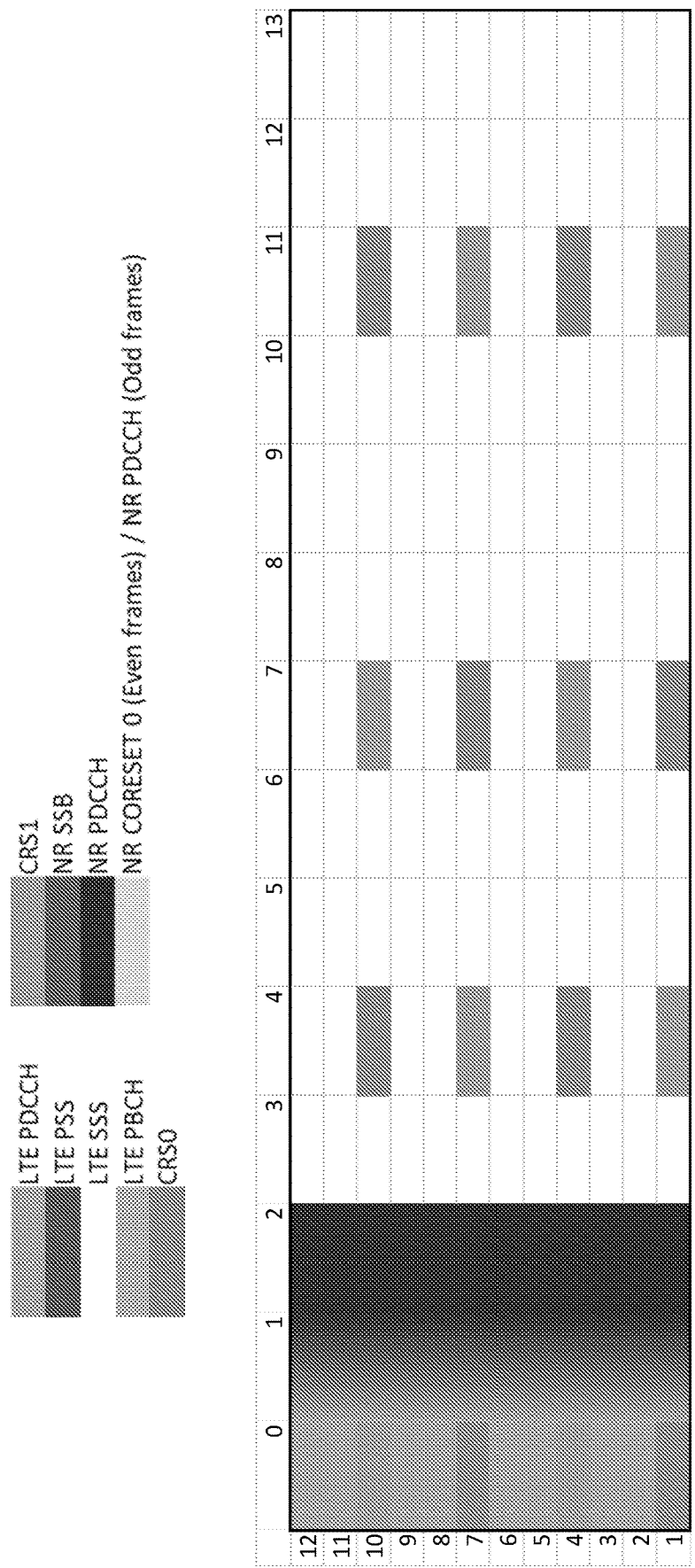

FIG. 34J shows the example of a 4G LTE Subframe #9/5G NR slot #8.

13. Examples Embodiments of the Disclosed Technology

Figure 35:
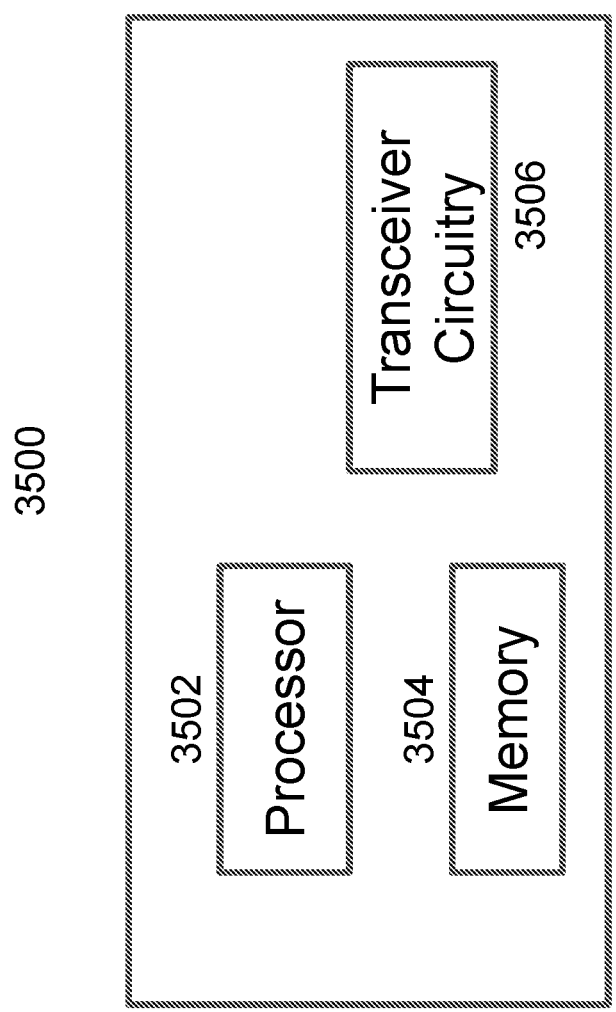
FIG. 35 shows an example of a hardware platform.

FIG. 35 is a block diagram representation of a wireless hardware platform 3500 which may be used to implement the various methods described in the present document. The hardware platform 3500 may be incorporated within a base station or a user device. The hardware platform 3500 includes a processor 3502, a memory 3504 (this may be optional and in some cases the memory may be internal to the processor) and a transceiver circuitry 1006. The processor may execute instructions, e. g., by reading from the memory 3504, and control the operation of the transceiver circuitry 3506 and the hardware platform 3500 to perform the methods described herein. In some embodiments, the memory 3504 and/or the transceiver circuitry 3506 may be partially or completely contained within the processor 3502 (e.g., an internally memory that is on a same semiconductor substrate or a same semiconductor package).

The following solutions may be preferably implemented by some embodiments.

The following solutions may preferably be used for pulse shaping an OTFS waveform particularly with respect to the channel estimation aspect of wireless communication (see, e.g., Section 5 and corresponding figures).

Figure 36A:
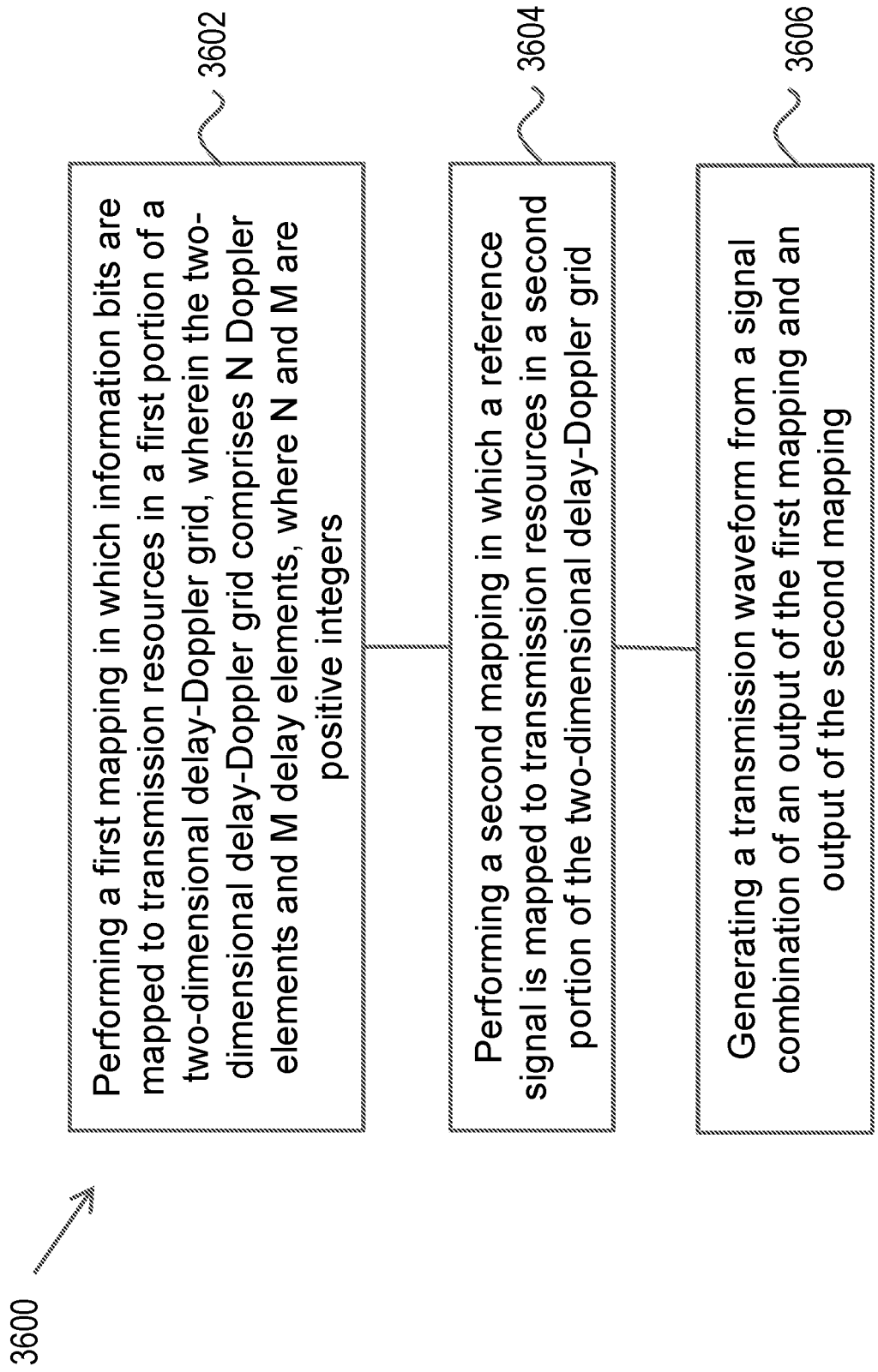

1. A method of wireless communication (e.g., method 3600 depicted in FIG. 36A flowchart), comprising: performing (3602) a first mapping in which information bits are mapped to transmission resources in a first portion of a two-dimensional delay-Doppler grid, wherein the two-dimensional delay-Doppler grid comprises N Doppler elements and M delay elements, where N and M are positive integers; performing (3604) a second mapping in which a reference signal is mapped to transmission resources in a second portion of the two-dimensional delay-Doppler grid; and generating (3606) a transmission waveform from a signal combination of an output of the first mapping and an output of the second mapping; wherein the transmission waveform corresponds to an output of an orthogonal time frequency space (OTFS) waveform of the signal combination, and at least the output of the second mapping undergoes a time domain spreading.

2. The method of solution 1, wherein the time domain spreading operation results in the transmission waveform without extending a bandwidth or a duration of the signal combination.

3. The method of any of solutions 1-2, wherein the transmission waveform is generated using a two-dimensional delay-Doppler pulse that is represented as a twisted convolution of a pulse in a delay dimension and a pulse in a Doppler dimension.

4. The method of any of solutions 1-3, wherein the second portion is non-overlapping with the first portion.

5. The method of any of solutions 1-4, wherein an average power of the reference signal mapped to the second portion is boosted over an average power of the information bits mapped to the first portion.

6. The method of solution 5, wherein an average power of the reference signal is boosted over the average power of the reference signal by a factor of a number of delay-Doppler grid elements in the second portion of the two-dimensional delay-Doppler grid.

7. The method of any of solutions 1-6, wherein the second portion of the two-dimensional delay-Doppler grid comprises delay-Doppler resource elements to which the reference signal is mapped and blank resources to which neither the reference signal nor the information bits are mapped.

8. The method of any of solutions 1-7, wherein the spreading signal is a chirp signal.

9. The method of solution 3, wherein the pulse in the delay dimension is a convolution of a pulse signal and a spread signal, mathematically represented as:

$$\rho_\tau^{spread} = \rho_\tau * \psi(t)$$

wherein $\psi(t)$ represents the spreading signal, t represents time, $\rho_\tau$ represents a pulse signal, $\rho_\tau^{spread}$ represents a delay pulse corresponding to the transmission waveform and * is a convolution operation.

10. The method of solution 9, wherein $\psi(t) = e^{j2\pi a t^2}$. Several other spread signals are possible for the various embodiments listed herein, including cosine or other type of windows.

11. The method of any of solutions 1-10, wherein the first portion includes quadrature amplitude modulation symbols.

Figure 36B:
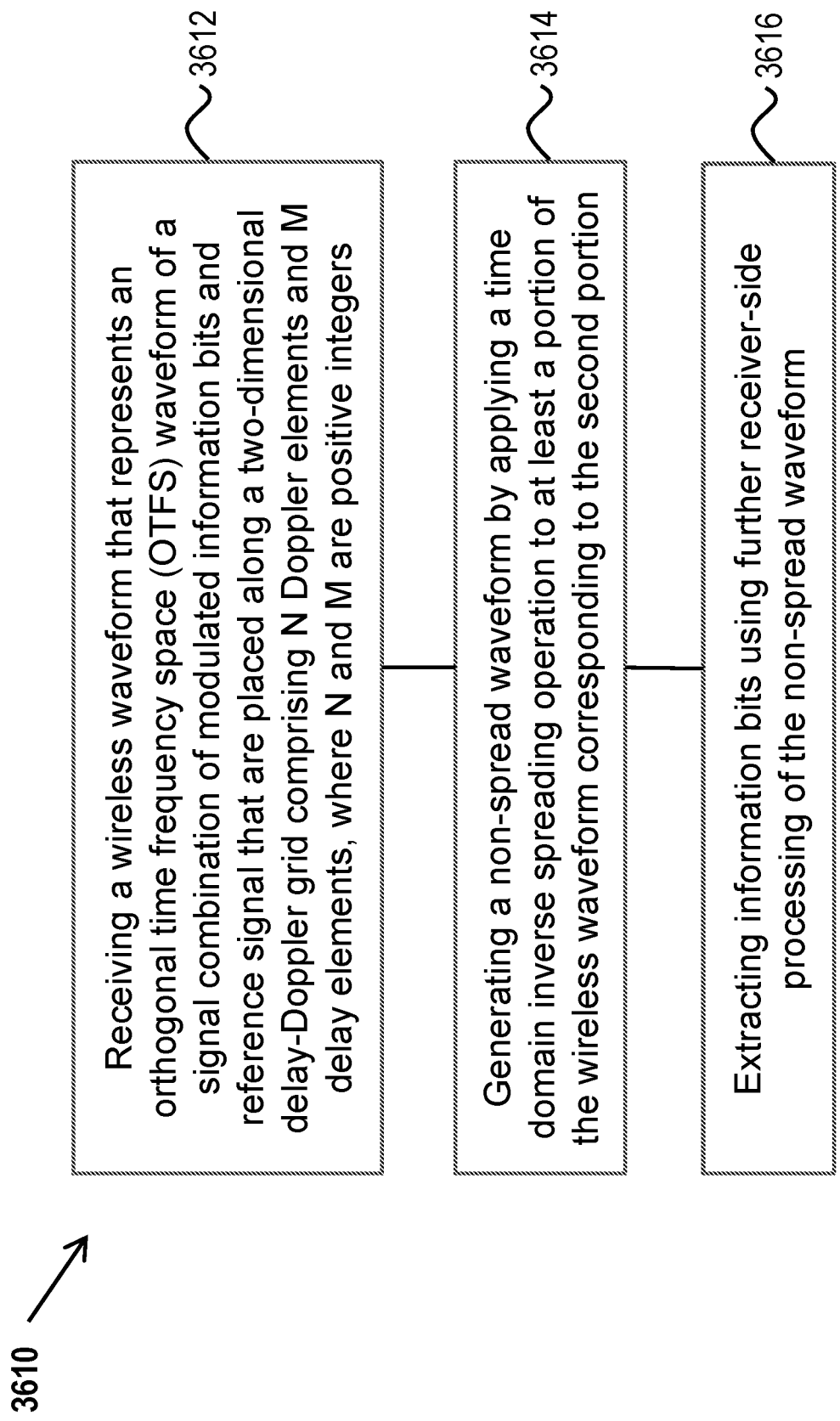

12. A method of wireless communication (e.g., method 3610 depicted in FIG. 36B flowchart), comprising: receiving (3612) a wireless waveform that represents an orthogonal time frequency space (OTFS) waveform of a signal combination of modulated information bits and reference signal that are placed along a two-dimensional delay-Doppler grid comprising N Doppler elements and M delay elements, where N and M are positive integers, wherein the two dimensional delay-Doppler grid comprises a first portion in which the information bits are mapped to transmission resources and a second portion in which a reference signal is mapped to transmission resource; generating (3614) a non-spread waveform by applying a time domain inverse spreading operation to at least a portion of the wireless waveform corresponding to the second portion; and extracting information bits using further receiver-side processing of the non-spread waveform.

13. The method of solution 12, wherein the time domain inverse spreading operation transmission operates without modifying a bandwidth or a duration of the transmission waveform.

14. The method of any of solutions 12-13, wherein the transmission waveform is generated using a two-dimensional delay-Doppler pulse that is represented as a twisted convolution of a pulse in a delay dimension and a pulse in a Doppler dimension.

15. The method of any of solutions 12-14, wherein the second portion is non-overlapping with the first portion.

16. The method of any of solutions 12-15, wherein an average power of the reference signal mapped to the second portion is boosted over an average power of the information bits mapped to the first portion.

17. The method of any of solution 16, wherein the average power of the reference signal is boosted over the average power of the reference signal by a factor of the number of delay-Doppler grid elements in the second portion of the two-dimensional delay-Doppler grid.

18. The method of any of solutions 12-17, wherein the second portion of the two-dimensional delay-Doppler grid comprises delay-Doppler resource elements to which the reference signal is mapped and blank resources to which neither the reference signal nor the information bits are mapped.

19. The method of any of solutions 12-18, wherein the de-spreading signal is a conjugate of a chirp signal used for generating the transmission waveform.

20. The method of any of solutions 12-19, wherein the further receiver-side processing includes performing channel estimation using the reference signal.

21. The method of any of solutions 12-20, wherein the first portion includes quadrature amplitude modulation symbols and the further receiver-side processing includes using quadrature amplitude demodulation to recover information bits from the first portion.

22. The method of any of solutions 12-21, wherein the further receiver-side processing includes performing channel estimation based on the reference signal received from the second portion.

With respect to the above-listed solutions, the blank resources may refer to unused portion of spectrum that is reserves as a transition or guard band to allow for distortions in pilot and data signals and also allow for practical implementations of filter transition bands for signal reception operations.

The following solutions may preferably be used for pulse shaping an OTFS waveform particularly with respect to coexistence between OTFS transmissions and other transmissions (see, e.g., Section 6).

Figure 36C:
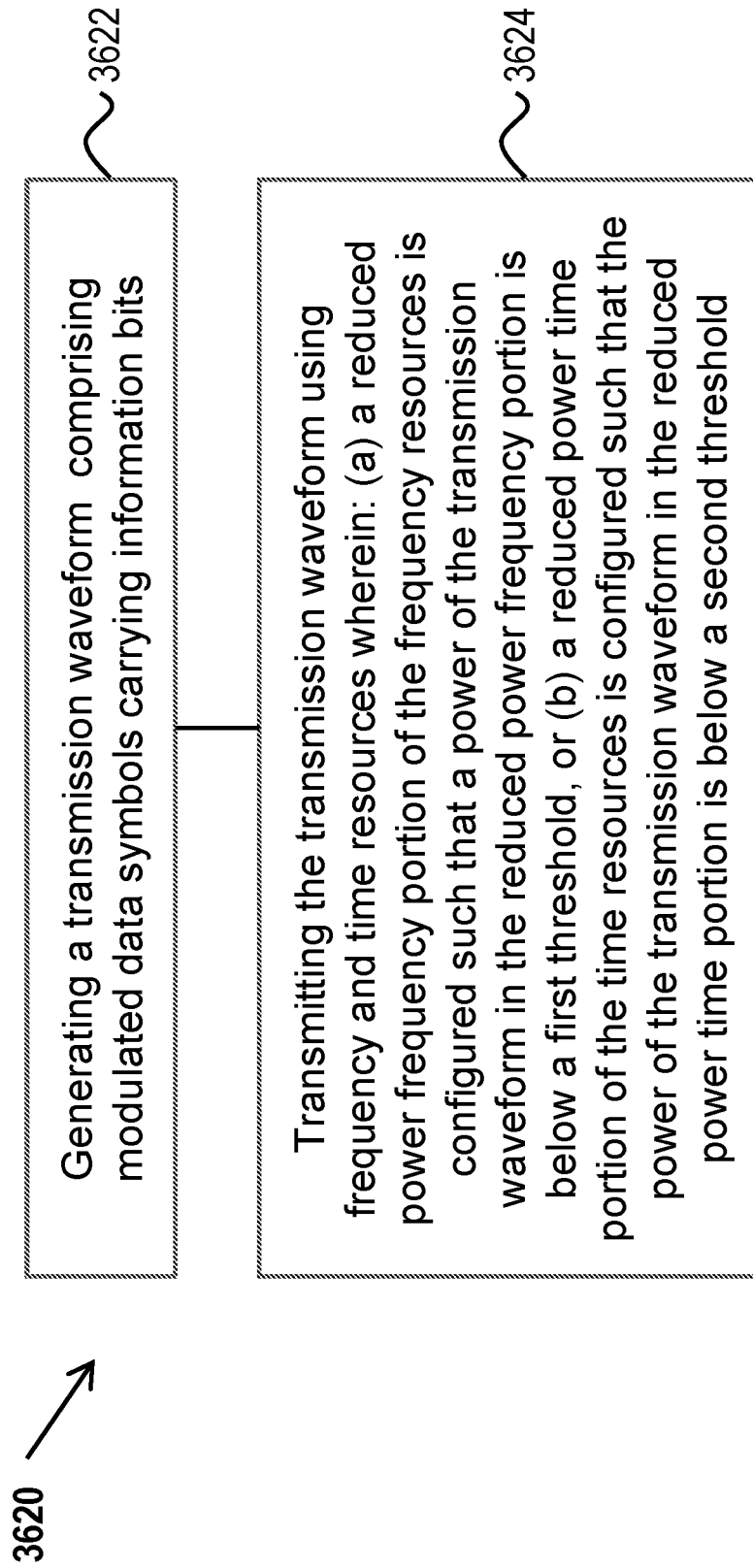

23. A method of wireless communication (e.g., method 3620 depicted in FIG. 36C flowchart), comprising: generating (3622) a transmission waveform comprising modulated data symbols carrying information bits, wherein the modulated data symbols are organized in a number of data frames along a delay-Doppler grid comprising N Doppler elements and M delay elements, where N and M are positive integers, and transmitting (3624) the transmission waveform using frequency and time resources wherein: (a) a reduced power frequency portion of the frequency resources is configured such that a power of the transmission waveform in the reduced power frequency portion is below a first threshold, or (b) a reduced power time portion of the time resources is configured such that the power of the transmission waveform in the reduced power time portion is below a second threshold. Here, reduced power frequency portion may be reduced in comparison with the average power over the frequency band or the reduced power portion may be reduced in the sense that its peak is less than a peak power in another frequency portion.

24. The method of solution 23, wherein the first threshold or the second threshold is relative to the power of the transmission waveform. For example, the thresholds may be a percent of peak or average power.

25. The method of solution 23, wherein the first threshold or the second threshold is a pre-defined value. For example, the threshold may be specified to fall below a receiver sensitivity number below which a receiver is not able to discern the signal over noise.

26. The method of any of solutions 23-25, wherein the transmission waveform is generating using a two-dimensional delay-Doppler pulse that is represented as a twisted convolution of a pulse in a delay dimension and a pulse in a Doppler dimension.

27. The method of solution 26, wherein the pulse in the delay dimension and/or the Doppler dimension corresponds to a linear combination of different pulses.

28. The method of solution 27, wherein the different pulses include at least two different raised cosine pulses.

29. The method of solution 27, wherein the different pulses include at least two different square root raised cosine pulses.

30. The method of any of solutions 23-29, comprising: generating and transmitting another transmission waveform; wherein: the another transmission waveform is multiplexed with the transmission waveform in frequency domain such that the another transmission waveform occupies the reduced power frequency portion of the frequency resources without occupying other frequencies occupied by the transmission waveform, or the another transmission waveform is multiplexed with the transmission waveform in time domain such that the another transmission waveform occupies the reduced power time portion of the time resources without occupying other times during which the transmission waveform is transmitted.

Figure 36D:
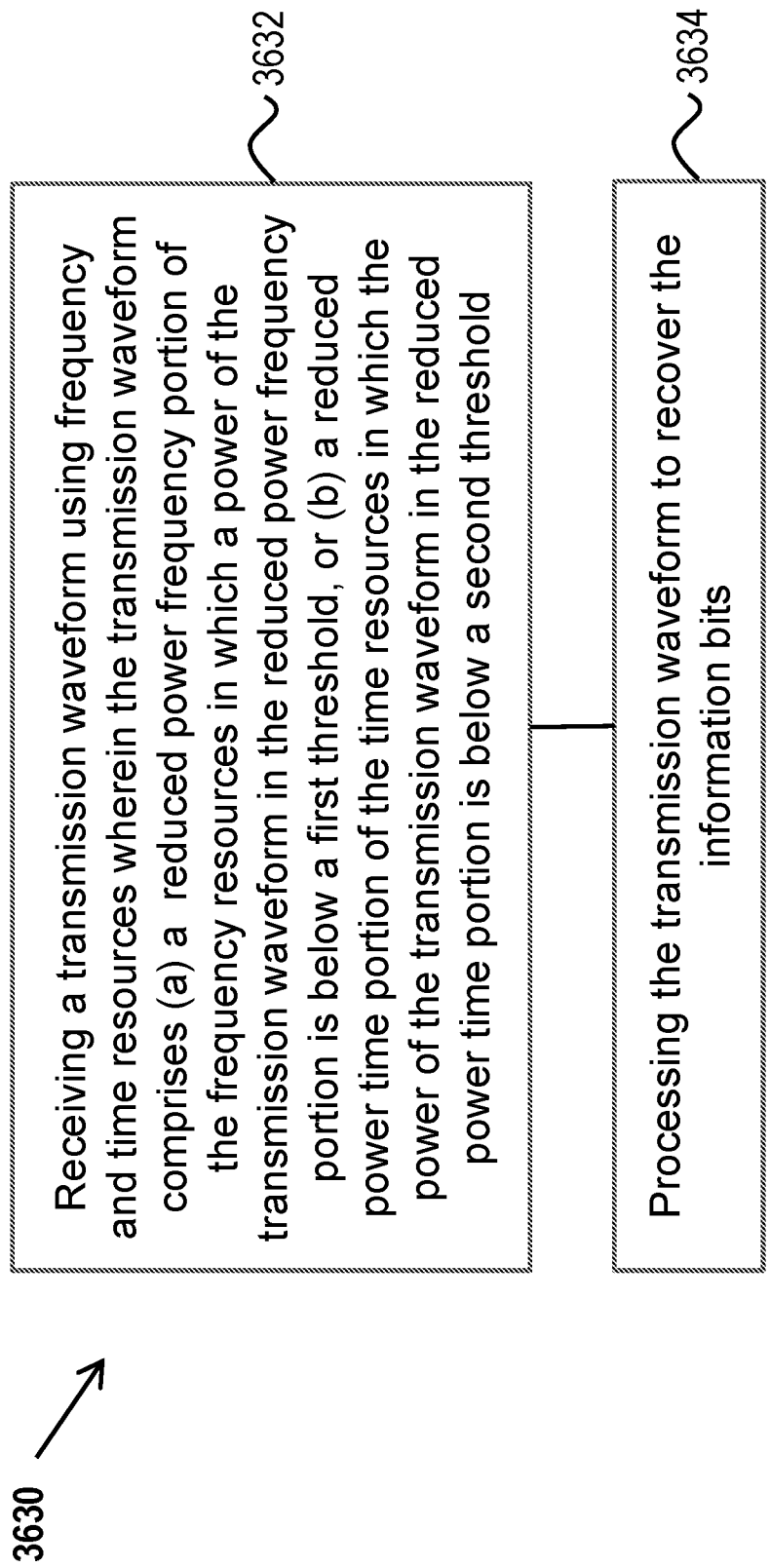

31. A method of wireless communication (e.g., method 3630 depicted in FIG. 36D flowchart), comprising: receiving (3632) a transmission waveform using frequency and time resources wherein the transmission waveform comprises (a) a reduced power frequency portion of the frequency resources in which a power of the transmission waveform in the reduced power frequency portion is below a first threshold, or (b) a reduced power time portion of the time resources in which the power of the transmission waveform in the reduced power time portion is below a second threshold; wherein the transmission waveform comprises modulated data symbols carrying information bits, wherein the modulated data symbols are organized in a number of data frames along a delay-Doppler grid comprising N Doppler elements and M delay elements, where N and M are positive integers, and processing (3634) the transmission waveform to recover the information bits.

32. The method of solution 31, wherein the first threshold or the second threshold is relative to the power of the transmission waveform.

33. The method of solution 31, wherein the first threshold or the second threshold is a pre-defined value. The thresholds may be similar to the threshold described with respect to the previous solution set.

34. The method of any of solutions 31-33, wherein the transmission waveform is generated using a two-dimensional delay-Doppler pulse that is represented as a twisted convolution of a pulse in a delay dimension and a pulse in a Doppler dimension.

35. The method of solution 34, wherein the pulse in the delay dimension and/or the Doppler dimension corresponds to a linear combination of different pulses.

36. The method of solution 35, wherein the different pulses include two different raised cosine pulses.

37. The method of solution 35, wherein the different pulses include two different square root raised cosine pulses.

38. The method of any of solutions 31-37, comprising: receiving another transmission waveform, wherein: the another transmission waveform is multiplexed with the transmission waveform in frequency domain such that the another transmission waveform occupies the reduced power frequency portion of the frequency resources without occupying other frequencies occupied by the transmission waveform, or the another transmission waveform is multiplexed with the transmission waveform in time domain such that the another transmission waveform occupies the reduced power time portion of the time resources without occupying other times during which the transmission waveform is transmitted; and processing the another transmission waveform to recover information carried in the another transmission waveform or to process reference signals carried in the another transmission waveform.

The following solutions may preferably be used for pulse shaping an OTFS waveform particularly with respect to gaps separating consecutive OTFS transmission frames (see, e.g., Section 7).

Figure 36E:
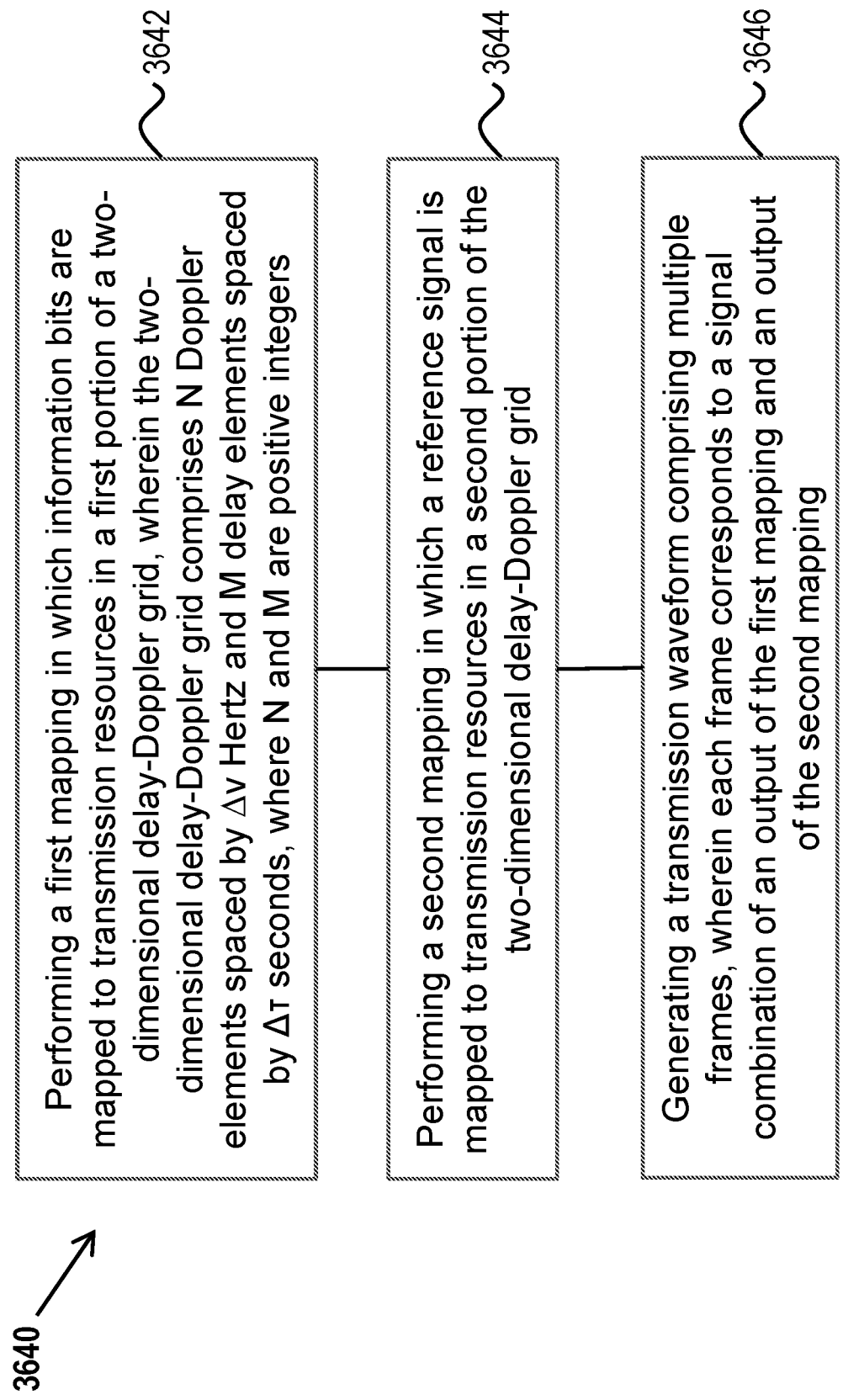

39. A method of wireless communication (e.g., method 3640 depicted in FIG. 36E flowchart), comprising: performing (3642) a first mapping in which information bits are mapped to transmission resources in a first portion of a two-dimensional delay-Doppler grid, wherein the two-dimensional delay-Doppler grid comprises N Doppler elements spaced by $\Delta v$ Hertz and M delay elements spaced by $\Delta \tau$ seconds, where N and M are positive integers; performing (3644) a second mapping in which a reference signal is mapped to transmission resources in a second portion of the two-dimensional delay-Doppler grid; and generating (3646) a transmission waveform comprising multiple frames, wherein each frame corresponds to a signal combination of an output of the first mapping and an output of the second mapping; wherein the transmission waveform corresponds to an output of an orthogonal time frequency space (OTFS) waveform of the signal combination that is generated using a two-dimensional delay-Doppler pulse, wherein the spacing between two consecutive frames is equal or larger than $1/\Delta v$.

40. The method of solution 39, wherein the transmission waveform is generated using a two-dimensional delay-Doppler pulse that is represented as a twisted convolution of a pulse in the delay dimension and a pulse in the Doppler dimension.

41. The method of solution 40, wherein the pulse in the Doppler dimension is shaped as a bandlimited pulse.

42. The method of solution 41, wherein the pulse is a raised cosine pulse.

43. The method of solution 41, wherein the pulse is a square root cosine pulse.

44. A method of wireless communication (e.g., method 3650 depicted in FIG. 36F flowchart), comprising: receiving (3652) a transmission waveform that comprises multiple frames, wherein each frame corresponds to a signal combination of an output of a first mapping and an output of a second mapping, wherein the transmission waveform corresponds to an output of an orthogonal time frequency space (OTFS) waveform of a signal combination that is generated using a two-dimensional delay-Doppler pulse, wherein the spacing between two consecutive frames is equal or larger than $1/\Delta v$; wherein, for the first mapping, information bits are mapped to transmission resources in the first portion of a two-dimensional delay-Doppler grid, wherein the two-dimensional delay-Doppler grid comprises N Doppler elements spaced by $\Delta v$ Hertz and M delay elements spaced by $\Delta \tau$ seconds, where N and M are positive integers; and wherein, for the second mapping, a reference signal is mapped to transmission resources in the second portion of the two-dimensional delay-Doppler grid; and processing (3654) the transmission waveform to recover the information bits and/or the reference signal (e.g., using iterative decoding and/or equalization, as described in Sections 10 and 11).

45. The method of solution 44, wherein the transmission waveform is generated using a two-dimensional delay-Doppler pulse that is represented as a twisted convolution of a pulse in the delay dimension and a pulse in the Doppler dimension.

46. The method of solution 45, wherein the pulse in the Doppler dimension is shaped as a bandlimited pulse.

47. The method of solution 46, wherein the pulse is a raised cosine pulse.

48. The method of solution 46, wherein the pulse is a square root cosine pulse.

49. A wireless communication apparatus comprising a processor and a transceiver, wherein the processor is configured to perform a method recited in any one or more of solutions 1-48.

50. A system comprising a plurality of wireless communication apparatus, each apparatus comprising one or more processors, configured to implement a method recited in any one or more of solutions 1-48.

51. A system, a method or an apparatus disclosed in the present document.

In the solutions provided in the present document, information bits may include user data, control data or other network traffic that is communicated between a transmitting device and a receiver device. The various embodiments have been described with M=512 and N=16, but other values of N and M are possible in implementations.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A method of wireless communication, comprising:
performing a first mapping in which information bits are mapped to transmission resources in a first portion of a two-dimensional delay-Doppler grid, wherein the two-dimensional delay-Doppler grid comprises N Doppler elements and M delay elements, where N and M are positive integers;

performing a second mapping in which a reference signal is mapped to transmission resources in a second portion of the two-dimensional delay-Doppler grid; and generating a transmission waveform from a signal combination of an output of the first mapping and an output of the second mapping;

wherein the transmission waveform corresponds to an output of an orthogonal time frequency space (OTFS) waveform of the signal combination, and at least the output of the second mapping undergoes a time-domain spreading operation.

2. The method of claim 1, wherein the time-domain spreading operation results in the transmission waveform without extending a bandwidth or a duration of the signal combination.

3. The method of claim 1, wherein the transmission waveform is generated using a two-dimensional delay-Doppler pulse that is represented as a twisted convolution of a pulse in a delay dimension and a pulse in a Doppler dimension.

4. The method of claim 1, wherein the second portion is non-overlapping with the first portion.

5. The method of claim 1, wherein an average power of the reference signal mapped to the second portion is boosted over an average power of the information bits mapped to the first portion.

6. The method of claim 5, wherein the average power of the reference signal is boosted over the average power of the information bits by a factor of a number of delay-Doppler grid elements in the second portion of the two-dimensional delay-Doppler grid.

7. The method of claim 1, wherein the second portion of the two-dimensional delay-Doppler grid comprises delay-Doppler resource elements to which the reference signal is mapped and blank resources to which neither the reference signal nor the information bits are mapped.

8. The method of claim 1, wherein a spreading signal associated with the time-domain spreading operation is a chirp signal.

9. The method of claim 3, wherein the pulse in the delay dimension is a convolution of a pulse signal and a spreading signal associated with the time-domain spreading operation, mathematically represented as:

$$\rho_\tau^{spread} = \rho_\tau * \psi(t)$$

wherein $\psi(t)$ represents the spreading signal, t represents time, $\rho_\tau$ represents the pulse signal, $\rho_\tau^{spread}$ represents a delay pulse corresponding to the transmission waveform and * is a convolution operation.

10. The method of claim 9, wherein $\psi(t)=e^{j2\pi a t^2}$, and wherein a is a spreading constant.

11. The method of claim 1, wherein the first portion includes quadrature amplitude modulation symbols.

12. A method of wireless communication, comprising:

receiving a wireless waveform that represents an orthogonal time frequency space (OTFS) waveform of a signal combination of modulated information bits and a reference signal that are placed along a two-dimensional delay-Doppler grid comprising N Doppler elements and M delay elements, where N and M are positive integers, wherein the two-dimensional delay-Doppler grid comprises a first portion in which the modulated information bits are mapped to first transmission resources therein and a second portion in which the reference signal is mapped to second transmission resources therein;

generating a non-spread waveform by applying a time-domain inverse spreading operation to at least a portion of the wireless waveform corresponding to the second portion; and extracting information bits using further receiver-side processing of the non-spread waveform.

13. The method of claim 12, wherein the time-domain inverse spreading operation operates without modifying a bandwidth or a duration of the wireless waveform.

14. The method of claim 12, wherein the wireless waveform is generated using a two-dimensional delay-Doppler pulse that is represented as a twisted convolution of a pulse in a delay dimension and a pulse in a Doppler dimension.

15. The method of claim 12, wherein the second portion is non-overlapping with the first portion.

16. The method of claim 12, wherein an average power of the reference signal mapped to the second portion is boosted over an average power of the information bits mapped to the first portion.

17. The method of claim 16, wherein the average power of the reference signal is boosted over the average power of the information bits by a factor of a number of delay-Doppler grid elements in the second portion of the two-dimensional delay-Doppler grid.

18. The method of claim 12, wherein the second portion of the two-dimensional delay-Doppler grid comprises delay-Doppler resource elements to which the reference signal is mapped and blank resources to which neither the reference signal nor the information bits are mapped.

19. The method of claim 12, wherein the further receiver-side processing includes performing channel estimation using the reference signal.

20. The method of claim 12, wherein the first portion includes quadrature amplitude modulation symbols, and wherein the further receiver-side processing includes using quadrature amplitude demodulation to recover the information bits from the first portion.

* * * * *